(12) United States Patent
Park et al.

(10) Patent No.: US 10,937,424 B2
(45) Date of Patent: Mar. 2, 2021

(54) DIALOGUE SYSTEM AND VEHICLE USING THE SAME

(71) Applicants: HYUNDAI MOTOR COMPANY, Seoul (KR); KIA MOTORS CORPORATION, Seoul (KR)

(72) Inventors: Jung Mi Park, Anyang-si (KR); Donghee Seok, Suwon-si (KR); Dongsoo Shin, Suwon-si (KR); Jeong-Eom Lee, Yongin-si (KR); Ga Hee Kim, Seoul (KR); Seona Kim, Seoul (KR); HeeJin Ro, Seoul (KR); Kye Yoon Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 196 days.

(21) Appl. No.: 16/209,476

(22) Filed: Dec. 4, 2018

(65) Prior Publication Data
US 2019/0392827 A1 Dec. 26, 2019

(30) Foreign Application Priority Data
Jun. 22, 2018 (KR) .................. 10-2018-0072107

(51) Int. Cl.
| | | |
|---|---|---|
| *G10L 17/22* | (2013.01) | |
| *G10L 15/22* | (2006.01) | |
| *G10L 15/18* | (2013.01) | |
| *G06F 40/268* | (2020.01) | |
| *G06F 40/295* | (2020.01) | |

(52) U.S. Cl.
CPC ............ *G10L 15/22* (2013.01); *G06F 40/268* (2020.01); *G06F 40/295* (2020.01); *G10L 15/1815* (2013.01); *G10L 2015/223* (2013.01)

(58) Field of Classification Search
CPC .................. G10L 15/22; G10L 15/1815; G10L 2015/223; G10L 21/16; G06F 17/2755; G06F 17/278; H04L 12/2821
USPC ................................ 704/235, 275; 701/29.5
See application file for complete search history.

(56) References Cited

U.S. PATENT DOCUMENTS

| | | | |
|---|---|---|---|
| 9,524,732 B2* | 12/2016 | Kawashima | ............ G10L 25/48 |
| 2011/0071830 A1 | 3/2011 | Kim et al. | |
| 2011/0172873 A1* | 7/2011 | Szwabowski | .......... G06Q 50/30 |
| | | | 701/29.5 |
| 2015/0095037 A1* | 4/2015 | Shimizu | .................. G10L 15/22 |
| | | | 704/275 |

(Continued)

FOREIGN PATENT DOCUMENTS

| | | |
|---|---|---|
| JP | 2015074315 A | 4/2015 |
| KR | 10-2013-0035983 A | 4/2013 |
| KR | 10-1467298 B1 | 6/2014 |

(Continued)

*Primary Examiner* — Md S Elahee
(74) *Attorney, Agent, or Firm* — Brinks Gilson & Lione

(57) ABSTRACT

A dialogue system and a vehicle having the same is provided. The dialogue system may recognize the user's speech, which is transmitted from the speech input device, as a text, derive user labeling context information after verifying an entity of the text, store the user labeling context information in the type to share an entity ontology with other user, and generate a dialogue response to perform an action corresponding when a user performs a free utterance or a designated entity utterance.

21 Claims, 59 Drawing Sheets

(56) References Cited

U.S. PATENT DOCUMENTS

2019/0173687 A1\* 6/2019 MacKay ............. H04L 12/2821

FOREIGN PATENT DOCUMENTS

| KR | 10-1579537 B1 | 12/2015 |
| --- | --- | --- |
| KR | 10-2016-0056638 A | 5/2016 |
| KR | 10-2016-0064762 A | 6/2016 |
| KR | 10-2016-0135069 A | 11/2016 |
| KR | 10-2017-0011351 A | 2/2017 |

\* cited by examiner

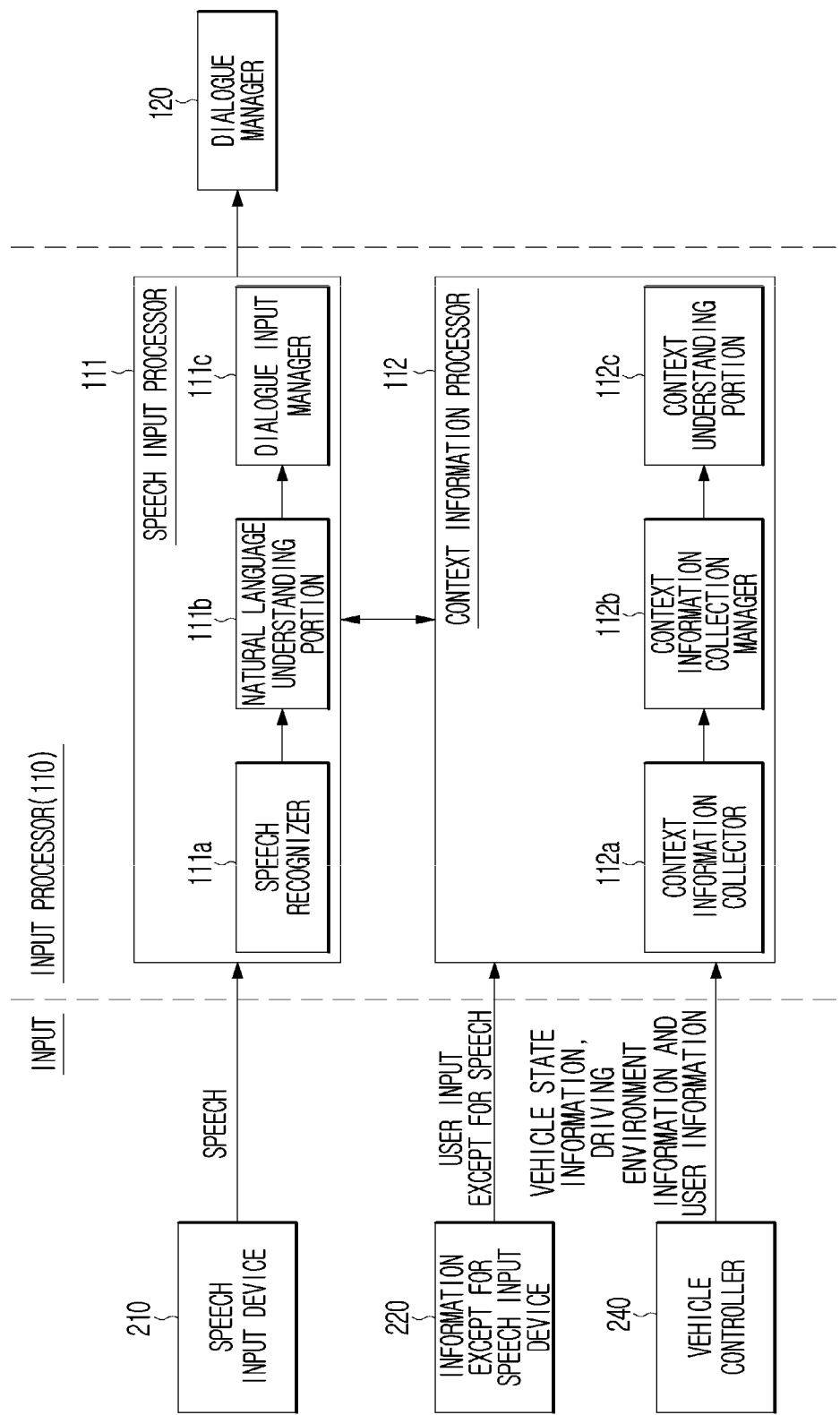

FIG. 27

| MORPHOLOGICAL ANALYSIS RESULT | SURROUNDING ENVIRONMENT INFORMATION | VEHICLE STATE INFORMATION | VEHICLE CONTROL |
|---|---|---|---|
| HANDS FREEZING .... | TEMPERATURE >20 RAIN | AIR CONDITIONER ON | INCREASE AIR CONDITIONER TEMPERATURE BY 3DEGREE |
| | TEMPERATURE >20 RAIN | AIR CONDITIONER OFF | TURN ON AIR CONDITIONER |
| | TEMPERATURE >20 RAIN x | AIR CONDITIONER ON AIR CONDITIONER WIND DIRECTION : up | AIR CONDITIONER WIND DIRECTION : DOWN |
| | TEMPERATURE >20 RAIN x | AIR CONDITIONER ON AIR CONDITIONER WIND DIRECTION: DOWN AIR CONDITIONER WIND VOLUME: MORE THAN MIDDLE LEVEL | AIR CONDITIONER WIND VOLUME: LOW |
| | TEMPERATURE >20 RAIN x | AIR CONDITIONER ON AIR CONDITIONER WIND DIRECTION: DOWN AIR CONDITIONER WIND VOLUME: LOW | INCREASE AIR CONDITIONER TEMPERATURE BY 3DEGREE |
| | TEMPERATURE >20 | HEATER OFF | HEATER ON |
| | TEMPERATURE >20 | HEATER ON STEERING HEAT LINE OFF | STEERING HEAT LINE ON |
| | TEMPERATURE >20 | HEATER ON STEERING HEAT LINE ON HEATER WIND DIRECTION: DOWN | HEATER WIND DIRECTION: BI-DIRECTIONAL CHANGE |
| | TEMPERATURE >20 | HEATER ON STEERING HEAT LINE ON HEATER WIND DIRECTION: UP HEATER TEMPERATURE<MAX | INCREASE HEATER TEMPERATURE |
| | TEMPERATURE >20 | HEATER ON STEERING HEAT LINE ON HEATER WIND DIRECTION: UP HEATER TEMPERATURE=MAX HEATER WIND VOLUME<MAX | INCREASE HEATER WIND VOLUME |
| | TEMPERATURE >20 | HEATER ON STEERING HEAT LINE ON HEATER WIND DIRECTION: UP HEATER TEMPERATURE=MAX HEATER WIND VOLUME=MAX HEAT SEAT OFF | HEAT SEAT ON |
| | TEMPERATURE >20 | HEATER ON STEERING HEAT LINE ON HEATER WIND DIRECTION: UP HEATER TEMPERATURE=MAX HEATER WIND VOLUME=MAX HEAT SEAT ON | GUIDE FOR WAIT FOR A WHILE BECAUSE HEATER IS IN FULL OPERATION NOW |

FIG. 28A

| MORPHOLOGICAL ANALYSIS RESULT | SURROUNDING ENVIRONMENT INFORMATION | VEHICLE STATE INFORMATION | IDENTIFY CAUSE (OPTION) | VEHICLE CONTROL |
|---|---|---|---|---|
| HANDS COLD/ FREEZING/ SHAKING | SUMMER | WIND DIRECTION : HEAD SIDE, TEMPERATURE 19DEGREE, WIND VOLUME MAX | HAND FREEZING BECAUSE AIR CONDITIONER WIND DIRECTION IS HAND SIDE | CHANGE WIDE DIRECTION TO FOOT SIDE / REDUCE WIND STRENGTH |
| | WINTER | WIND DIRECTION : FOOT SIDE, TEMPERATURE 30 DEGREE, WIND VOLUME WEAK | HAND FREEZING BECAUSE HOT AIR IS NOT REAHCED TO HANDS | TURN ON STEERING WHEEL HEAT LINE |
| STUFFINESS | | VEHICLE SPEED: 30KM OR LESS FRONT AND REAR CLEARANCE: LESS THAN 30CM | STUFFINESS DUE TO HEAVY TRAFFIC | GUIDE CHANGED ROUTE OPTION (FAST ROUTE) OR PLAY MUSIC/ CHATTING ON |
| | WINTER | VEHICLE SPEED: 30KM OR MORE HEATER ON | STUFFINESS DUE TO HOT AIR | OPENING WINDOW AVAIABLE |
| DROWSINESS | | INTERNAL AIR MODE | DROWSINESS DUE TO LACK OF AIR CIRCULATION | CHANGE TO EXTERNAL AIR MODE |
| | | EXTERNAL AIR MODE HEATER ON | DROWSINESS DUE TO HOT AIR | OPEN WINDOW |
| SWEAT/HOT | WINTER | HEATER ON | HEAT DUE TO OVERHEATING | LOWER TEMPERATURE/ REDUCE WIND VOLUME |
| | WINTER | HEATER OFF | HEAT DUE TO BODY HEAT | RECMOMMAND OPEN WINDOW/ BIORHYTHM CHECK |
| | SUMMER | AIR CONDITIONER OFF | HEAT ACCORDIND TO SEASON | AIR CONDITIONER ON |
| | SUMMER | AIR CONDITIONER ON | AIR CONDITIONER TEMPERATURE SET HIGH | LOWER AIR CONDITIONER TEMPERATURE/ INCREASE WINDOW VOLUME |
| COLD | SUMMER | AIR CONDITIONER ON | COLD DUE TO STRONG WIND OF AIR CONDITIONER | INCREASE AIR CONDITIONER TEMPERATURE/ REDUCE WINDOW VOLUME |
| | SUMMER | AIR CONDITIONER OFF | TUEN ON HEATER SINCE COLD IS CAUSED BY ILLUNESS | HEATER ON |
| | WINTER | HEATER ON | WEAK HEATER | INCREASE HEATER TEMPERATURE/ INCREASE VOLUME |
| | WINTER | HEATER OFF | COLD DUE TO HEATER FAILURE | HEATER ON |

FIG. 28B

| MORPHOLOGICAL ANALYSIS RESULT | SURROUNDING ENVIRONMENT INFORMATION | VEHICLE STATE INFORMATION | IDENTIFY CAUSE (OPTION) | VEHICLE CONTROL |
|---|---|---|---|---|
| HEAD HURTS | WINTER | HEATER ON | HEADACHE DUE TO LACK OF AIR CIRCULATION | CONVERT AMBIENT AIR AND OPEN WINDOW |
| | WINTER | HEATER OFF | HEADACHE DUE TO COLD | HEATER ON |
| | SUMMER | AIR CONDITIONER OFF | HEADACHE DUE TO HEAT | AIR CONDITIONER ON |
| | SUMMER | AIR CONDITIONER ON | HEADACHE DUE TO AIR CONDITIONINGITIS | CHANGE WIND VOLUME AND DIRECTION |
| | HEAVY TRAFFIC | VEHICLE SPEED: 30KM OR LESS/ FRONT AND REAR CLEARANCE: LESS THAN 30CM | HEADACHE DUE TO HEAVY TRAFFIC | HUMOR / MUSIC PLAYBACK, ETC |
| UNCOMFORTABLE | WINTER /RAINING | | UNPLEASANT DUE TO HIGH HUMIDITY | EXECUTION OF DEFOGGING FUNCTION / DEHUMIDIFICATION FUNCTION |
| | SUMMER /SUNNY | | UNPLEASANT CAUSED BY SWEAT DUE TO SEASONAL CHARACTERISTICS | DRIVE AIR CONDITIONER AT THE LOWEST TEMPERATURE |
| | SUMMER /RAINING | | HIGH HUMIDITY IN VEHICLE | DRIVE AIR CONDITIONER DEHUMIDIFICATION MODE |

FIG. 51
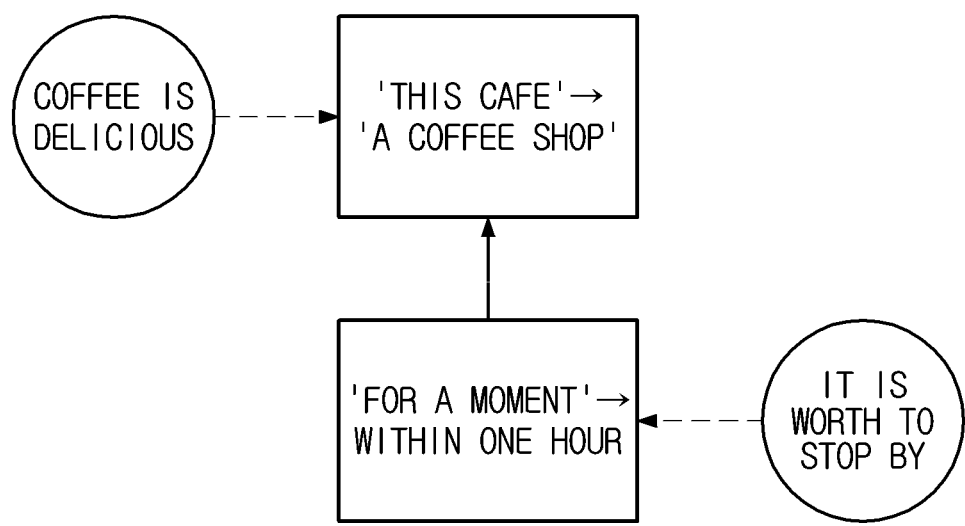
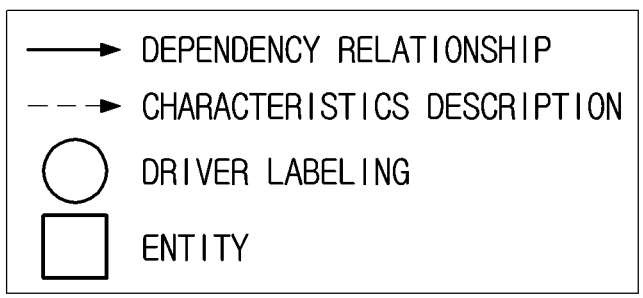

FIG. 52
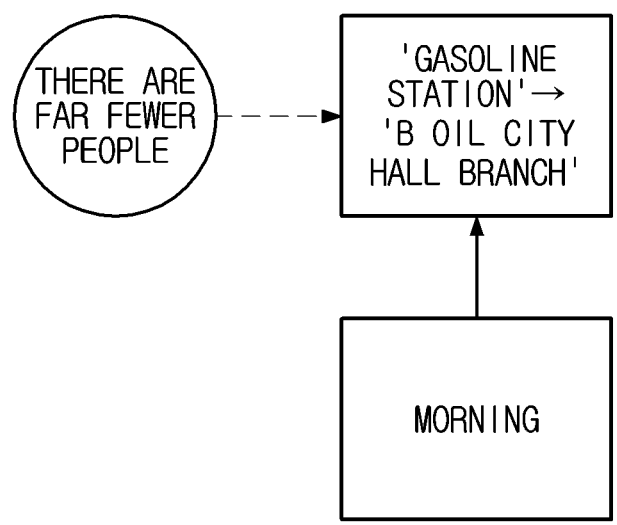
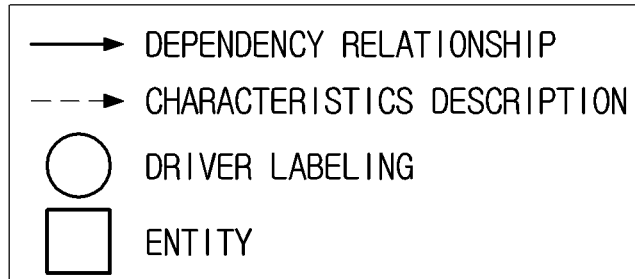

FIG. 53
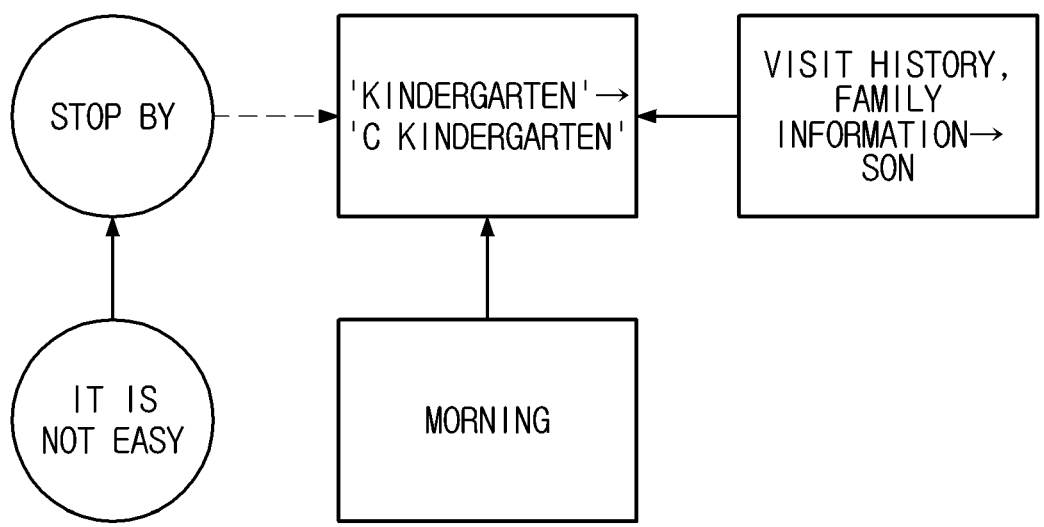
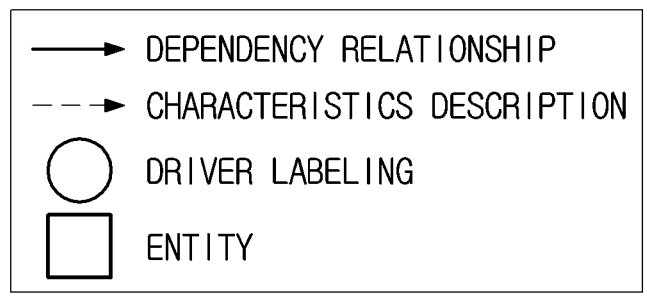

US 10,937,424 B2

DIALOGUE SYSTEM AND VEHICLE USING THE SAME

CROSS-REFERENCE TO RELATED APPLICATION(S)

The present application claims priority to and the benefit of Korean Patent Application No. 10-2018-0072107, filed on Jun. 22, 2018, which is incorporated by reference herein in its entirety.

TECHNICAL FIELD

The present disclosure relates to a dialogue system and a vehicle using the same.

BACKGROUND

The statement in this section merely provide background information related to the present disclosure and may not constitute prior art.

As for an audio-video-navigation (AVN) device of a vehicle or most mobile devices, when providing visual information to a user or receiving a user's input, a small screen and a small button provided therein may cause the user inconvenience.

Particularly, during the driving, when a user takes off his or her hand from a steering wheel or when a user looks up at another place for checking the visual information and operating devices, it may be a serious danger to the safe driving.

Therefore, when applying a dialogue system to a vehicle, it may be possible to provide services in more convenient and safer manner, wherein the dialogue system is capable of recognizing a user's intention through dialogue with the user and providing information or service necessary for the user.

SUMMARY

Therefore, it is an aspect of the present disclosure to provide a dialogue system capable of recording a speech when context information is uttered by a user in a vehicle, and labeling the speech, and then providing the labeling information by recognizing a context in the vehicle so that the user uses the labeling information as reference data to perform an appropriate action, and a vehicle using the same.

Additional aspects of the present disclosure will be set forth in part in the description which follows and, in part, will be obvious from the description, or may be learned by practice of the present disclosure.

In accordance with an aspect of the disclosure, a dialogue system includes an input processor configured to: recognize a user's speech as a text; assign a weight to the text based on objective context information when the user's speech is recognized; derive user labeling context information after verifying an entity of the text; and when a free utterance of the user or a designated entity utterance of the user occurs, acquire at least one of an action or a pre-utterance message comprising an utterance content to be output, wherein the action corresponds to the free utterance of the user or the designated entity utterance of the user; a storage configured to: store the user labeling context information; and manage the user labeling context information in a form that allows an entity ontology to be shared with other user; a dialogue manager, when the input processor acquires the action, configured to acquire an action parameter value that is used to perform the action from the storage; and a result processor, when the input processor acquires the action, configured to generate a dialogue response to perform the action by using the action parameter value.

The input processor may be configured to perform morphological analysis on the user's speech corresponding to a language; and convert the user's speech into the text.

The input processor may be configured to correct the text using a unique named entity recognition when a pre-stored unique named entity including a place, a name, a music, and a movie is stored in the storage.

The input processor may be configured to call objective context information including at least one of time information, place information, schedule, user's position in inside or outside of the vehicle or driving information from the storage; and assign the weight according to an importance and a specificity of the objective context information.

The input processor may be configured to search for an entity having a higher weight priority; derive the user labeling context information by using a word that describes a characteristics of the entity, as a label; and transmit the user labeling context information to the storage for constituting ontology.

The input processor may be configured to search for the entity included in a pre-stored ontology in the storage; derive the user labeling context information by using the word that describes the characteristics of the entity, as the label; and transmit the user labeling context information to the storage for constituting ontology.

The input processor may be configured to derive the user labeling context information by referring to pre-stored user information.

The pre-stored user information may include at least one of personal information, family, schedule, telephone number, preference, personality, educational history, occupation, current position, previous position or previous dialogue contents.

When storing the user labeling context information, the storage may be configured to store a labeling result and a frequency of referencing the entity ontology by searching for a corresponding entity in a pre-stored ontology structure.

The storage may be configured to set and store the labeling result and the frequency of referencing the entity ontology as one of sharing or non-sharing based on a user setting.

When the free utterance of the user or the designated entity utterance of the user is performed, the dialogue manager may be configured to acquire the user labeling context information corresponding to the free utterance of the user or the designated entity utterance of the user from the storage.

The input processor may be configured to determine whether a new route of the vehicle corresponds to a pre-utterance context that is identical to the objective context information; and when it is determined that the new route of the vehicle corresponds to the pre-utterance context, acquire entity ontology information corresponding to the objective context information as the pre-utterance message from the storage.

When the input processor acquires the pre-utterance message, the result processor may be configured to generate a dialogue response corresponding to the pre-utterance message.

The input processor may be configured to receive a user's utterance from a speech input device provided inside or outside of the vehicle when a trigger signal is generated or a button for the user's utterance is selected, wherein the trigger signal is generated when at least one of a predetermined speech or a predetermined gesture is performed by the user.

In accordance with another aspect of the disclosure, a vehicle includes a speech input device configured to receive a user's speech and transmit the user's speech when a trigger signal for an utterance is generated by a user; and a dialogue system configured to recognize the user's speech as a text; derive user labeling context information after verifying an entity of the text; store the user labeling context information in a form that allows an entity ontology to be shared with other user; and generate a dialogue response to perform a corresponding action when the user performs a free utterance or a designated entity utterance.

The speech input device may be configured to receive the user's speech when the trigger signal is generated or a button for a user's utterance is selected, wherein the trigger signal is generated when at least one of a predetermined speech or a predetermined gesture is performed by the user.

The dialogue system may include an input processor configured to recognize the user's speech as a text; assign a weight to the text based on objective context information when the user's speech is recognized; derive user labeling context information after verifying an entity of the text; and when a free utterance of the user or a designated entity utterance of the user occurs, acquire at least one of an action or a pre-utterance message including an utterance content to be output, wherein the action corresponds to the free utterance of the user or the designated entity utterance of the user; a storage configured to store the user labeling context information; and manage the user labeling context information in a form that allows an entity ontology to be shared with other user; a dialogue manager, when the input processor acquires the action, configured to acquire an action parameter value that is used to perform the action from the storage; and a result processor, when the input processor acquires the action, configured to generate a dialogue response to perform the action by using the action parameter value.

The input processor may be configured to call the objective context information including at least one of time information, place information, schedule, user's position in inside or outside of the vehicle or driving information from the storage; and assign the weight according to an importance and a specificity of the objective context information.

When storing the user labeling context information, the storage may be configured to store a labeling result and a frequency of referencing the entity ontology by searching for a corresponding entity in a pre-stored ontology structure.

When the free utterance of the user or the designated entity utterance of the user is performed, the dialogue manager may be configured to acquire the user labeling context information corresponding to the free utterance of the user or the designated entity utterance of the user from the storage.

The input processor may be configured to determine whether a new route of the vehicle corresponds to a pre-utterance context that is identical to the objective context information; and when it is determined that the new route of the vehicle corresponds to the pre-utterance context, acquire entity ontology information corresponding to the objective context information as the pre-utterance message from the storage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 18, 19A and 19B are control block diagrams illustrating a configuration of an input processor in the configuration of the dialogue system in detail;

FIG. 27 is a table illustrating an example of information stored in the ambiguity resolution information DB;

FIGS. 28A and 28B are tables illustrating a variety of examples in which the vehicle control is performed since the ambiguity solver resolves the ambiguity by referring to the ambiguity resolution information DB and extracting an action;

FIGS. 51 to 53 are views illustrating a method of acquiring user labeling context information.

Figure 1:
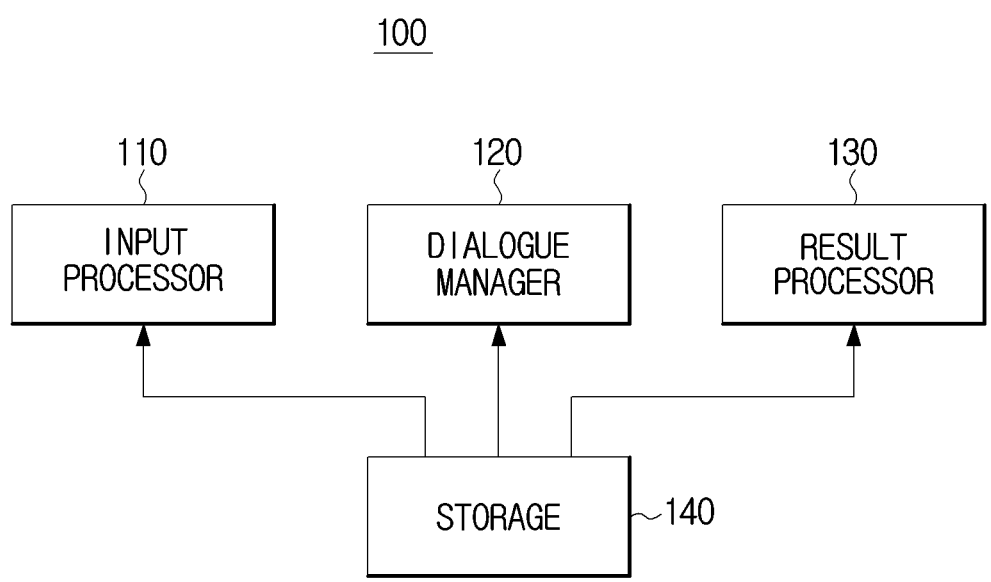
FIG. 1 is a control block diagram illustrating a dialogue system in accordance with an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

According to an embodiment, a dialogue system may be configured to recognize a user's intention by using the user's speech and another input except for the speech, and configured to provide a service which is appropriate or need for the user intention. The dialogue system may perform dialogue with a user by outputting a system utterance that is one of tools configured to provide the service or to recognize the user's intention, clearly.

According to embodiments, the service provided to a user may include all kinds of operations in accordance with a user's need or a user's intention, wherein the all kinds of operations may include providing information, controlling a vehicle, performing audio/video/navigation functions, and providing content from an external server.

According to an embodiment, the dialogue system provides a dialogue processing technology specialized for the vehicle environment so as to recognize the user's intention precisely in a special environment, i.e. a vehicle.

A gateway connecting the dialogue system to a user may be a vehicle or a mobile device connected to the vehicle. As mentioned below, the dialogue system may be provided in a vehicle or a remote server outside of the vehicle so as to send or receive data through the communication with the vehicle or the mobile device connected to the vehicle.

Some of components in the dialogue system may be provided in the vehicle and some thereof may be provided in the remote server. Therefore, the vehicle and the remote server may perform a part of the operation of the dialogue system.

FIG. 1 is a control block diagram illustrating a dialogue system in accordance with an embodiment of the present disclosure.

Referring to FIG. 1, a dialogue system 100 may include an input processor 110 processing a user input including a user's speech and an input except for the user speech, or an input including information related to a vehicle or information related to a user; a dialogue manager 120 recognizing a user's intention and a vehicle state using a result of the process of the input processor 110 and determining an action corresponding to the user's intention or the vehicle state; a result processor 130 providing a certain service according to an output result of the dialogue manager 120 or outputting a system utterance for continuing the dialogue; and a storage 140 storing a variety of information for the operation described later.

The input processor 110 may receive two kinds of input such as a user speech and an input except for the speech. The input except for the speech may include recognizing user's gesture, an input except for the user's speech input by an operation of an input device, vehicle state information indicating a vehicle state, driving environment information related to driving information of the vehicle and user information indicating user's state. In addition, other than the above mentioned information, information related to the user and the vehicle may be input to the input processor 110, as long as information is used for recognizing a user's intention or providing a service to a user or a vehicle. A user may include a driver and a passenger.

The input processor 110 converts a user's speech into an utterance in the text type by recognizing the user's speech and recognizes a user's intention by applying natural language understanding algorithm to the user utterance.

The input processor 110 collects information related to the vehicle state or the driving environment of the vehicle other than the user speech, and then understands the context using the collected information.

The input processor 110 transmits the user's intention, which is obtained by the natural language understanding technology, and the information related to the context to the dialogue manager 120.

The dialogue manager 120 determines an action corresponding to the user's intention or the current context based on the user's intention and the information related to the context transmitted from the input processor 110, and manages parameters that are needed to perform the corresponding action.

According to embodiments, the action may represent all kinds of actions for providing a certain service, and the kinds of the action may be determined in advance. As needed, providing a service may correspond to performing an action.

For example, actions such as a route guidance, a vehicle state check, and gasoline station recommendation may be pre-defined in a domain/action inference rule DB 141 (refer to FIG. 19A), and it may be possible to extract an action corresponding to a user's utterance, i.e., an action intended by a user, according to the stored inference rule. An action related to an event occurred in the vehicle may be pre-defined and then stored in a relational action DB 146b (refer to FIG. 21).

There is no limitation in the kinds of the action. If an action is allowed to be performed by the dialogue system 100 via the vehicle 200 or the mobile device 400, and is pre-defined while the inference rule thereof or a relation with other action/event is stored, the action may become the above mentioned action.

The dialogue manager 120 transmits information related to the determined action to the result processor 130.

The result processor 130 generates and outputs a dialogue response and a command that is needed to perform the transmitted action. The dialogue response may be output in text, image or audio type. When the command is output, a service such as vehicle control and external content provision, corresponding to the output command, may be performed.

The storage 140 stores a variety of information for the dialogue processing and the service provision. For example, the storage 140 may pre-store information related to domains, actions, speech acts and entity names used for the natural language understanding and a context understanding table used for understanding the context from the input information. In addition, the storage 140 may pre-store data detected by a sensor provided in the vehicle, information related to a user, and information needed for the action. A description of information stored in the storage 140 will be described later.

As mentioned above, the dialogue system 100 provides a dialogue processing technology that is specified for the vehicle environment. All or some of components of the dialogue system 100 may be contained in the vehicle. The dialogue system 100 may be provided in the remote server and the vehicle may act as a gateway between the dialogue system 100 and a user. In either case, the dialogue system 100 may be connected to the user via the vehicle or the mobile device connected to the vehicle.

Figure 2:
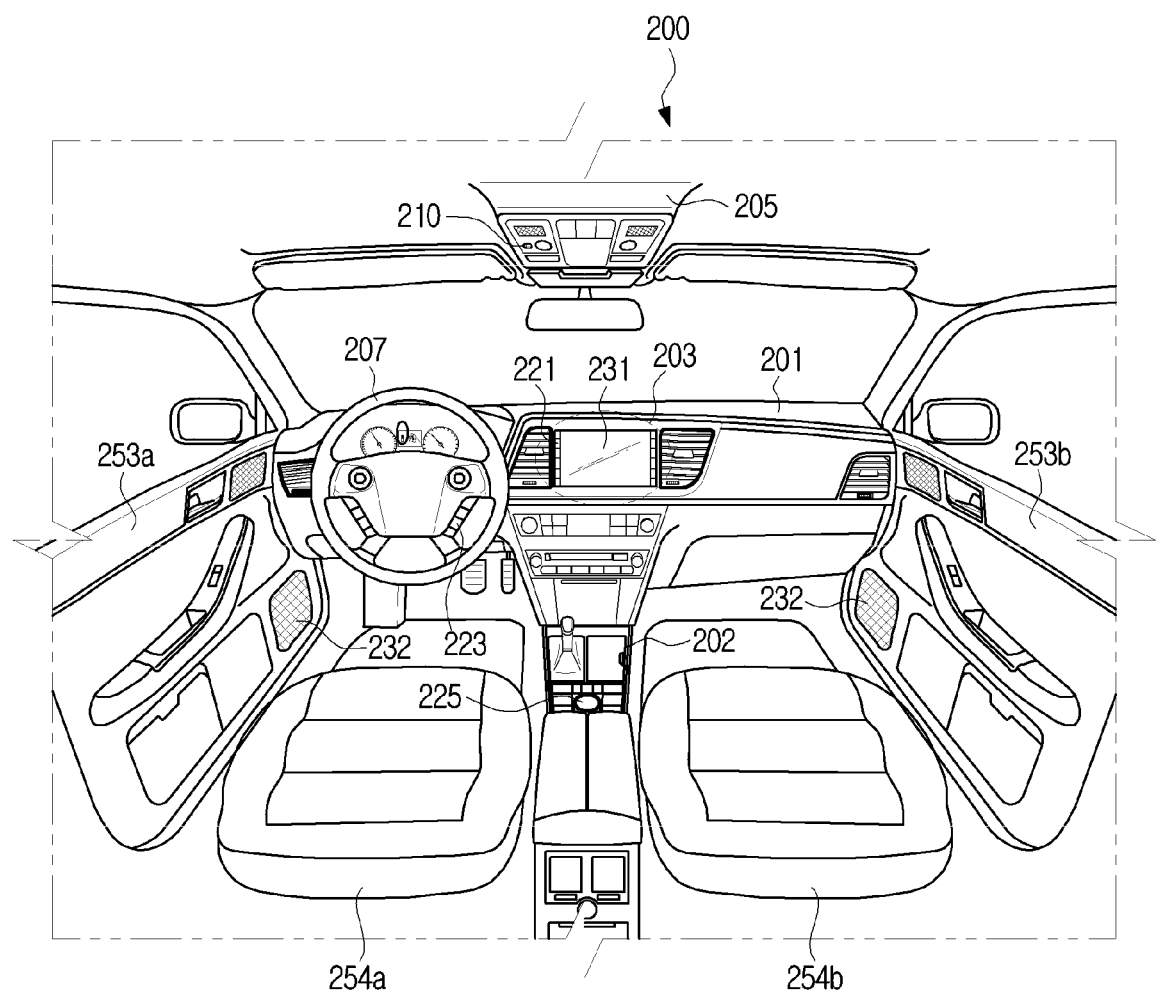
FIG. 2 is a view illustrating an interior of a vehicle.

FIG. 2 is a view illustrating an interior of a vehicle.

Referring to FIG. 2, a display 231 configured to display a screen required for the control of the vehicle including an audio function, a video function, a navigation function, and a calling function, and an input button 221 configured to receive a user's control command may be provided in a center fascia 203 corresponding to the center portion of a dashboard inside of the vehicle 200.

For the user's operation convenience, an input button may be provided in a steering wheel 207 and a jog shuttle 225 acting as an input button may be provided in a center console region 202 provided between a driver seat 254a and a passenger seat 254b.

A module including the display 231, the input button 221 and a processor controlling a variety of functions may correspond to an audio video navigation (AVN) terminal or a head unit.

The display 231 may be implemented by any one of various display devices, e.g., Liquid Crystal Display (LCD), Light Emitting Diode (LED), Plasma Display Panel (PDP), Organic Light Emitting Diode (OLED), and Cathode Ray Tube (CRT).

The input button 221 may be provided in a hard key type on an area adjacent to the display 231, as illustrated in FIG. 2. Alternatively, when the display 231 is implemented by a touch screen, the display 231 may perform a function of the input button 221.

The vehicle 200 may receive a user control command as a speech via a speech input device 210. The speech input device 210 may include a microphone configured to receive the sound and then covert the sound into an electrical signal.

For the effective speech input, the speech input device 210 may be mounted to a head lining 205, as illustrated in FIG. 2, but an embodiment of the vehicle 200 is not limited thereto. Therefore, the speech input device 210 may be mounted to the dashboard 201 or the steering wheel 207. In addition, the speech input device 210 may be mounted to any position as long as a position is appropriate for receiving the user's speech.

In the inside of the vehicle 200, a speaker 232 configured to perform dialogue with a user or configured to output a sound required to provide the service desired by the user may be provided. For example, the speaker 232 may be provided inside of the driver's seat door 253a and the passenger-seat door 253b.

The speaker 232 may output a speech for navigation route guidance, a sound or a speech contained in the audio and video contents, a speech for providing information or service desired by the user, and a system utterance generated as a response to the user's utterance.

According to an embodiment, the dialogue system 100 provides a service that is appropriate for the user's lifestyle by using the dialogue processing technologies appropriate for the vehicle environments, and the dialogue system 100 may implement a new service using technologies such as connected car, Internet of Things (IoT), and artificial intelligence (AI).

When applying the dialogue processing technologies appropriate for the vehicle environments, such as the dialogue system 100 according to an embodiment, it may be easily recognize and respond to a key context during a driver directly drives the vehicle. It may be possible to provide a service by applying a weight to a parameter affecting the driving, such as gasoline shortages and drowsy driving, or it may be possible to easily obtain information, e.g., a driving time and destination information, which is needed for the service, based on a condition in which the vehicle moves to the destination in most cases.

In addition, it may be possible to easily implement intelligent services configured to provide a function by recognizing a driver's intention. This is because priority is given to real-time information and action in the driver's direct driving situation. For example, when the driver searches for a gasoline station while driving, it may be interpreted as an intention that the driver will go to the gasoline station. However, when the driver searches for a gasoline station in the place not the vehicle, it may be interpreted as another intention, such as searching for location information inquiry, phone number inquiry and price inquiry other than the intention that the driver will go to the gasoline station.

Further, although the vehicle is a limited space, various situations may occur therein. For example, the drive may utilize the dialogue system 100 in a variety of situations, e.g., driving a vehicle having an unfamiliar interface, such as a rent car, using chauffeur service, a vehicle management situation such as washing vehicle, a situation in which a baby is on board, and a situation of visiting a certain destination.

In addition, a variety of services and dialogue situations may occur in each stages forming the vehicle driving and the pre and post stage of the driving, e.g., a vehicle check stage, a start preparing stage, a driving stage, and a parking stage.

Particularly, the driver may utilize the dialogue system 100 in a variety of situations, e.g., a situation in which a driver does not know how to deal with problems, a situation in which the vehicle is associated with a variety of external devices, a situation of checking a driving habit, e.g., gasoline mileage, and a situation of using safety support function, e.g., a smart cruise control, a navigation operation situation, a drowsy driving situation, a situation of driving along the same route every day, and a situation of checking whether the place is available for parking.

Figure 3:
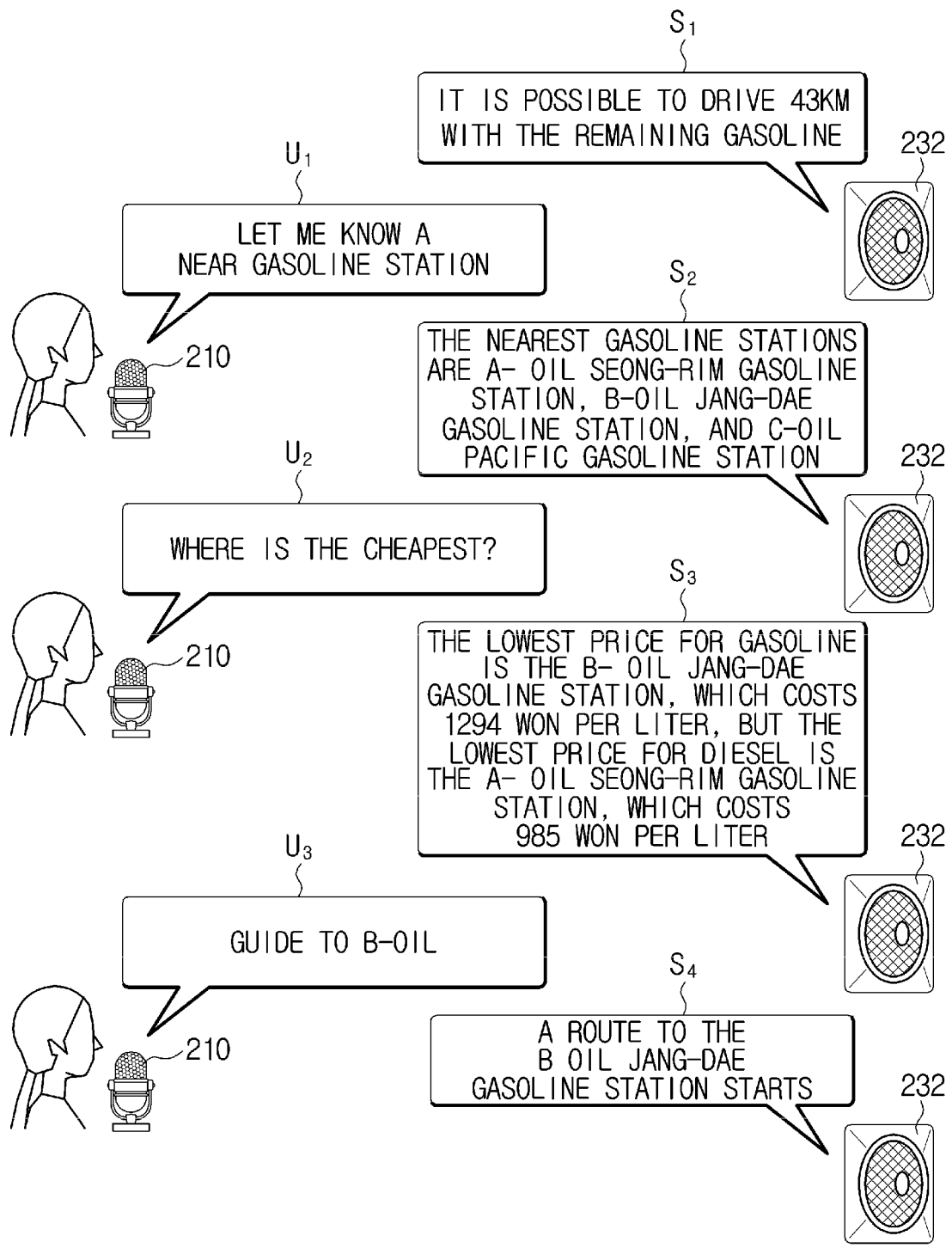
FIGS. 3 to 5 are views illustrating an example of dialogue exchanged between a dialogue system and a driver.
Figure 4:
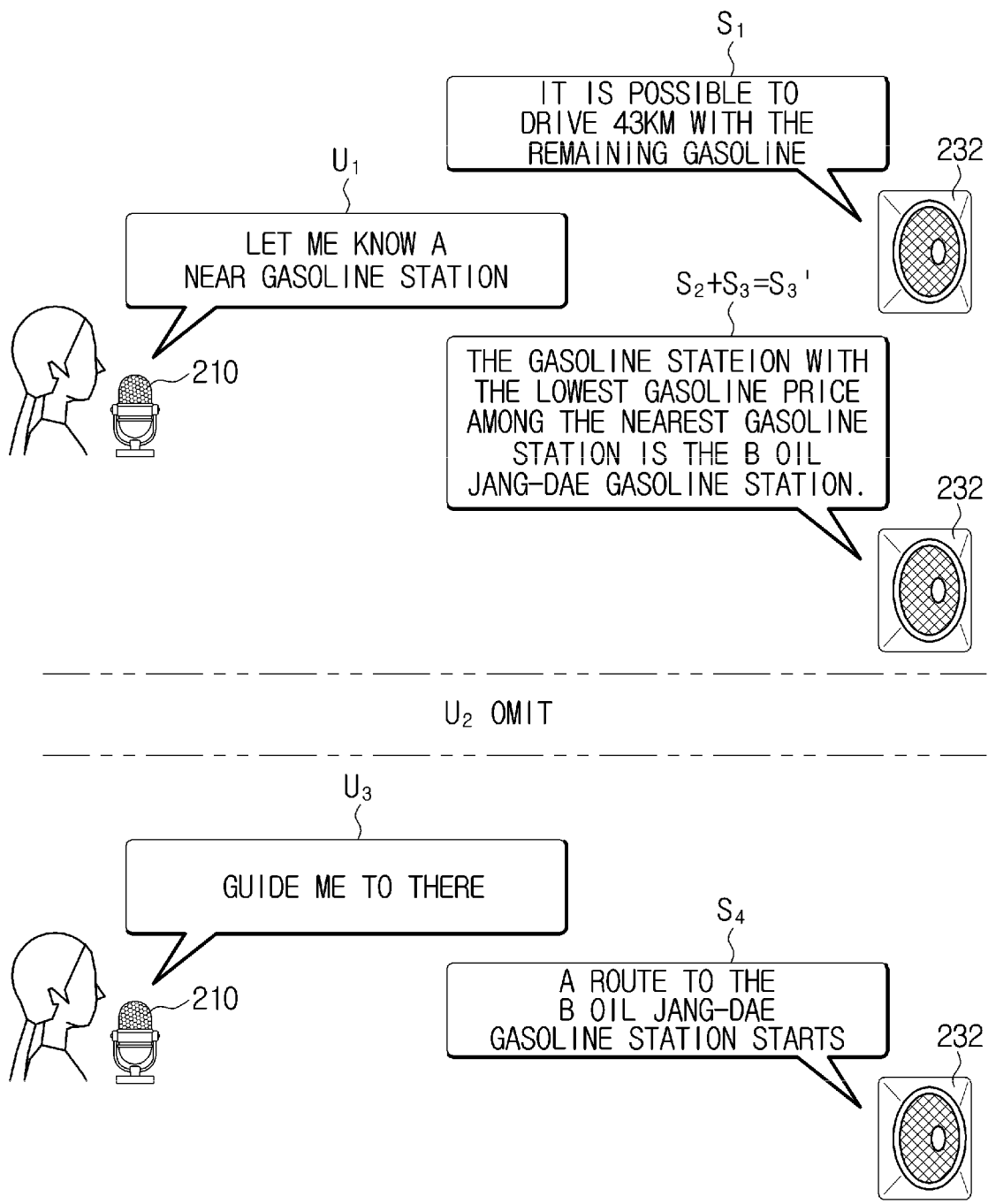
Figure 5:
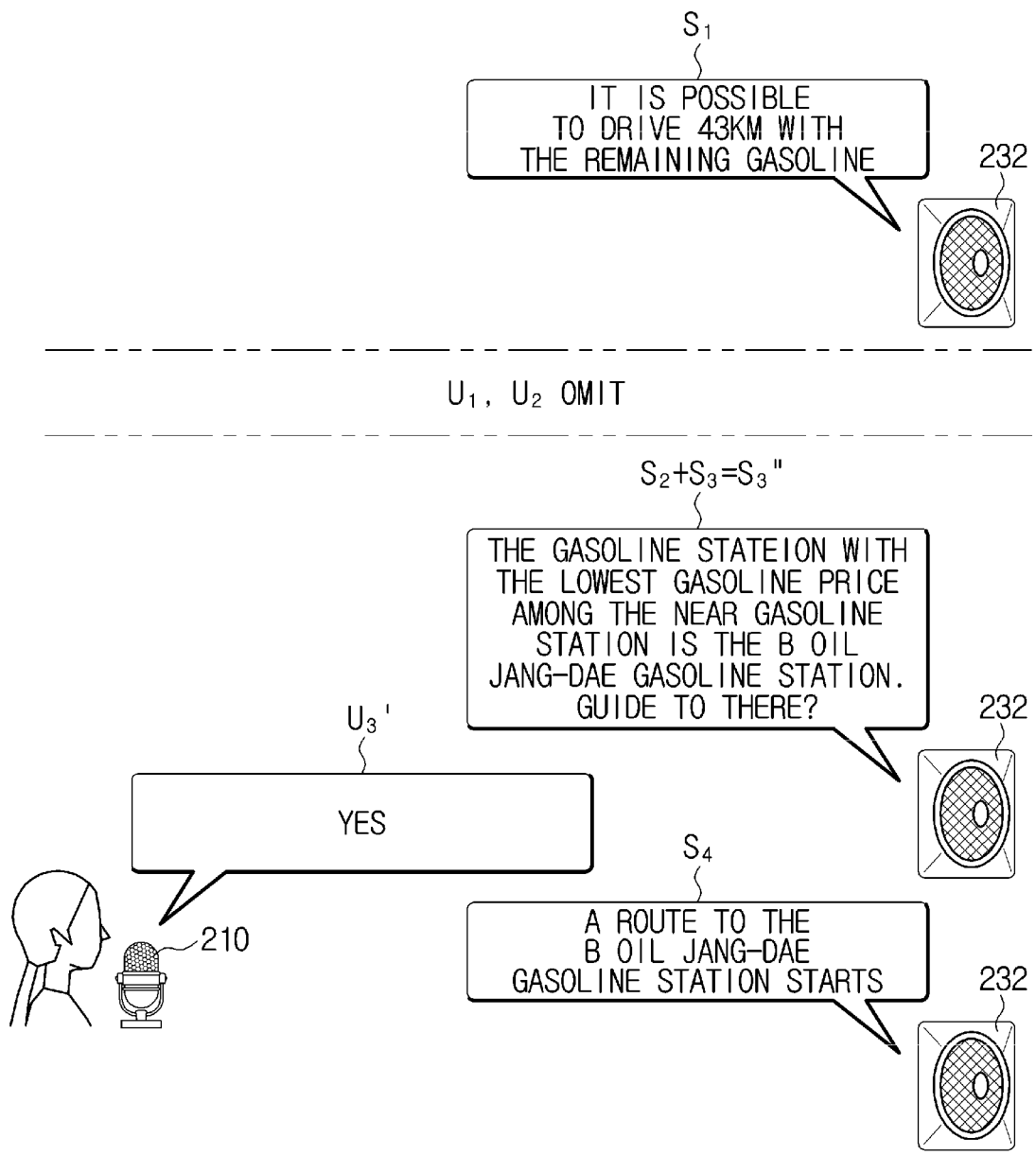

FIGS. 3 to 5 are views illustrating an example of dialogue that generates between a dialogue system and a driver.

Referring to FIG. 3, although the driver does not input an utterance for asking the current remaining amount of gasoline or for requesting a gasoline station guidance, the dialogue system 100 may identify the current remaining gasoline by itself and when the identified remaining gasoline is less than a predetermined value, the dialogue system 100 may first output an utterance providing information related to the current remaining gasoline (S1: it is possible to drive 43 km with the remaining gasoline).

In response to the utterance, the driver may input an utterance asking a near gasoline station to receive a route guidance (U1: let me know a near gasoline station), and the dialogue system 100 may output an utterance providing information related to the nearest gasoline station from the current position (S2: the nearest gasoline stations are A—oil Seong-rim gasoline station, B—oil Jang-dae gasoline station, and C—oil Pacific gasoline station.

The driver may additionally input an utterance asking the gasoline price (U2: where is the cheapest?), and the dialogue system 100 may output an utterance providing information related to the price by the fuel type (the lowest price for gasoline is the B oil Jang-dae gasoline station, which costs 1294 won per liter, while the lowest price for diesel is the A oil Seong-rim gasoline station, which costs 985 won per liter).

The driver may input an utterance asking a guidance to the B oil Jang-dae gasoline station (U3), and the dialogue system 100 may output an utterance indicating that the guidance starts to the gasoline station selected by the driver (S4: a route to the B oil Jang-dae gasoline station starts).

That is, the dialogue system 100 may determine that the current needed service is the gasoline guidance service, based on the state information of the vehicle received via the input processor 110, and output a pre-utterance to provide the need service. In addition, the driver may be guided to the near gasoline station selling the fuel type of the current vehicle at the lowest price, through a dialogue with the dialogue system 100. According to an embodiment, it is assumed that "pre-utterance" represents an utterance that is firstly output from the dialogue system 100 before a user utters.

Meanwhile, when selecting the gasoline station in the example as illustrated in FIG. 3, the dialogue system 100 may omit some questions and directly provide information and thus it may be possible to reduce the steps and time of the dialogue.

For example, the dialogue system 100 may pre-recognize that the fuel type of the current vehicle is gasoline and criteria of the driver for selecting a gasoline station is price. Information related to the fuel type of the vehicle may be acquired from the vehicle and the criteria of the driver for selecting a gasoline station may be pre-input from a driver or acquired by learning the driver dialogue history or the gasoline station selection history. The information may be pre-stored in the storage 140.

In this case, the dialogue system 100 may proactively output an utterance (S2+S3=S3') providing information related to the fuel price, particularly the gasoline price which is the fuel type of the current vehicle without inputting the utterance (U2) for requesting information about the fuel price by the driver, i.e., U2 is omitted, as illustrated in FIG. 4.

The driver may omit the utterance (U2) for requesting information about the fuel price and the response of the dialogue system 100 may be formed such that the utterance (S2) guiding the near gasoline station and the utterance (S3) guiding the fuel price are integrated as a single response, so as to reduce the steps and time of the dialogue.

In addition, the dialogue system 100 may recognize that the driver's intention is searching for the gasoline station, by itself, based on the fact that the driver asks the current remaining amount of gasoline.

In this case, as illustrated in FIG. 5, although the driver does not input the utterance (U1) asking the near gasoline station, i.e., U1 is omitted, the dialogue system 100 may proactively output an utterance (S2+S3=S3") providing information related to the fuel price.

In a state in which the nearest gasoline station from the current position and the gasoline station providing the lowest fuel price is the same gasoline station, an utterance (S3") providing information related to the fuel price may include a question for asking whether to guide to the corresponding gasoline station. Therefore, the user may request the route guidance to the corresponding gasoline station by simply inputting an utterance agreeing with the question of the dialogue system 100 (U3': yes), without inputting a particular utterance for asking a guidance to a certain gasoline station.

As mentioned above, the dialogue system 100 may recognize the user's real intention and proactively provide information corresponding to the intention by considering a content, which is not uttered by the user, based on pre-obtained information. Therefore, it may be possible to reduce the dialogue steps and time for providing the service desired by the user.

Figure 6:
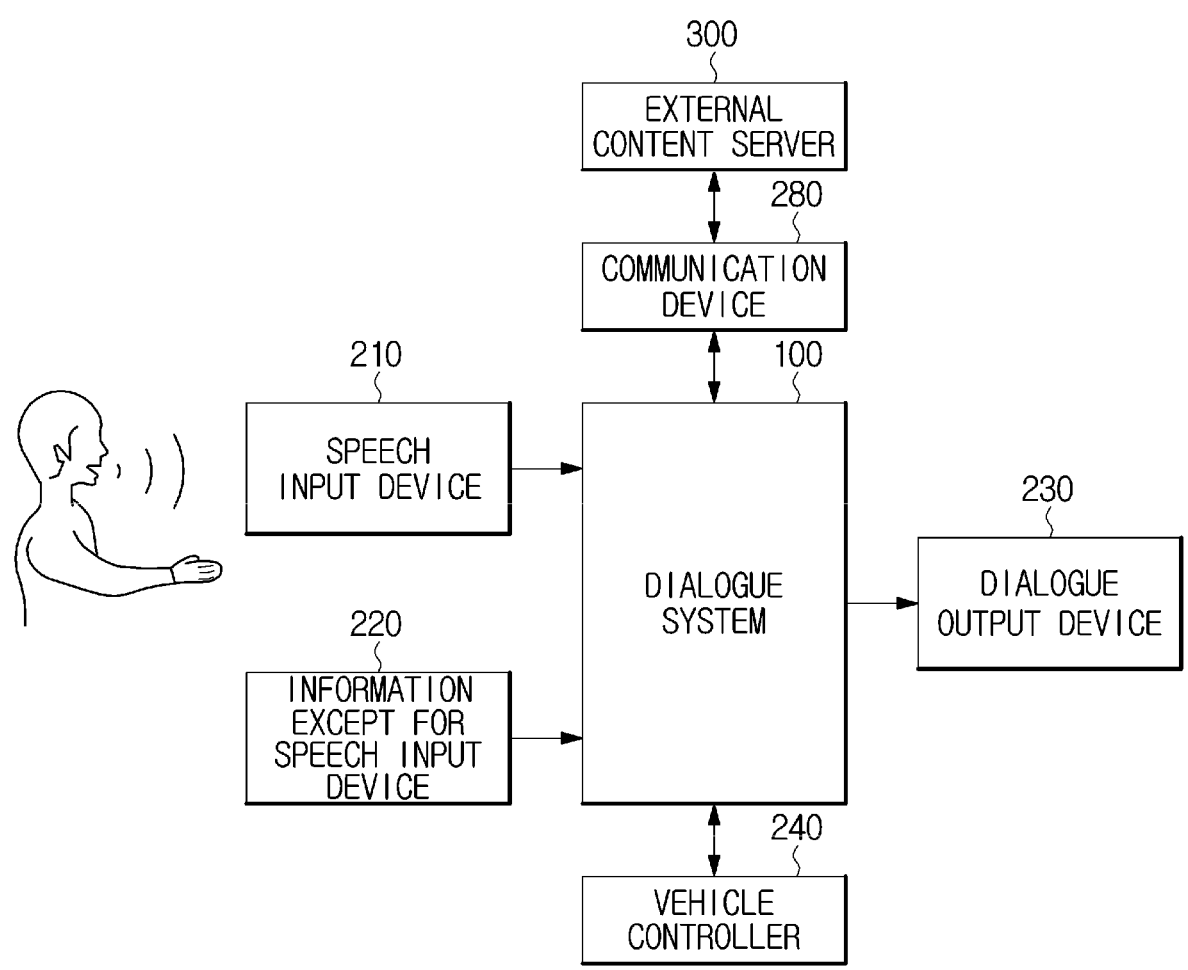
FIGS. 6 and 7 are control block diagrams schematically illustrating a connection between the dialogue system and components of the vehicle.
Figure 7:
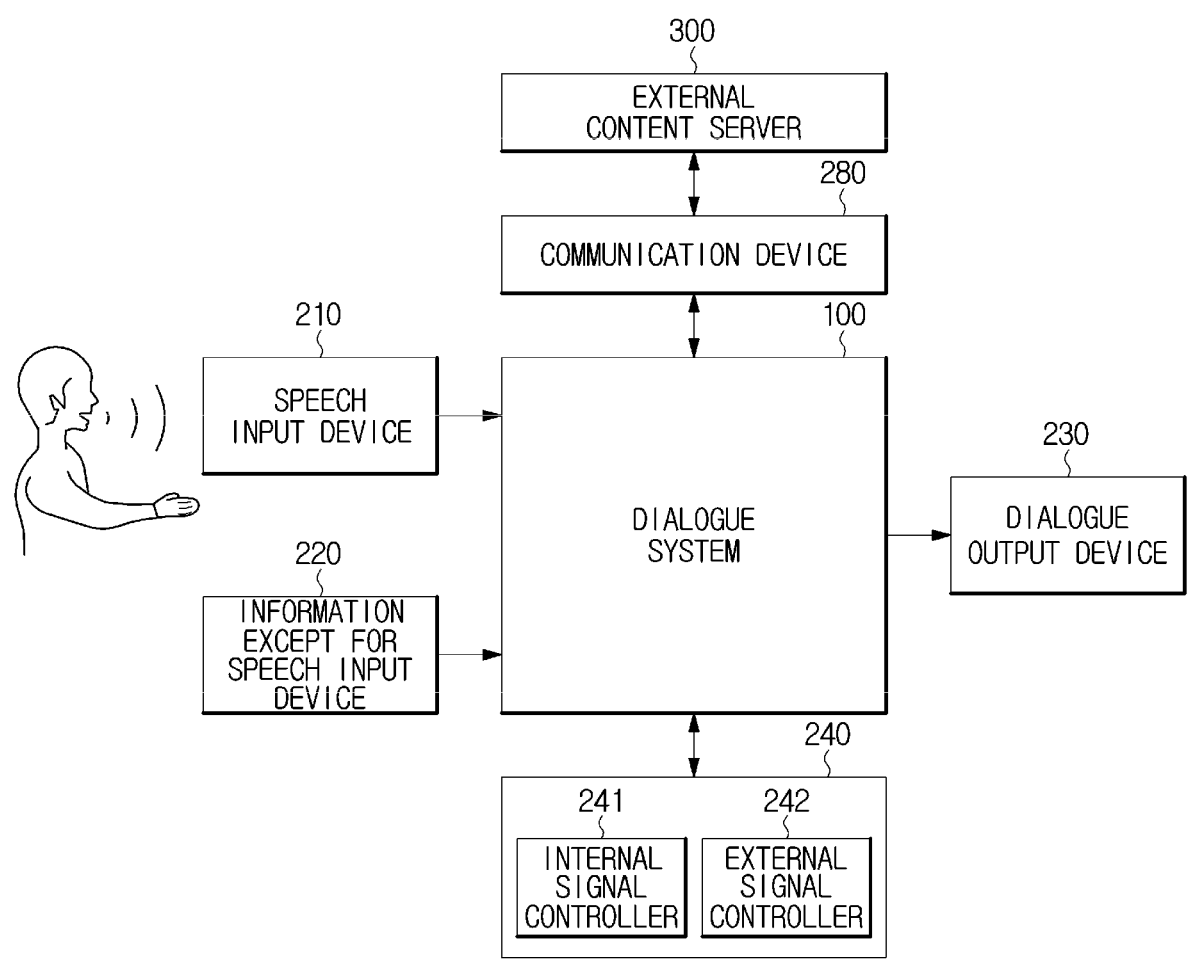

FIGS. 6 and 7 are control block diagrams schematically illustrating a connection between the dialogue system and the components of the vehicle.

Referring to FIG. 6, a user's speech input to the dialogue system 100 may input via the speech input device 210 provided in the vehicle 200. As illustrated in FIG. 2, the speech input device 210 may include a microphone provided inside of the vehicle 200.

The input except for the speech in the user input may be input through an information except for speech input device 220. The information except for speech input device 220 may include an input button 221 and 223 and the jog shuttle 225 for receiving a command through the operation of the user.

The information except for speech input device 220 may include a camera imaging a user. Through an image imaged by the camera, it is possible to recognize a user's gesture, expression or sight direction which is used as a tool of command input. Alternatively, it is possible to recognize the user's state (drowsy state, etc.) through the image imaged by the camera.

Information related to the vehicle may be input into the dialogue system 100 via a vehicle controller 240. Information related to the vehicle may include vehicle state information or surroundings environment information acquired by a variety of sensors provided in the vehicle 200, and information which is initially stored in the vehicle 200, e.g. the fuel type of the vehicle.

The dialogue system 100 may recognize the user's intention and context using the user's speech input via the speech input device 210, the input except for the user's speech, input via the information except for speech input device 220, and a variety of information input via the vehicle controller 240. The dialogue system 100 outputs a response to perform an action corresponding to the user's intention.

A dialogue output device 230 is a device configured to provide an output in a visual, auditory or tactile manner, to a talker. The dialogue output device 230 may include the display 231 and the speaker 232 provided in the vehicle 200. The display 231 and the speaker 232 may output a response to a user's utterance, a question about a user, or information requested by a user, in the visual or auditory manner. In addition, it may be possible to output a vibration by installing a vibrator in the steering wheel 207.

Further, according to the response output from the dialogue system 100, the vehicle controller 240 may control the vehicle 200 to perform an action corresponding to the user's intention or the current situation.

Meanwhile, as well as the information acquired by the sensor provided in the vehicle 200, the vehicle 200 may collect information acquired from an external content server 300 or an external device via the communication device 280, e.g., driving environment information and user information such as traffic conditions, weather, temperature, passenger information and driver personal information, and then the vehicle 200 may transmit the information to the dialogue system 100.

As illustrated in FIG. 7, information acquired by the sensor provided in the vehicle 200, e.g., a remaining amount of fuel, an amount of rain, a rain speed, surrounding obstacle information, a speed, an engine temperature, a tire pressure, current position, may be input to the dialogue system 100 via an internal signal controller 241.

The driving environment information acquired from the outside via Vehicle to Everything (V2X) communication may be input to the dialogue system 100 via an external signal controller 242. The V2X may represent that a vehicle exchanges and shares a variety of useful information, e.g. traffic condition, by communicating with a road infrastructure and other vehicle during driving.

The V2X communication may include Vehicle-to Infrastructure (V2I) communication, Vehicle-to-Vehicle (V2V) communication, and Vehicle-to-Nomadic devices (V2N) communication. Therefore, by using the V2X communication, it may be possible to send and receive information such as traffic information about the front side or an access of another vehicle or risk of collision with another vehicle through the communication directly performed between vehicles or the communication with the infrastructure installed in the road and thus it may be possible to inform a driver of the information.

Therefore, the driving environment information input to the dialogue system 100 via the external signal controller 242 may include traffic information about the front side, access information of adjacent vehicle, collision warning with another vehicle, real time traffic conditions, unexpected conditions, and a traffic flow control state.

Although not shown in the drawings, signals obtained via V2X may also be input to the vehicle 200 via the communication device 280.

The vehicle controller 240 may include a memory in which a program for performing the above-described operation and the operation described later is stored, and a processor for executing the stored program. At least one memory and one processor may be provided, and when a plurality of memory and processors are provided, they may be integrated on one chip or physically separated.

In addition, the internal signal controller 241 and the external signal controller 242 may be implemented by the same processor and memory or by a separate processor and memory.

Figure 8:
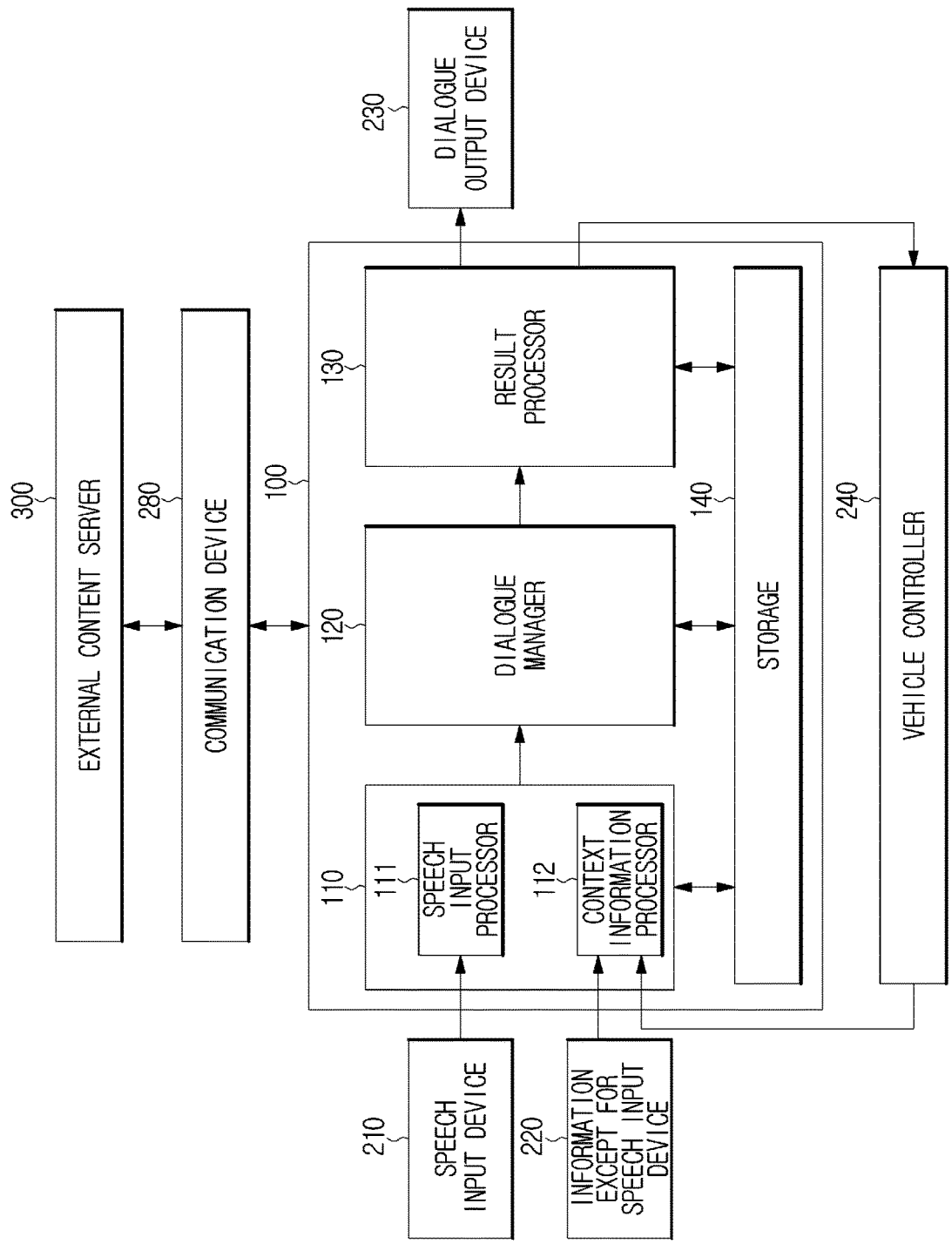
FIGS. 8 and 9 are control block diagrams schematically illustrating a connection between components of the dialogue system and the components of the vehicle.
Figure 9:
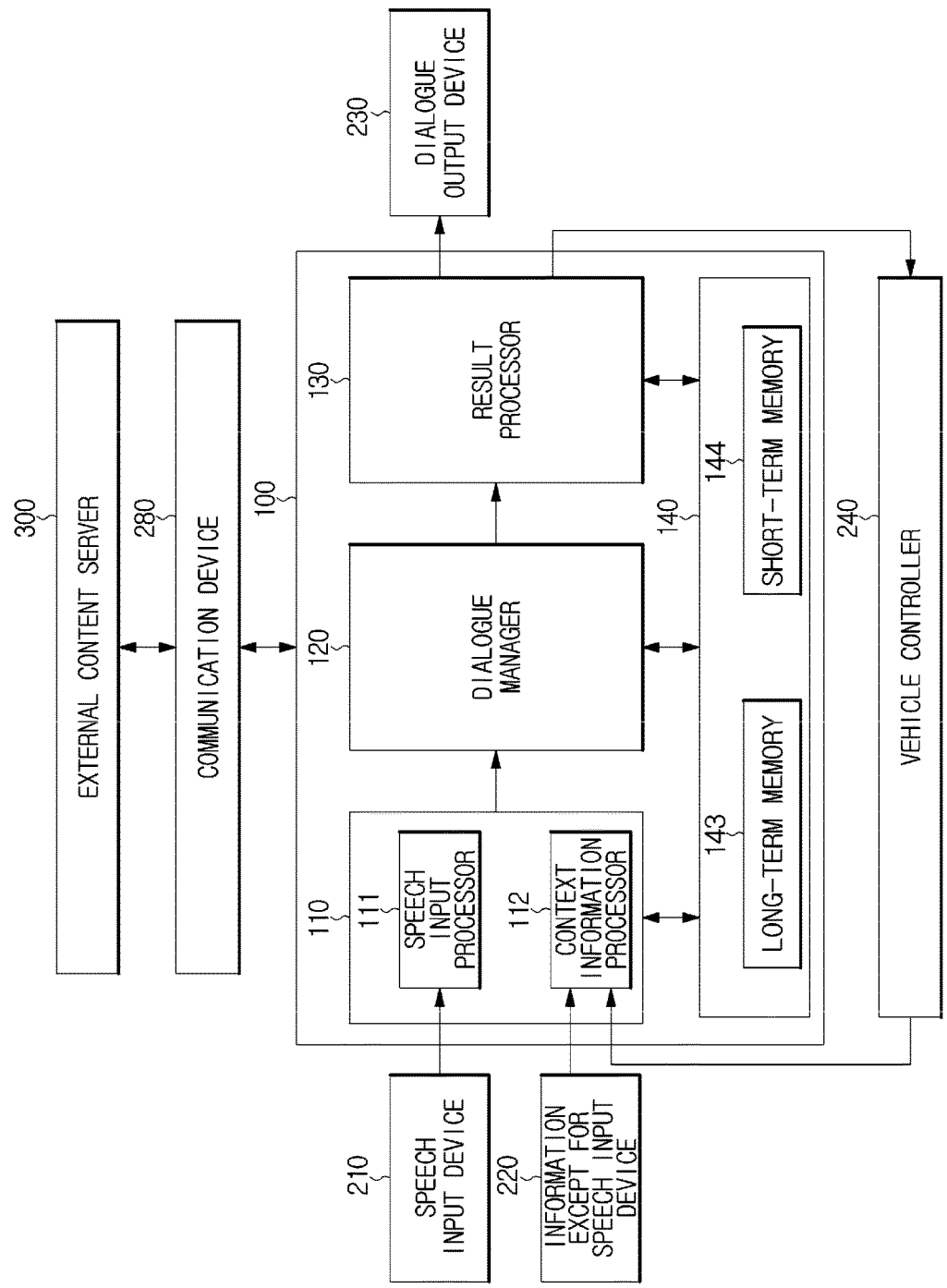

FIGS. 8 and 9 are control block diagrams schematically illustrating a connection between the dialogue system and the components of the vehicle.

Referring to FIG. 8, the user's speech transmitted from the speech input device 210 may be input to a speech input processor 111 provided in the input processor 110, the input except for the user's speech transmitted from the information except for speech input device 220 may be input to a context information processor 112 provided in the input processor 110.

In addition, information that is input via the internal signal controller 241 or the external signal controller 242 is input to the context information processor 112 provided in the input processor 110.

The context information input to the context information processor 112 may include the vehicle state information, the driving environment information and the user information, which is input from the information except for speech input device 220 and the vehicle controller 240. The context information processor 112 may identify the context based on the input context information. The dialogue system 100 may precisely recognize the user's intention or efficiently find out a service needed for the user, by identifying the context.

A response output from the result processor 130 may input to the dialogue output device 230 or the vehicle controller 240 to allow the vehicle 200 to provide the service needed for the user. In addition, the response may be transmitted to the external content server 300 to request the needed service.

The vehicle state information, the driving environment information and the user information transmitted from the vehicle controller 240 may be stored in the storage 140.

Referring to FIG. 9, the storage 140 may include a long-term memory 143 and a short-term memory 144. Data stored in the storage 140 may be classified into the short term memory and the long term memory according to the importance and the persistence of the data, and the designer's intention.

The short-term memory 144 may store the dialogue that is previously performed. The previous dialogue may be a dialogue performed within a reference time from the current. Alternatively, the dialogue may be continuously stored until the capacity of the utterance content between the user and the dialogue system 100 becomes a reference value.

For example, when it is time for meal, the vehicle 200 may output an utterance asking whether to guide a restaurant, via the speaker 232. Whether it is time for meal may be identified based on whether a current time is within a predetermined meal time range. When the user utters a content "let me know a restaurant near Gangnam Station" or a content "let me know a restaurant" and when the current position of the vehicle 200 is around Gangnam Station, the dialogue system 100 may search for restaurants near Gangnam Station through the external content server 300 and then provide information related to the searched restaurant near Gangnam Station, to the user. An example of providing information, the dialogue system 100 may display a list of the restaurant on the display 231 and when the user utters "first", the dialogue content related to the request of the restaurant to the selection of the restaurant may be stored in the short-term memory 144.

Alternatively, not only the entire dialogue contents are stored, but also specific information contained in the dialogue contents may be stored. For example, it is possible to store the first restaurant of the restaurant list in the short-term memory 144 or the long-term memory 143 as a restaurant selected by the user.

When the user asks "How is the weather?" to the dialogue system 100 after the dialogue about the restaurant near Gangnam Station, the dialogue system 100 may assume that a user's interest location is Gangnam Station, from the dialogue stored in the short-term memory 144 and then output a response "it is raining in Gangnam Station"

Next, when the user utters "recommend a menu of the restaurant", the dialogue system 100 may assume that "the restaurant" represents a restaurant near Gangnam Station, from the dialogue stored in the short term memory, and acquire information related to a recommend menu of the corresponding restaurant through the service provided from the external content server 300. Accordingly, the dialogue system 100 may output the response "noodle is the best menu in the restaurant."

The long-term memory 143 may store data according to the presence of the persistence of the data. For example, the long-term memory 143 may determine that the persistence of the data such as position of interest (POI) information, e.g., family and friend telephone numbers and home or company, and user preferences for certain parameters is secured and then store the data therein. In contrast, when it is determined that the persistence of the data is not secured, the data may be stored in the short-term memory 144.

For example, the current location of the user may be a temporary data and thus stored in the short-term memory 144 and the user's preference for the restaurant may be a persistent data which is available later and thus stored in the long-term memory 143.

When the user utters "is there any restaurant around here?", the dialogue system 100 may recognize the current location of the user and figure out that the user prefers the Chinese restaurant, from the long-term memory 143. Therefore, the dialogue system 100 may recommend the list of user's favorite Chinese restaurant around the current location, by using the external content.

In addition, the dialogue system 100 may proactively provide service and information to the user using the data stored in the long-term memory 143 and the short-term memory 144.

For example, information related to the user's house may be stored in the long-term memory 143. The dialogue system 100 may acquire the information related to the user's house, from the external content server 300, and then provide information indicating "a water outage is expected this Friday due to the cleaning of Apartment"

Information related to a vehicle battery state may be stored in the short-term memory 144. The dialogue system 100 may analyze the vehicle battery state stored in the short-term memory 144 and then provide information indicating "the battery is in the bad condition. Have it repaired before winter."

Figure 10:
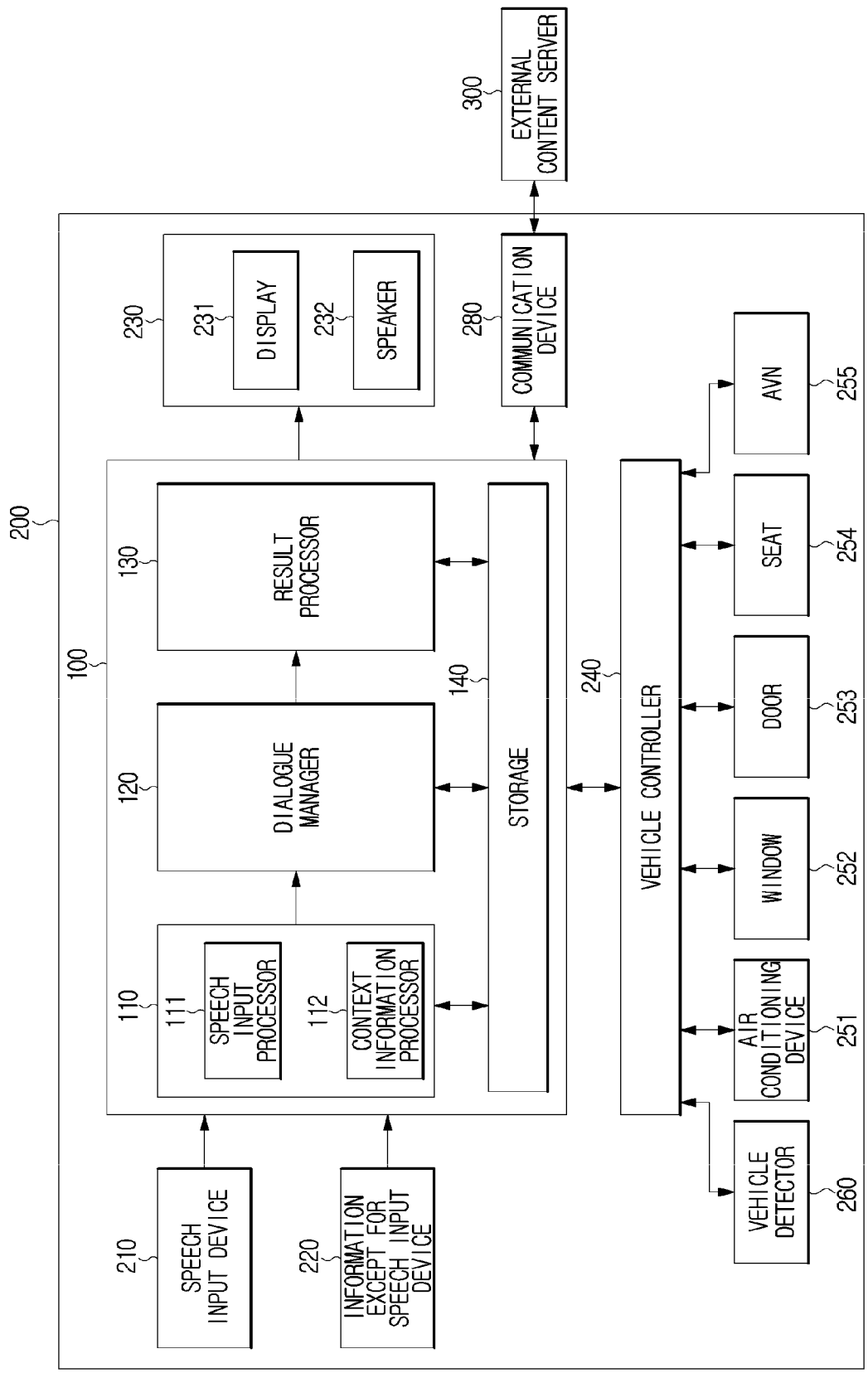
FIG. 10 is a control block diagram illustrating a vehicle independent method in which a dialogue system is provided in a vehicle.

FIG. 10 is a control block diagram illustrating a vehicle independent method in which a dialogue system is provided in a vehicle.

According to the vehicle independent method, the dialogue system 100 having the input processor 110, the dialogue manager 120, the result processor 130 and the storage 140 may be contained in the vehicle 200, as illustrated in FIG. 10.

When the dialogue system 100 is contained in the vehicle 200, the vehicle 200 may process dialogue with a user, by itself and provide a service needed for the user. However, the information needed for the dialogue processing and service provision may be brought from the external content server 300.

The vehicle state information or the driving environment information, e.g., an remaining amount of fuel, an amount of rain, a rain speed, surrounding obstacle information, a speed, an engine temperature, a tire pressure, current position, which is detected by a vehicle detector 260 may be input to the dialogue system 100 via the vehicle controller 240.

According to a response output from the dialogue system 100, the vehicle controller 240 may control the air conditioning device 251, the window 252, the door 253, the seat 254 or the AVN 255 provided in the vehicle 200.

For example, when the dialogue system 100 determines that the user's intention or the service needed for the user is to lower the temperature inside the vehicle 200 and then generates and outputs a corresponding command, the vehicle controller 240 may lower the temperature inside the vehicle 200 by controlling the air conditioner 251.

For another example, when the dialogue system 100 determines that the user's intention or the service needed for the user is to raise the driver's seat window 252a and generates and outputs a corresponding command, the vehicle controller 240 may raise the driver's seat window 252a by controlling the window 252.

For another example, when the dialogue system 100 determines that the user's intention or the service needed for the user is to guide a route to a certain destination and generates and outputs a corresponding command, the vehicle controller 240 may perform a route guidance by controlling the AVN 255. As needed, the communication device 280 may bring map data, and POI information from the external content server 300 and then use the information for the service provision.

Figure 11:
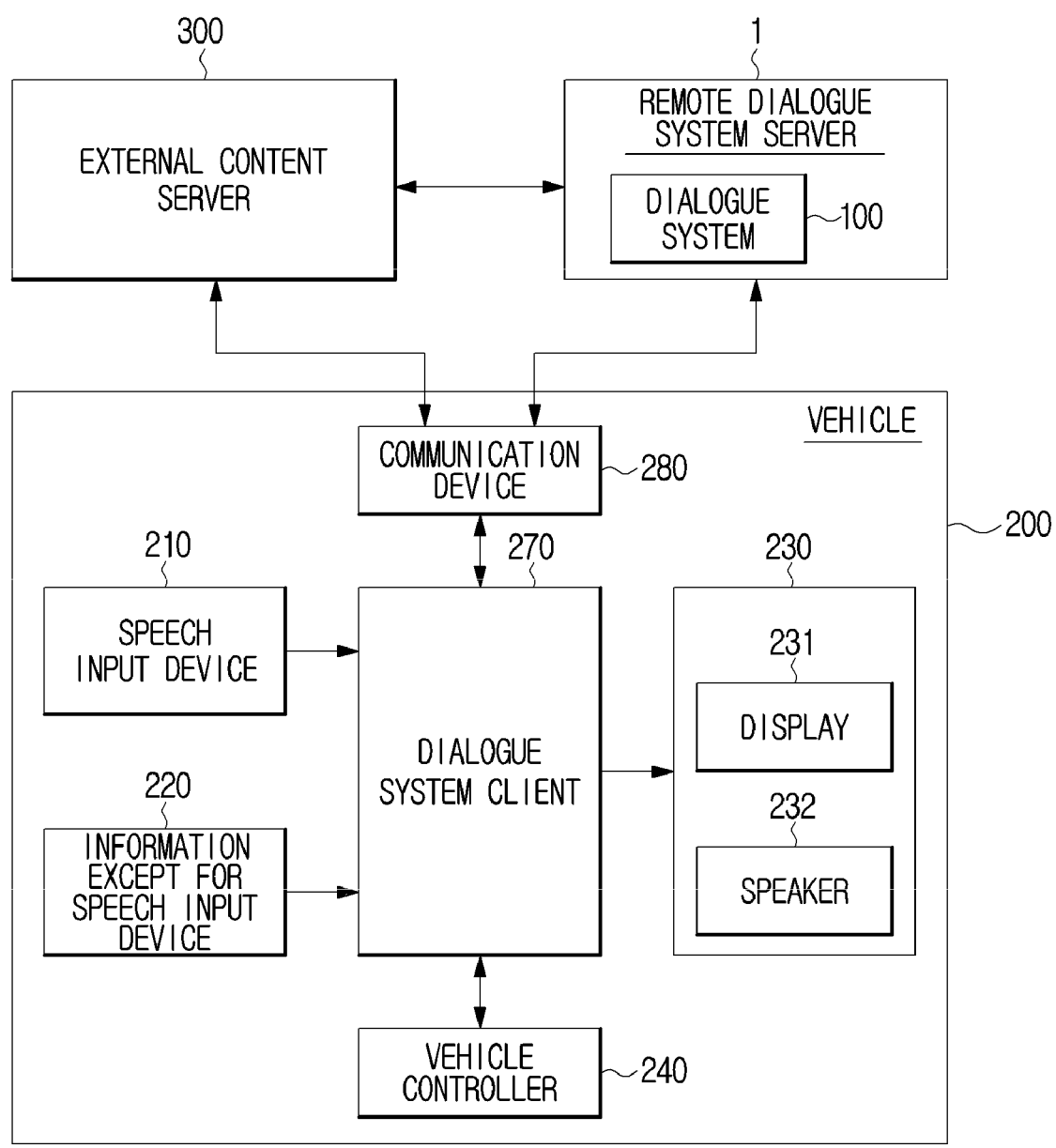
FIGS. 11 and 12 are control block diagrams illustrating a vehicle gateway method in which a dialogue system is provided in a remote server and a vehicle acts as a gateway connecting a user to the dialogue system.
Figure 12:
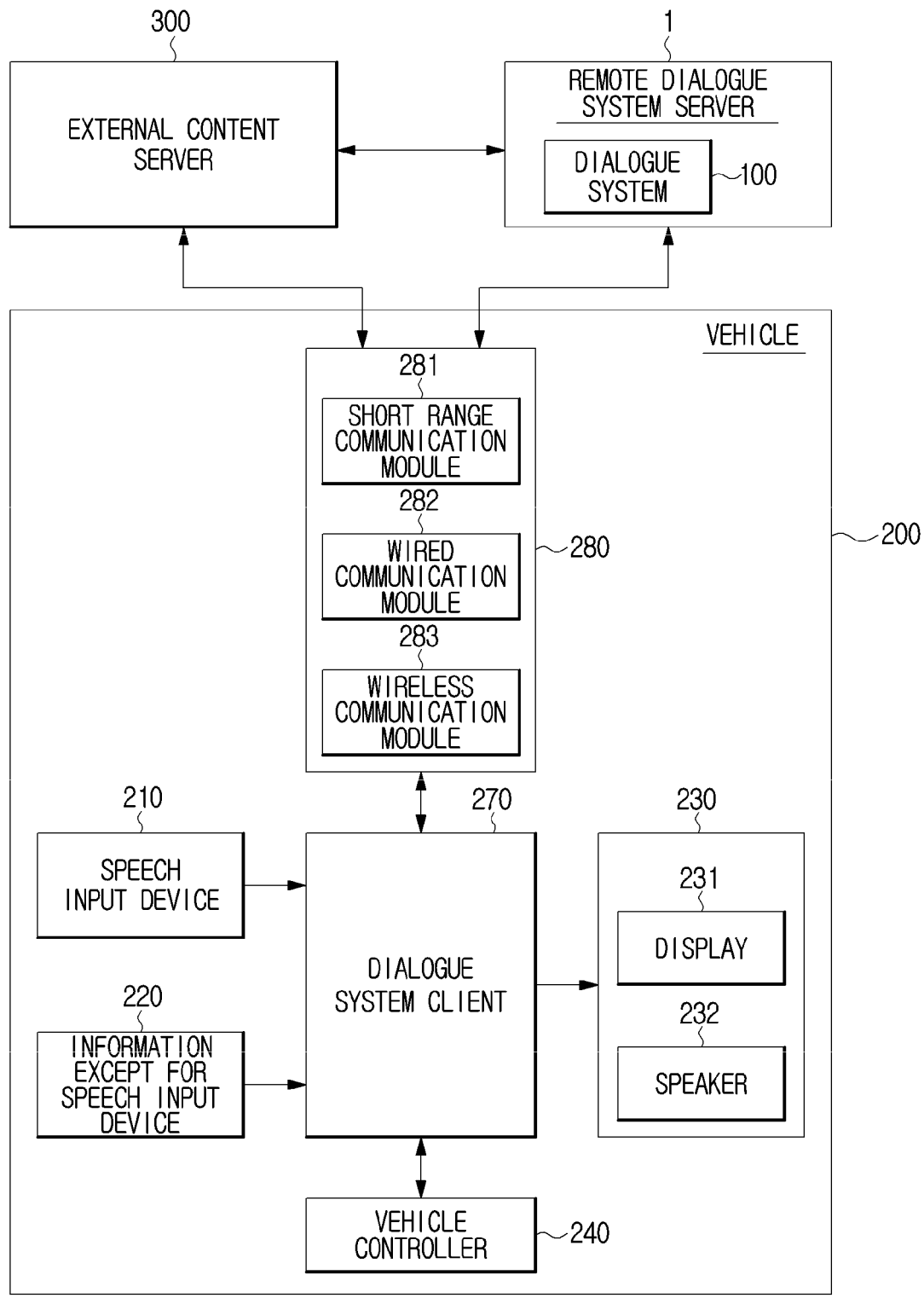

FIGS. 11 and 12 are control block diagrams illustrating a vehicle gateway method in which a dialogue system is provided in a remote server and a vehicle acts as a gateway connecting a user to the dialogue system.

According to the vehicle gateway method, as illustrated in FIG. 11, a remote dialogue system server 1 may be provided in the outside of the vehicle 200, and a dialogue system client 270 connected via the remote dialogue system server 1 and the communication device 280 may be provided in the vehicle 200. The communication device 280 serves as a gateway for connecting the vehicle 200 and the remote dialogue system server 1.

The dialogue system client 270 may serve as an interface connected to an input/output device and perform collecting, and sending and receiving data.

When the speech input device 210 and the information except for speech input device 220 provided in the vehicle 200 receive a user's input and transmit the user input to the dialogue system client 270, the dialogue system client 270 may transmit the input data to the remote dialogue system server 1 via the communication device 280.

The vehicle controller 240 may also transmit data detected by the vehicle detector 260 to the dialogue system client 270 and the dialogue system client 270 may transmit the data detected by the vehicle detector 260 to the remote dialogue system server 1 via the communication device 280.

Since the above mentioned dialogue system 100 is provided in the remote dialogue system server 1, the remote dialogue system server 1 may perform all of input data processing, dialogue processing based on the result of the input data processing, and result processing based on the result of the dialogue processing.

In addition, the remote dialogue system server 1 may bring information or content needed for the input data processing, the dialogue management, or the result processing, from the external content server 300.

According to a response transmitted from the remote dialogue system server 1, the vehicle 200 may bring information or content for the service needed for the user from the external content server 300.

Referring to FIG. 12, the communication device 280 may include at least one communication module configured to communicate with an external device. For example, the communication device 280 may include at least one of a short range communication module 281, a wired communication module 282, and a wireless communication module 283.

The short-range communication module 281 may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module 282 may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module 283 may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

In addition, the communication device 280 may further include an internal communication module (not shown) for communication between electronic devices in the vehicle 200. The communication protocol of the vehicle 200 may use Controller Area Network (CAN), Local Interconnection Network (LIN), FlexRay, and Ethernet.

The dialogue system 100 may send and receive data to and from the external content server 300 or the remote dialogue system server 1 via the wireless communication module 283. The dialogue system 100 may perform the V2X communication using the wireless communication module 283. In addition, using the short range communication module 281 or the wired communication module 282, the dialogue system 100 may send and receive data to and from a mobile device connected to the vehicle 200.

Figure 13:
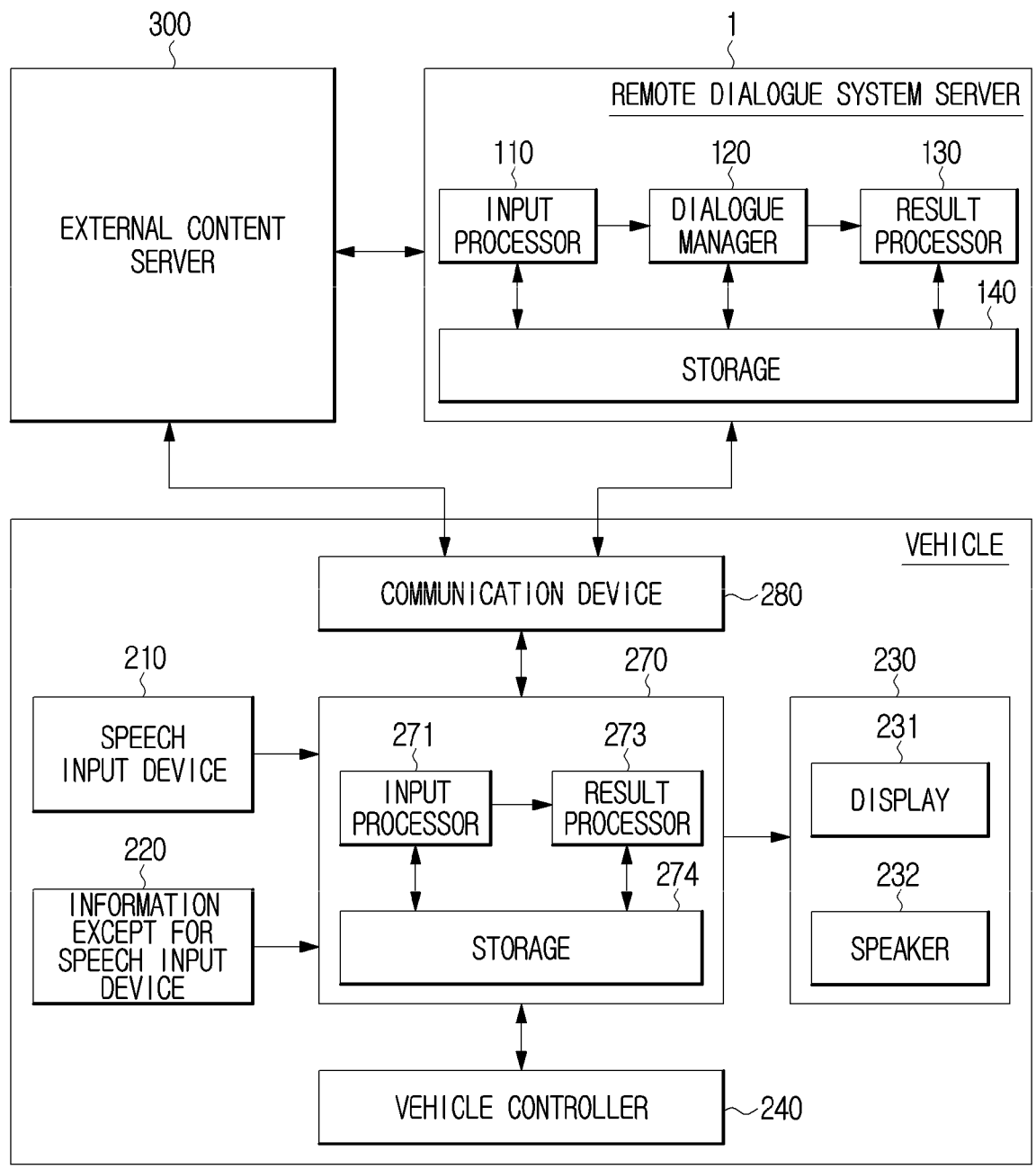
FIG. 13 is a control block diagram illustrating a case in which the vehicle can perform some input processing and output processing in the vehicle gateway method.

FIG. 13 is a control block diagram illustrating a case in which the vehicle can perform some input processing and output processing in the vehicle gateway method.

As mentioned above, the dialogue system client 270 of the vehicle 200 may only collect and send and receive the data but the dialogue system client 270 may process data input from the user or the vehicle or perform a processing related to the service provision that is determined to be needed to the user, since an input processor 271, a result processor 273 and a storage 274 are contained in the dialogue system client 270, as illustrated in FIG. 13. That is, the operation of the input processor 110 and the result processor 130 may be performed by not only the remote dialogue system server 1 but also the vehicle 200.

In this case, the dialogue system client 270 may perform all or some operation of the input processor 110. The dialogue system client 270 may perform all or some operation of the result processor 130.

The task sharing between the remote dialogue system server 1 and the dialogue system client 270 may be determined in consideration of the capacity of the data to be processed and the data processing speed.

Figure 14:
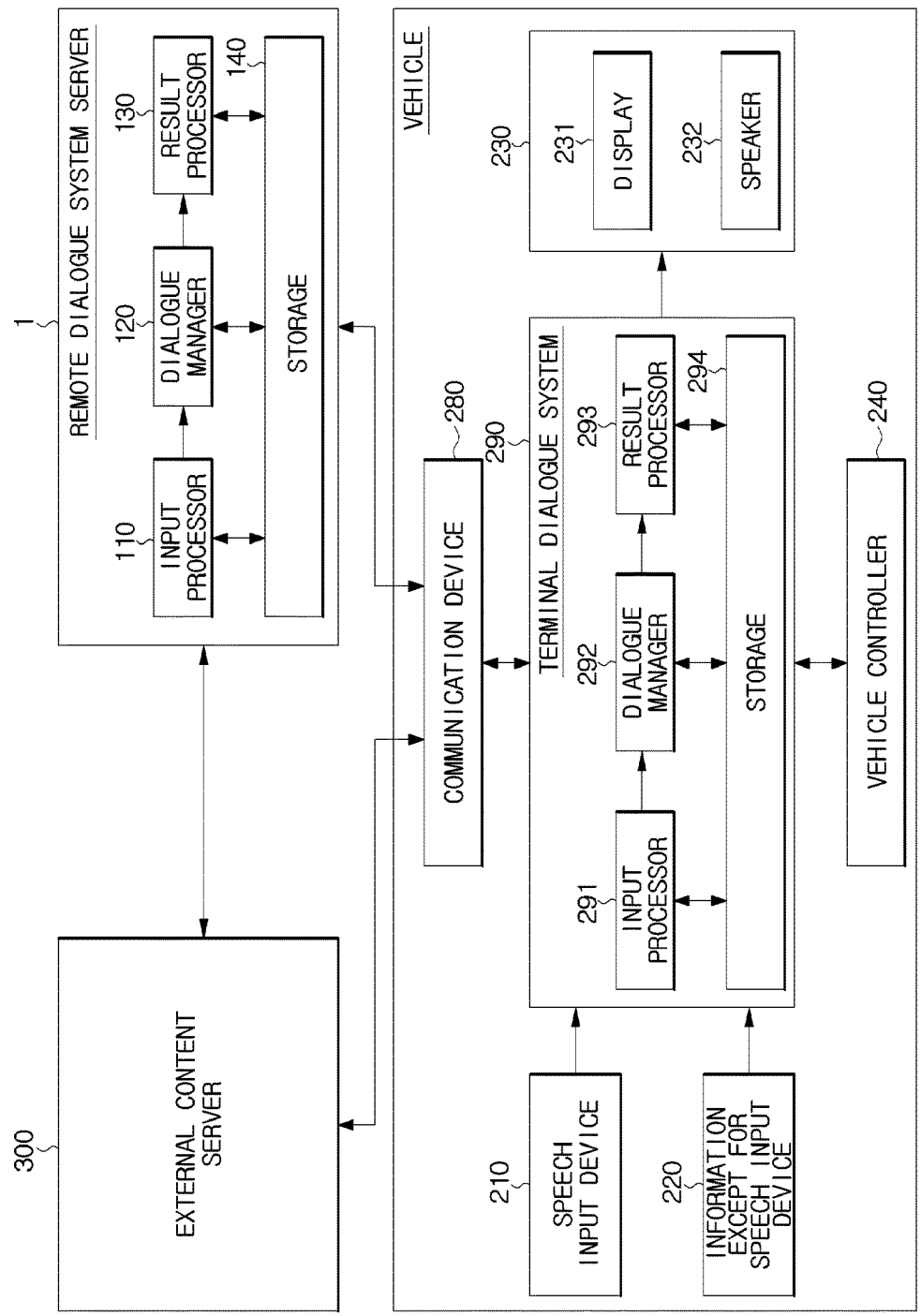
FIG. 14 is a control block diagram illustrating a hybrid method in which both of a remote dialogue system server and a vehicle perform a dialogue processing.

FIG. 14 is a control block diagram illustrating a hybrid method in which both of a remote dialogue system server and a vehicle perform a dialogue processing.

According to the hybrid method, as illustrated in FIG. 14, since the input processor 110, the dialogue manager 120, the result processor 130 and the storage 140 are provided in the remote dialogue system server 1, the remote dialogue system server 1 may perform the dialogue processing, and since a terminal dialogue system 290 provided with an input processor 291, a dialogue manager 292, a result processor 293 and a storage 294 is provided in the vehicle 200, the vehicle 200 may perform the dialogue processing.

However, there may be difference between a processor and a memory provided in the vehicle 200 and a processor or a memory provided in the remote dialogue system server 1 in the capacity or performance. Accordingly, when the terminal dialogue system 290 is capable of outputting a result by processing all the input data and managing the dialogue, the terminal dialogue system 290 may perform the entire process. Otherwise, it may be possible to request the processing to the remote dialogue system server 1.

Before performing the dialogue processing, the terminal dialogue system 290 may determine whether it is possible to perform the dialogue processing based on the data type, and the terminal dialogue system 290 may directly perform the processing or request the processing to the remote dialogue system server 1 based on the result of the determination.

When an event occurs in which the terminal dialogue system 290 cannot perform the process during performing the dialogue process, the terminal dialogue system 290 may request the processing to the remote dialogue system server 1 while transmitting a result that is processed by itself, to the remote dialogue system server 1.

For example, when the high-performance computing power or the long-term data processing is needed, the remote dialogue system server 1 may perform a dialogue processing and when the real time processing is needed, the terminal dialogue system 290 may perform the dialogue processing. For example, when an instant requiring immediate processing occurs and thus it is needed to process the data before the synchronization, it may be set such that the terminal dialogue system 290 firstly processes the data.

In addition, when there is an unregistered talker in the vehicle and thus a user confirmation is required, the remote dialogue system server 1 may process the dialogue.

Further, when the terminal dialogue system 290 is unable to complete the dialogue processing by itself in a state in which the connection with the remote dialogue system server 1 via the communication device 280 is not allowed, it may be possible to inform a user that the dialogue processing cannot be performed, via the dialogue output device 230.

Data stored in the terminal dialogue system 290 and data stored in the remote dialogue system server 1 may be determined according to the data type or the data capacity. For example, in the case of data having a risk of invasion of privacy because of personal identification, the data may be stored in the storage 294 of the terminal dialogue system 290. In addition, a large amount of data may be stored in the storage 140 of the remote dialogue system server 1, and a small amount of data may be stored in the storage 294 of the terminal dialogue system 290. Alternatively, a small amount of data may be stored in both of the storage 140 of the remote dialogue system server 1 and the storage 294 of the terminal dialogue system 290.

Figure 15:
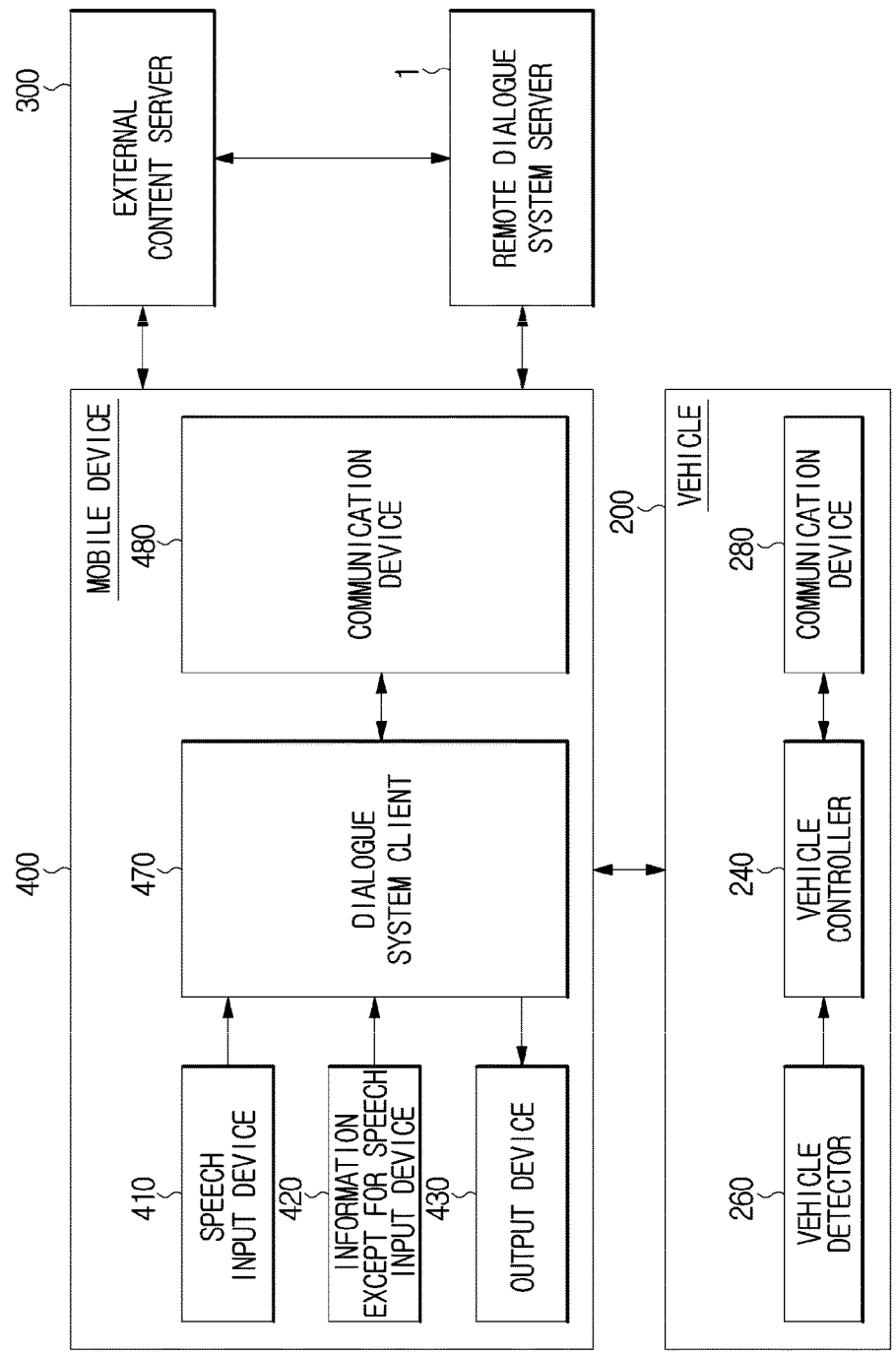
FIGS. 15 and 16 are control block diagrams illustrating a mobile gateway method in which a mobile device connected to a vehicle connects a user to a remote dialogue system server.
Figure 16:
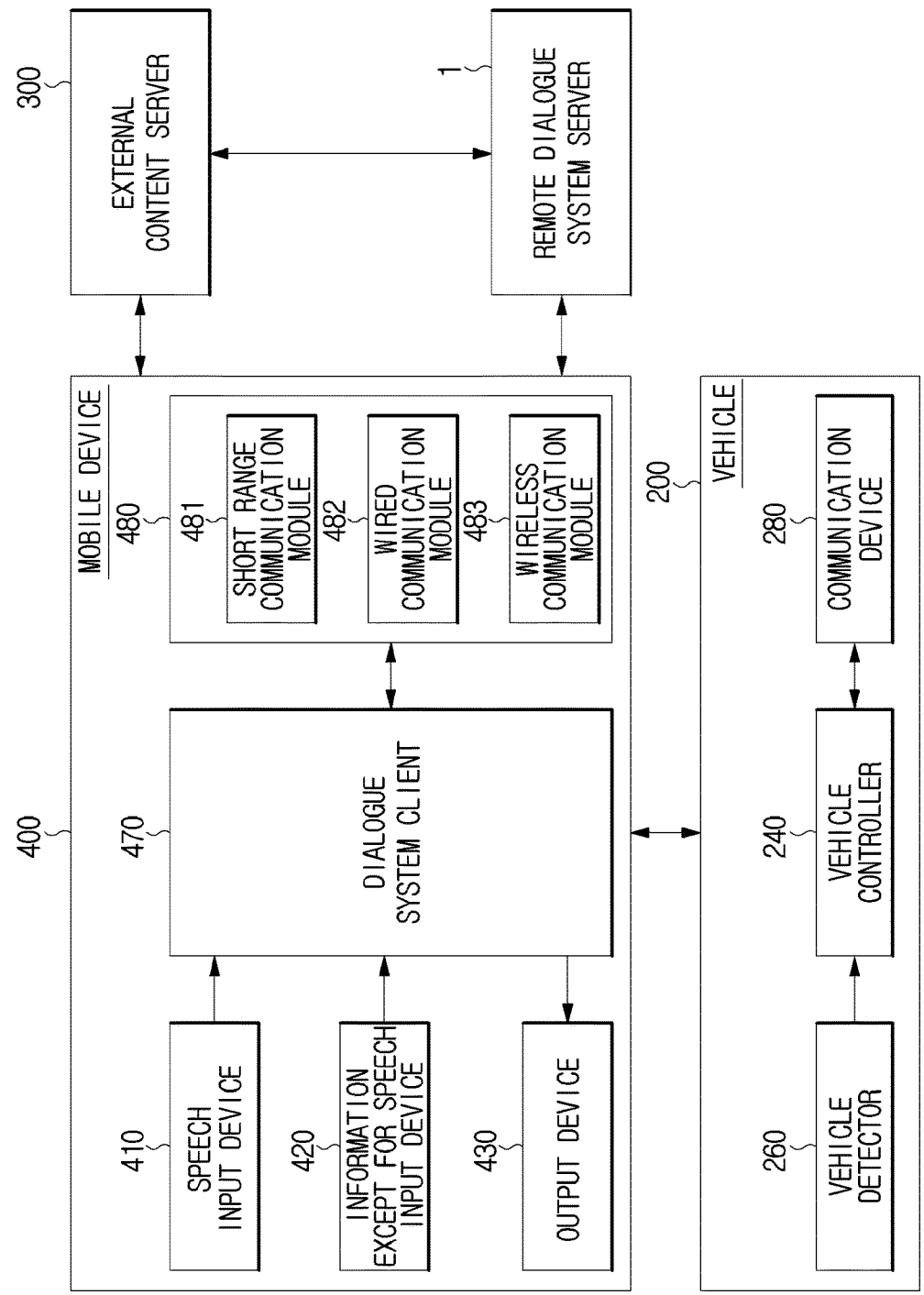

FIGS. 15 and 16 are control block diagrams illustrating a mobile gateway method in which a mobile device connected to a vehicle connects a user to a remote dialogue system server.

According to the mobile gateway method, as illustrated in FIG. 15, the mobile device 400 may receive the vehicle state information and the driving environment information, etc. from the vehicle 200, and transmit the user input and the vehicle state information to the remote dialogue system server 1. That is, the mobile device 400 may act as a gateway connecting a user to the remote dialogue system server 1 or connecting the vehicle 200 to the remote dialogue system server 1.

The mobile device 400 may represent an electronic device that is portable and capable of sending and receiving data to and from an external server and a vehicle by communicating with the external server and vehicle, wherein the mobile device 400 may include a smart phone, a smart watch, a smart glass, a PDA, and a tablet PC.

The mobile device 400 may include a speech input device 410 receiving a user's speech, an except for speech input device 420 receiving an input except for the user' speech, an output device 430 outputting a response in a visual, auditory or tactile manner, a communication device 480 sending and receiving data to and from the remote dialogue system server 1 and the vehicle 200 through the communication, and a dialogue system client 470 collecting input data from a user and transmitting the data to the remote dialogue system server 1 via the communication device 480.

The speech input device 410 may include a microphone receiving sound, converting the sound into an electrical signal and outputting the electrical signal.

The except for speech input device 420 may include an input button, a touch screen or a camera provided in the mobile device 400.

The output device 430 may include a display, a speaker or a vibrator provided in the mobile device 400.

The speech input device 410, the except for speech input device 420 and the output device 430 provided in the mobile device 400 may serve as an input and output interface for a user. In addition, the speech input device 210, the information except for speech input device 220, the dialogue output device 230 provided in the vehicle 200 may serve as an input and output interface for a user.

When the vehicle 200 transmits data detected by the vehicle detector 260 and the user input to the mobile device 400, the dialogue system client 470 of the mobile device 400 may transmit the data and the user input to the remote dialogue system server 1.

The dialogue system client 470 may transmit a response or a command transmitted from the remote dialogue system server 1, to the vehicle 200. When the dialogue system client 470 uses the dialogue output device 230 provided in the vehicle 200 as the input and output interface for the user, an utterance of the dialogue system 100 or a response to a user's utterance via may be output via the dialogue output device 230. When the dialogue system client 470 uses the output device 430 that is provided in the mobile device 400, an utterance of the dialogue system 100 or a response to a user's utterance may be output via the output device 430.

The command for the vehicle control may be transmitted to the vehicle 200 and the vehicle controller 240 may perform a control corresponding to the transmitted command, thereby providing the service needed for the user.

The dialogue system client 470 may collect the input data and transmit the input data to the remote dialogue system server 1. The dialogue system client 470 may also perform all or some function of the input processor 110 and the result processor 130 of the dialogue system 100.

Referring to FIG. 16, the communication device 480 of the mobile device 400 may include at least one communication module configured to communicate with an external device. For example, the communication device 480 may include at least one of a short range communication module 481, a wired communication module 482, and a wireless communication module 483.

The short-range communication module 481 may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module 482 may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module 483 may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

For example, the mobile device 400 may be connected to the vehicle 200 via the short range communication module 481 or the wired communication module 482, and the mobile device 400 may be connected to the remote dialogue system server 1 or the external content server 300 via the wireless communication module 483.

Figure 17:
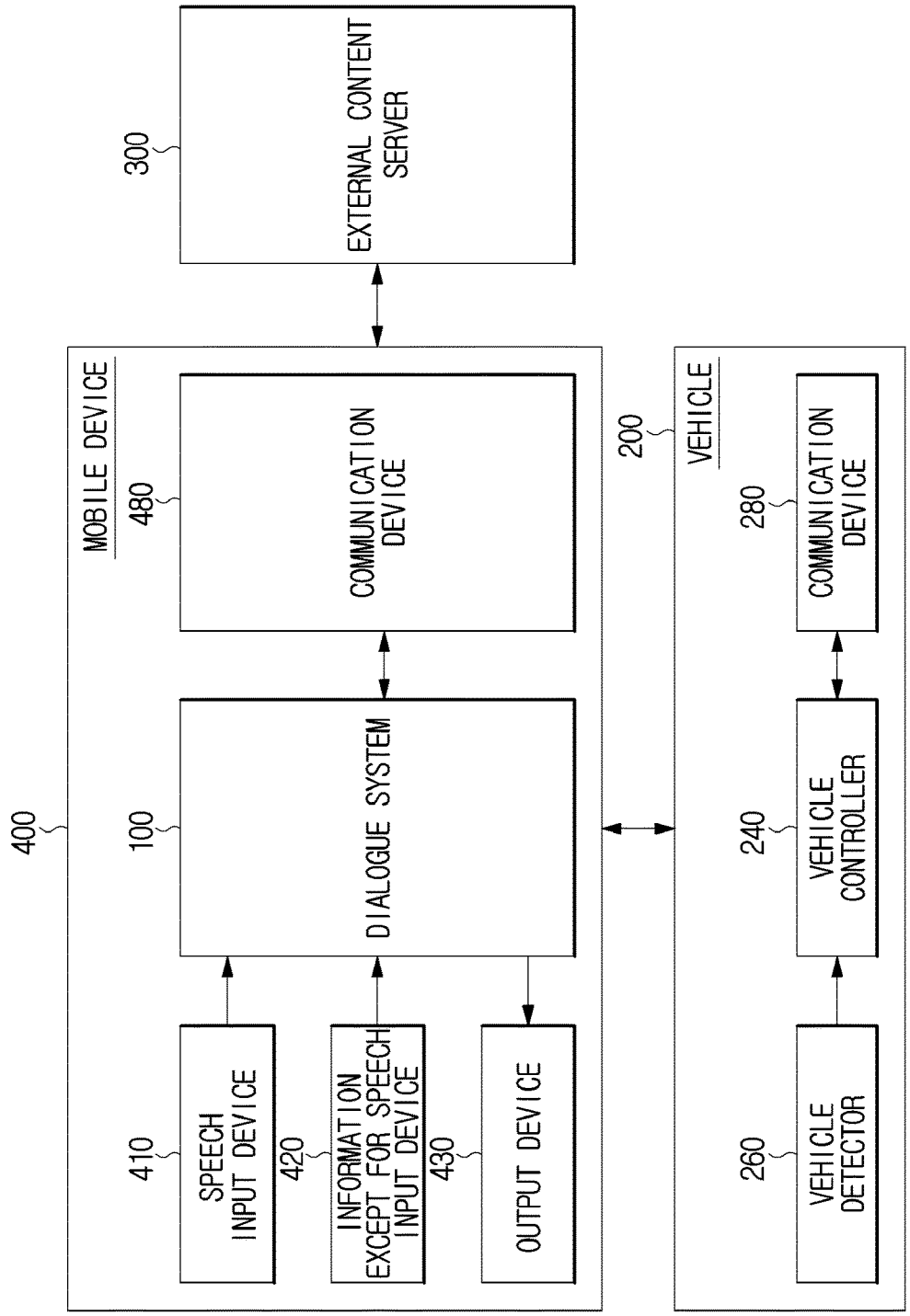
FIG. 17 is a control block diagram illustrating a mobile independent method in which a dialogue system is provided in a mobile device.

FIG. 17 is a control block diagram illustrating a mobile independent method in which a dialogue system is provided in a mobile device.

According to the mobile independent method, as illustrated in FIG. 17, the dialogue system 100 may be provided in the mobile device 400.

Therefore, without being connected to the remote dialogue system server 1 for the dialogue processing, the mobile device 400 may process dialogue with a user and provide a service needed for the user, by itself. However, the mobile device 400 may bring one piece of the information for the dialogue processing and service provision, from the external content server 300.

According to any method of the above-mentioned methods, components forming the dialogue system 100 may be physically separated from each other or some of the components may be omitted. For example, even when the dialogue system 100 is provided in the remote dialogue system server 1, some of components forming the dialogue system 100 may be provided in a separate server or the vehicle. An operator or a manger of the separate server may be the same as or different from that of the remote dialogue system server 1. For example, a speech recognizer or a natural language understanding portion described later may be provided in the separate server and the dialogue system 100 may receive a result of speech recognition or a result of natural language understanding about a user's utterance, from the separate server. Alternatively, the storage 140 may be provided in the separate server.

A description of the detailed configuration and detailed operation of each component of the dialogue system 100 will be described in detail. According to an embodiment described later, for convenience of explanation, it is assumed that the dialogue system 100 is provided in the vehicle 200. Specific components of the dialogue system 100 described later may be classified according to an operation thereof, and there may be no limitation on whether the components is implemented by the same processor and memory or not and a physical position of the processor memory.

Figure 19A:
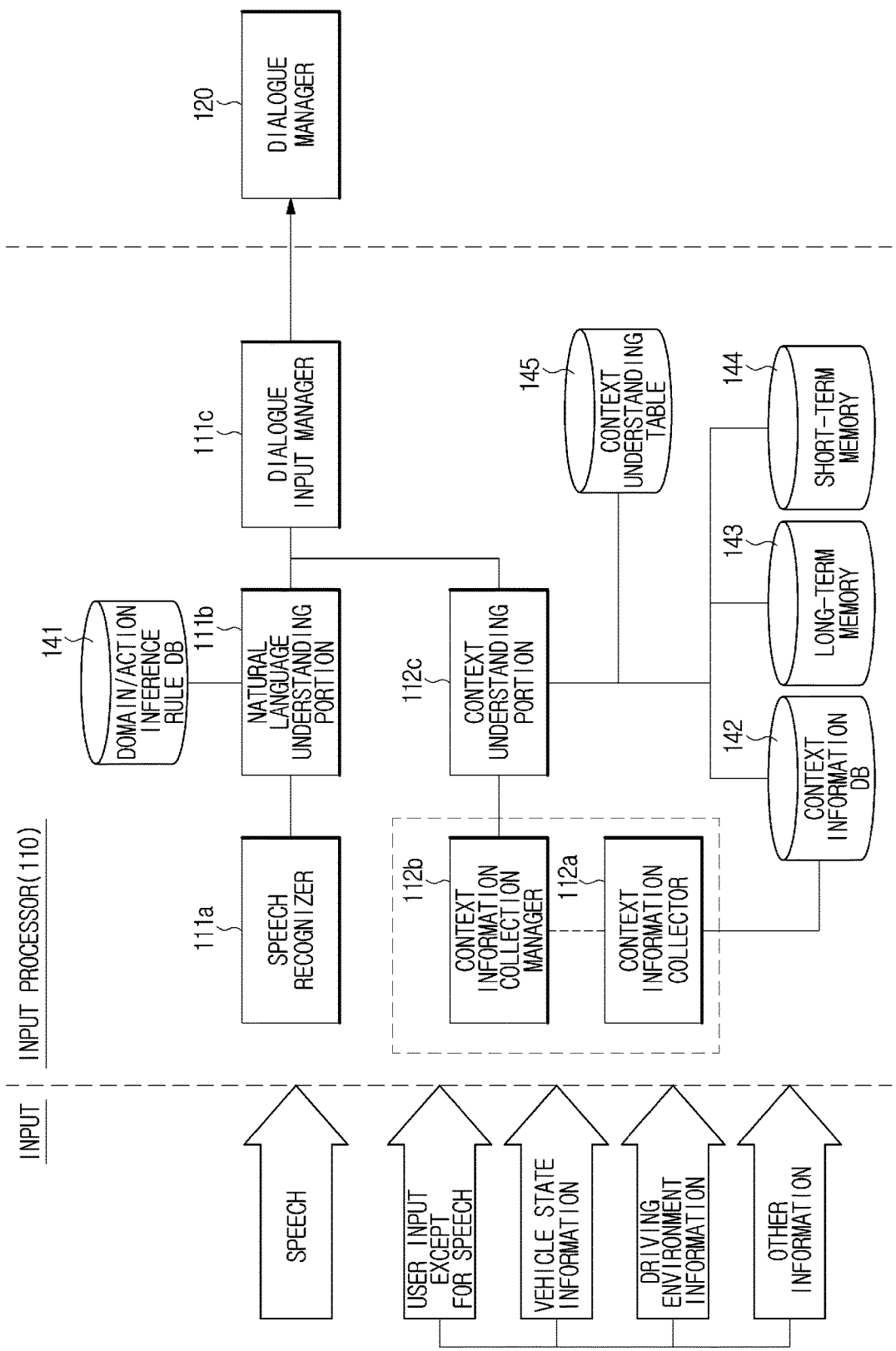
Figure 19B:
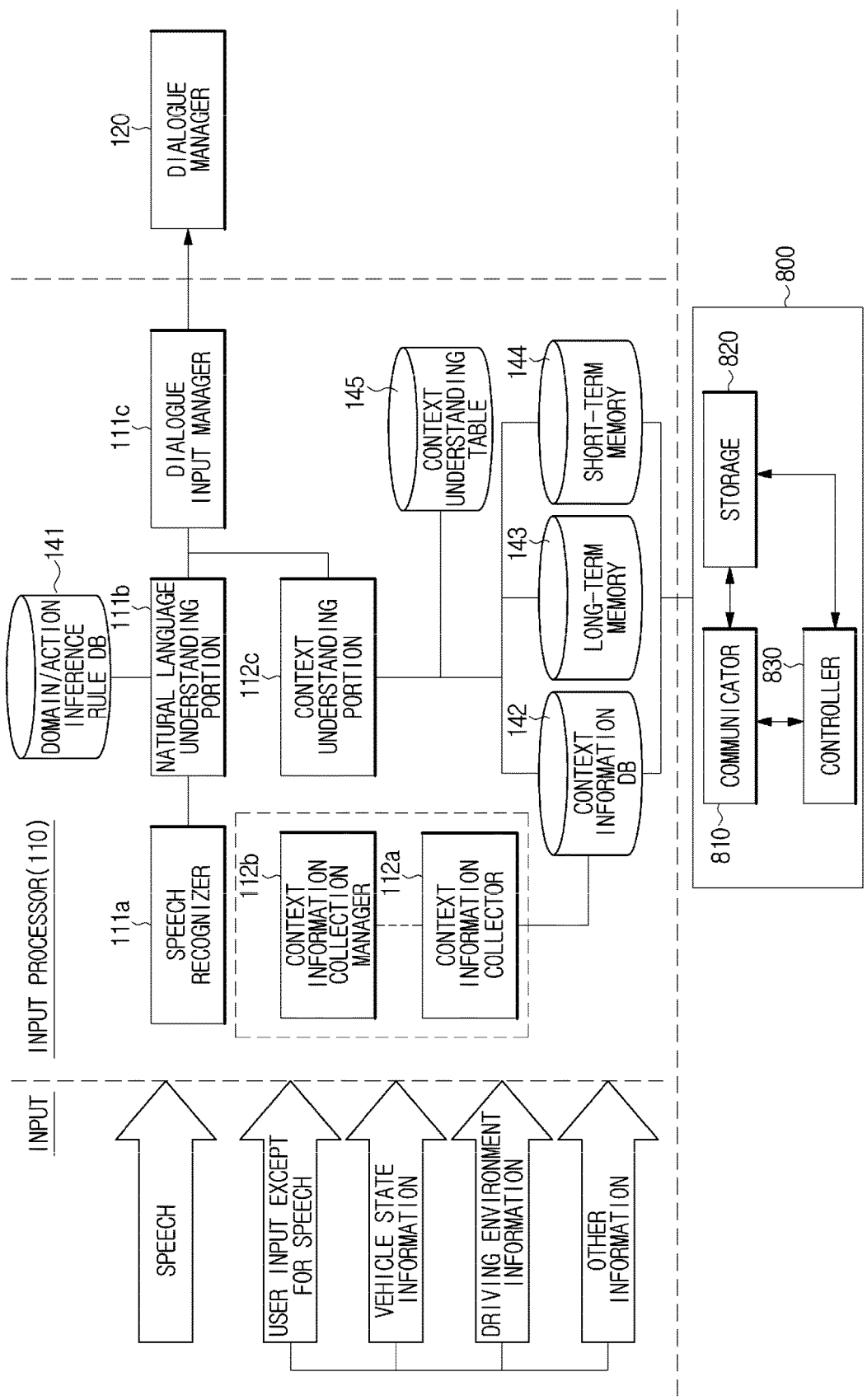

FIGS. 18, 19A and 19B are control block diagrams illustrating a configuration of an input processor in the configuration of the dialogue system in detail.

Referring to FIG. 18, the input processor 110 may include the speech input processor 111 processing the speech input and the context information processor 112 processing the context information.

The user's speech transmitted from the speech input device 210 may be input to the speech input processor 111 and the input except for the user's speech transmitted from the information except for speech input device 220 may be input to the context information processor 112.

The vehicle controller 240 may transmit the vehicle state information, the driving environment information and the user information to the context information processor 112. The driving environment information and the user information may be provided to the external content server 300 or the mobile device 400 connected to or the vehicle 200.

The input except for the speech may be contained in the context information. That is, the context information may include the vehicle state information, the driving environment information and the user information.

The vehicle state information may include information, which indicates the vehicle state and is acquired by a sensor provided in the vehicle 200, and information that is related to the vehicle, e.g., the fuel type of the vehicle, and stored in the vehicle.

The driving environment information may be information acquired by a sensor provided in the vehicle 200. The driving environment information may include image information acquired by a front camera, a rear camera or a stereo camera, obstacle information acquired by a sensor, e.g., a radar, a Lidar, an ultrasonic sensor, and information related to an amount of rain, and rain speed information acquired by a rain sensor.

The driving environment information may further include traffic state information, traffic light information, and adjacent vehicle access or adjacent vehicle collision risk information, which is acquired via the V2X.

The user information may include information related to user state that is measured by a camera provided in the vehicle or a biometric reader, information related to a user that is directly input using an input device provided in the vehicle by the user, information related to a user and stored in the external content server 300, and information stored in the mobile device 400 connected to the vehicle.

The speech input processor 111 may include an speech recognizer 111*a* outputting an utterance in the text type by recognizing the input user's speech, a natural language understanding portion 111*b* identifying the user's intention contained in the utterance by applying natural language understanding technology to the user utterance, and a dialogue input manager 111*c* transmitting a result of the natural language understanding and the context information, to the dialogue manager 120.

The speech recognizer 111*a* may include a speech recognition engine and the speech recognition engine may recognize a speech uttered by a user by applying a speech recognition algorithm to the input speech and generate a recognition result.

Since the input speech is converted into a more useful form for the speech recognition, the speech recognizer 111*a* may detect an actual speech section included in the speech by detecting a start point and an end point from the speech signal. This is called End Point Detection (EPD).

The speech recognizer 111*a* may extract the feature vector of the input speech from the detected section by applying the feature vector extraction technique, e.g., Cepstrum, Linear Predictive Coefficient: (LPC), Mel Frequency Cepstral Coefficient (MFCC) or Filter Bank Energy.

The speech recognizer 111*a* may acquire the results of recognition by comparing the extracted feature vector with a trained reference pattern. At this time, the speech recognizer 111*a* may use an acoustic model of modeling and comparing the signal features of a speech, and a language model of modeling a linguistic order relation of a word or a syllable corresponding to a recognition vocabulary. For this, the storage 140 may store the acoustic model and language model DB.

The acoustic model may be classified into a direct comparison method of setting a recognition target to a feature vector model and comparing the feature vector model to a feature vector of a speech signal, and a statistical method of statistically processing a feature vector of a recognition target.

The direct comparison method is setting a unit, such as a word or a phoneme, which is a recognition target, to a feature vector model, and comparing a received speech to the feature vector model to determine similarity between them. A representative example of the direct comparison method is vector quantization. The vector quantization is mapping feature vectors of a received speech signal to a codebook that is a reference model to code the results of the mapping to representative values, and comparing the representative values to each other.

The statistical model method is configuring units of a recognition target as state sequences and using a relationship between the state sequences. Each state sequence may be configured with a plurality of nodes. The method of using the relationship between the state sequences can be classified into Dynamic Time Warping (DTW), Hidden Markov Model (HMM), and a method of using a neural network.

The DTW is a method of compensating for differences in the time axis through comparison to a reference model in consideration of the dynamic feature of speech that the length of a signal varies over time even when the same person utters the same pronunciation. The HMM is a recognition method of assuming a speech as a Markov process having state transition probability and observation probability of nodes (output symbols) in each state, then estimating state transition probability and observation probability of nodes based on learning data, and calculating probability at which a received speech is to be generated from an estimated model.

Meanwhile, the language model of modeling a linguistic order relation of a word, a syllable, etc. may reduce acoustic ambiguity and recognition errors by applying an order relation between units configuring a language to units acquired through speech recognition. The language model may include a statistical language model, and a model based on Finite State Automata (FSA). The statistical language model uses chain probability of a word, such as Unigram, Bigram, and Trigram.

The speech recognizer 111a may use any one of the above-described methods for the speech recognition. For example, the speech recognizer 111a may use an acoustic model to which the HMM is applied, or a N-best search method in which an acoustic model is combined with a speech model. The N-best search method can improve recognition performance by selecting N recognition result candidates or less using an acoustic model and a language model, and then re-estimating an order of the recognition result candidates.

The speech recognizer 111a may calculate a confidence value to ensure reliability of a recognition result. A confidence value may be criteria representing how a speech recognition result is reliable. For example, the confidence value may be defined, with respect to a phoneme or a word that is a recognized result, as a relative value of probability at which the corresponding phoneme or word has been uttered from different phonemes or words. Accordingly, a confidence value may be expressed as a value between 0 and 1 or between 1 and 100.

When the confidence value is greater than a predetermined threshold value, the speech recognizer 111a may output the recognition result to allow an operation corresponding to the recognition result to be performed. When the confidence value is equal to or less than the threshold value, the speech recognizer 111a may reject the recognition result.

The utterance in the form of text that is the recognition result of the speech recognizer 111a may be input to the natural language understanding portion 111b.

The natural language understanding portion 111b may identify an intention of user's utterance included in an utterance language by applying the natural language understanding technology. Therefore, the user may input a control command through a natural dialogue, and the dialogue system 100 may also induce the input of the control command and provide a service needed the user via the dialogue.

The natural language understanding portion 111b may perform morphological analysis on the utterance in the form of text. A morpheme is the smallest unit of meaning and represents the smallest semantic element that can no longer be subdivided. Thus, the morphological analysis is a first step in natural language understanding and transforms the input string into the morpheme string.

The natural language understanding portion 111b may extract a domain from the utterance based on the morphological analysis result. The domain may be used to identify a subject of a user utterance language, and the domain indicating a variety of subjects, e.g., route guidance, weather search, traffic search, schedule management, fuel management and air conditioning control, may be stored as a database.

The natural language understanding portion 111b may recognize an entity name from the utterance. The entity name may be a proper noun, e.g., people names, place names, organization names, time, date, and currency, and the entity name recognition may be configured to identify an entity name in a sentence and determine the type of the identified entity name. The natural language understanding portion 111b may extract important keywords from the sentence using the entity name recognition and recognize the meaning of the sentence.

The natural language understanding portion 111b may analyze a speech act contained in the utterance. The speech act analysis may be configured to identify the intention of the user utterance, e.g., whether a user asks a question, whether a user asks a request, whether a user responses or whether a user simply expresses an emotion.

The natural language understanding portion 111b extracts an action corresponding to the intention of the user's utterance. The natural language understanding portion 111b may identify the intention of the user's utterance based on the information, e.g., domain, entity name, and speech act and extract an action corresponding to the utterance. The action may be defined by an object and an operator.

The natural language understanding portion 111b may extract a parameter related to the action execution. The parameter related to the action execution may be an effective parameter that is directly required for the action execution, or an ineffective parameter that is used to extract the effective parameter.

For example, when a user's utterance is "let's go to Seoul station", the natural language understanding portion 111b may extract "navigation" as a domain corresponding to the utterance, and "route guidance" as an action, wherein a speech act corresponds to "request".

The entity name "Seoul station" may correspond to [parameter: destination] related to the action execution, but a specific exit number of the station or GPS information may be required to practically guide a route via the navigation system. In this case, [parameter: destination: Seoul station] extracted by the natural language understanding portion 111*b* may be a candidate parameter for searching "Seoul station" that is actually desired by the user among a plurality of Seoul station POI.

The natural language understanding portion 111*b* may extract a tool configured to express a relationship between words or between sentences, e.g., parse-tree.

The morphological analysis result, the domain information, the action information, the speech act information, the extracted parameter information, the entity name information and the parse-tree, which is the processing result of the natural language understanding portion 111*b* may be transmitted to the dialogue input manager 111*c*.

The context information processor 112 may include a context information collector 112*a* collecting information from the information except for speech input device 220 and the vehicle controller 240, a context information collection manager 112*b* managing the collection of the context information, and a context understanding portion 112*c* understanding context based on the result of the natural language understanding and the collected context information.

The input processor 110 may include a memory in which a program for performing the above-described operation and the operation described later is stored, and a processor for executing the stored program. At least one memory and one processor may be provided, and when a plurality of memory and processors are provided, they may be integrated on one chip or physically separated.

The speech input processor 111 and the context information processor 112 contained in the input processor 110 may be implemented by the same processor and memory or a separate processor and memory.

Hereinafter, a method in which components of the input processor 110 process the input data using information stored in the storage 140 will be described in detail with reference to FIGS. 19A and 19B.

Referring to FIG. 19A, the natural language understanding portion 111*b* may use the domain/action inference rule DB 141 for the domain extraction, entity recognition, the speech act analysis and the action extraction.

In the domain/action inference rule DB 141, domain extraction rules, speech act analysis rules, entity name conversion rules, action extraction rules may be stored.

Other information such as the user input except for the speech, the vehicle state information, the driving environment information and the user information may be input to the context information collector 112*a* and then stored in a context information DB 142, the long-term memory 143, or the short-term memory 144.

For example, raw data detected by the vehicle detector 260 may be classified into a sensor type and a sensor value and then stored in the context information DB 142.

In the short-term memory 144 and long-term memory 143, data that is meaningful to the user may be stored, wherein the data may include the current user state, the user's preference and orientation or data for determining the user's preference and orientation.

As described above, information that ensures the persistence and thus is usable in the long term, may be stored in the long-term memory 143, wherein the information may include the user's phone book, schedule, preferences, educational history, personality, job, and information related to family.

Information that does not ensure the persistence or has uncertainties and thus is usable in the short term may be stored in the short-term memory 144, wherein the information may include the current and previous position, today schedule, the previous dialogue content, dialogue participants, circumstances, domains, and driver state. According to data type, there may be data stored in at least two storages among the context information DB 142, the short-term memory 144 and the long-term memory 143 in duplicate.

In addition, among the information stored in the short-term memory 144, data, which is determined to ensure the persistence, may be transmitted to the long-term memory 143.

It may be possible to acquire information to be stored in the long-term memory 143 using information stored in the short-term memory 144 and the context information DB 142. For example, the user's preference may be acquired by analyzing destination information that is stored for certain duration or the dialogue content, and the acquired user's preference may be stored in the long-term memory 143.

By using information stored in the short-term memory 144 or the context information DB 142, it may be performed to obtain information to be stored in the long-term memory 143 in the dialogue system 100, or in an additional external system.

It may possible to perform the former case in the memory manager 135 of the result processor 130. In this case, among the data stored in the short-term memory 144 or the context information DB 142, data used to acquire meaningful information, e.g., the user's preference or orientation or persistent information may be stored in the long-term memory 143 in the log file type. The memory manager 135 may acquire persistent data by analyzing data that is stored for more than certain duration, and re-sore the data in the long-term memory 143. In the long-term memory 143, a location in which the persistent data is stored may be different from a location in which the data stored in the log file type is stored.

The memory manager 135 may determine persistent data among data stored in the short-term memory 144 and move and store the determined data to and in the long-term memory 143.

When obtaining information to be stored in the long-term memory 143 using information stored in the short-term memory 144 or the context information DB 142 is performed in the an additional external system, a data management system 800 provided with a communicator 810, a storage 820 and a controller 830 may be used, as illustrated in FIG. 19B.

The communicator 810 may receive data stored in the context information DB 142 or the short-term memory 144. All data stored may be transmitted to the communicator 810 or the data used to acquire meaningful information, e.g., the user's preference or orientation or persistent information may be selected and then transmitted. The received data may be stored in the storage 820.

The controller 830 may acquire the persistent data by analyzing the stored data and then transmit the acquired data to the dialogue system 100 via the communicator 810. The transmitted data may be stored in the long-term memory 143 of the dialogue system 100.

In addition, the dialogue input manager 111*c* may acquire context information related to the action execution by transmitting the result of the output of the natural language understanding portion 111*b* to the context understanding portion 112*c*.

The context understanding portion 112*c* may determine which context information is related to the action execution corresponding to the intention of the user's utterance, by referring to context information that is stored according to the action in a context understating table 145.

Figure 20A:
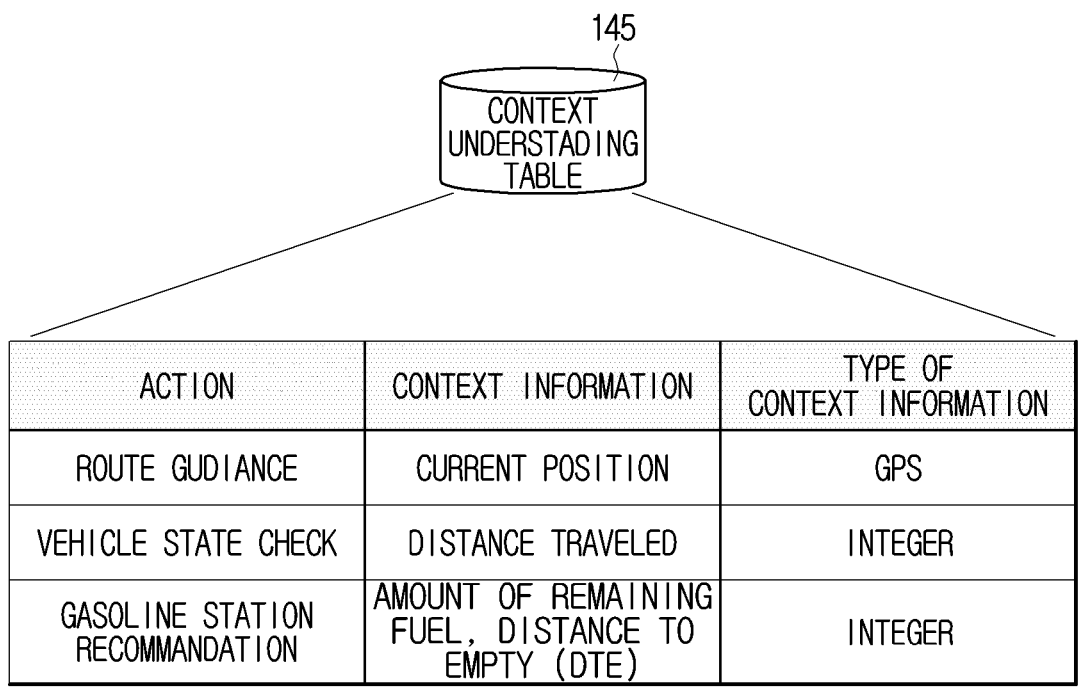
FIGS. 20A and 20B are views illustrating an example of information stored in a context understanding table.
Figure 20B:
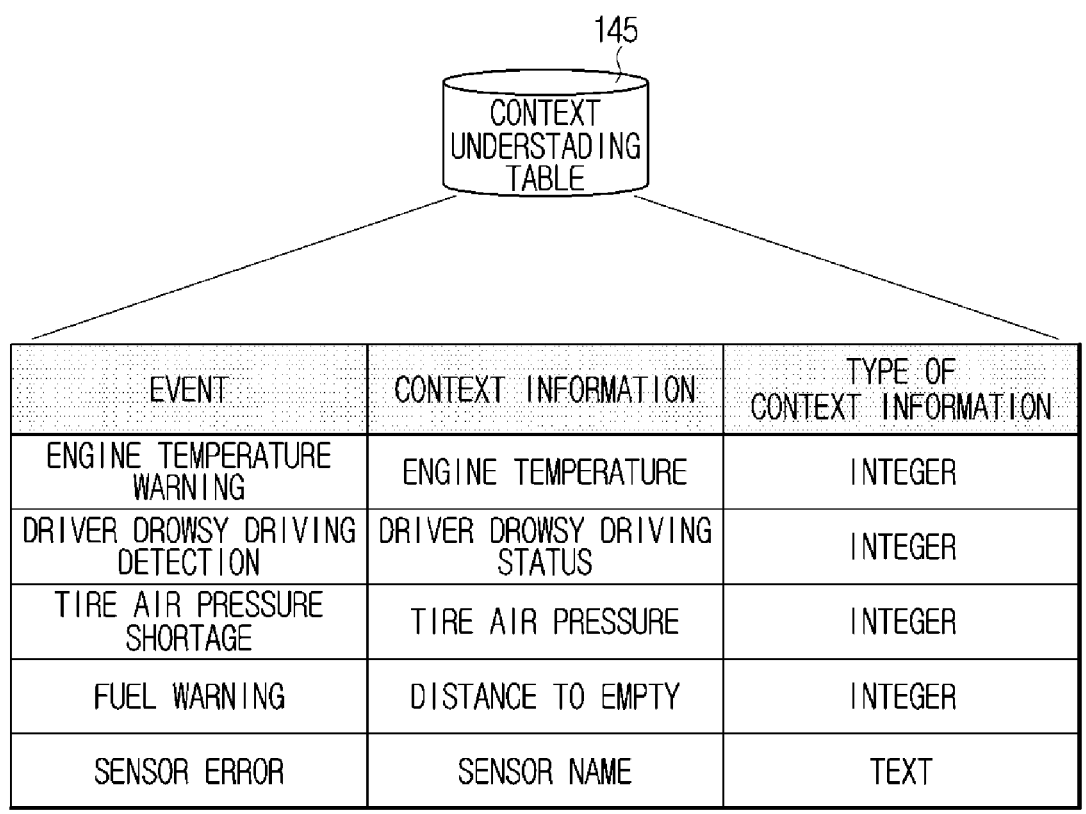

FIGS. 20A and 20B are views illustrating an example of information stored in a context understanding table.

Referring to an example of FIG. 20A, context information and the type of the context information related to the action execution may be stored in the context understating table 145 according to each action.

For example, when the action is route guidance, the current position may be needed as the context information and the type of the context information may be GPS information. When the action is vehicle state check, distance traveled may be needed as the context information and the type of the context information may be integer. When the action is gasoline station recommendation, an amount of remaining fuel and distance to empty (DTE) may be needed as the context information and the type of the context information may be integer.

When context information related to the action execution corresponding to the intention of the user's utterance is pre-stored in the context information DB 142, the long-term memory 143 or the short-term memory 144, the context understanding portion 112c may bring the corresponding information from the context information DB 142, the long-term memory 143 or the short-term memory 144 and transmit the corresponding information to the dialogue input manager 111c.

When context information related to the action execution corresponding to the intention of the user's utterance is not stored in the context information DB 142, the long-term memory 143 or the short-term memory 144, the context understanding portion 112c may request needed information to the context information collection manager 112b. The context information collection manager 112b may allow the context information collector 112a to collect the needed information.

The context information collector 112a may periodically collect data, or collect data only when a certain event occurs. In addition the context information collector 112a may periodically collect data and then additionally collect data when a certain event occurs. Further, when receiving a data collection request from the context information collection manager 112b, the context information collector 112a may collect data.

The context information collector 112a may collect the needed information and then store the information in the context information DB 142 or the short-term memory 144. The context information collector 112a may transmit a confirmation signal to the context information collection manager 112b.

The context information collection manager 112b may transmit the confirmation signal to the context understanding portion 112c and the context understanding portion 112c may bring the needed information from the long-term memory 143 or the short-term memory 144 and then transmit the information to the dialogue input manager 111c.

Particularly, when the action corresponding to the intention of the user's utterance is the route guidance, the context understanding portion 112c may search the context understating table 145 and recognize that context information related to the route guidance is the current position.

When the current position is pre-stored in the short-term memory 144, the context understanding portion 112c may bring the current position and transmit the current position to the dialogue input manager 111c.

When the current position is not stored in the short-term memory 144, the context understanding portion 112c may request the current position to the context information collection manager 112b and the context information collection manager 112b may allow the context information collector 112a to acquire the current position from the vehicle controller 240.

The context information collector 112a may acquire the current position and then store the current position in the short-term memory 144. The context information collector 112a may transmit a confirmation signal to the context information collection manager 112b. The context information collection manager 112b may transmit the confirmation signal to the context understanding portion 112c and the context understanding portion 112c may bring the current position information from the short-term memory 144 and then transmit the information to the dialogue input manager 111c.

The dialogue input manager 111c may transmit the output of the natural language understanding portion 111b and the output of the context understanding portion 112c to the dialogue manager 120 and the dialogue input manager 111c may manage to prevent the duplicate input from entering to the dialogue manager 120. In this time, the output of the natural language understanding portion 111b and the output of the context understanding portion 112c may be combined as one output and then transmitted to the dialogue manager 120 or independently transmitted to the dialogue manager 120.

When the context information collection manager 112b determines that a certain event occurs since data collected by the context information collector 112a satisfies a predetermined condition, the context information collection manager 112b may transmit an action trigger signal to the context understanding portion 112c.

The context understanding portion 112c may search the context understating table 145 for searching for context information related to the corresponding event, and when the searched context information is not stored in the context understating table 145, the context understanding portion 112c may transmit a context information request signal to the context information collection manager 112b, again.

As illustrated in FIG. 20B, context information and the type of the context information related to the event may be stored in the context understating table 145 according to each event.

For example, when the generated event is engine temperature warning, an engine temperature in the form of integer may be stored as the context information related to the event. When the generated event is driver drowsy driving detection, driver drowsy driving status in the form of integer may be stored as the context information related to the event. When the generated event is tire air pressure shortage, tire air pressure in the form of integer may be stored as the context information related to the event. When the generated event is fuel warning, distance to empty (DTE) in the form of integer may be stored as the context information related to the event. When the generated event is sensor error, sensor name in the form of text may be stored as the context information related to the event.

The context information collection manager 112b may collect the needed context information via the context information collector 112a and transmit a confirmation signal to the context understanding portion 112c. The context understanding portion 112c may bring the needed context information from the context information DB 142, the long-term memory 143 or the short-term memory 144 and then transmit the context information together with the action information to the dialogue input manager 111c.

The dialogue input manager 111*c* may input the output of the context understanding portion 112*c* to the dialogue manager 120.

Hereinafter a case in which the dialogue system 100 outputs a pre-utterance by itself before a user's utterance is input will be described.

Figure 21:
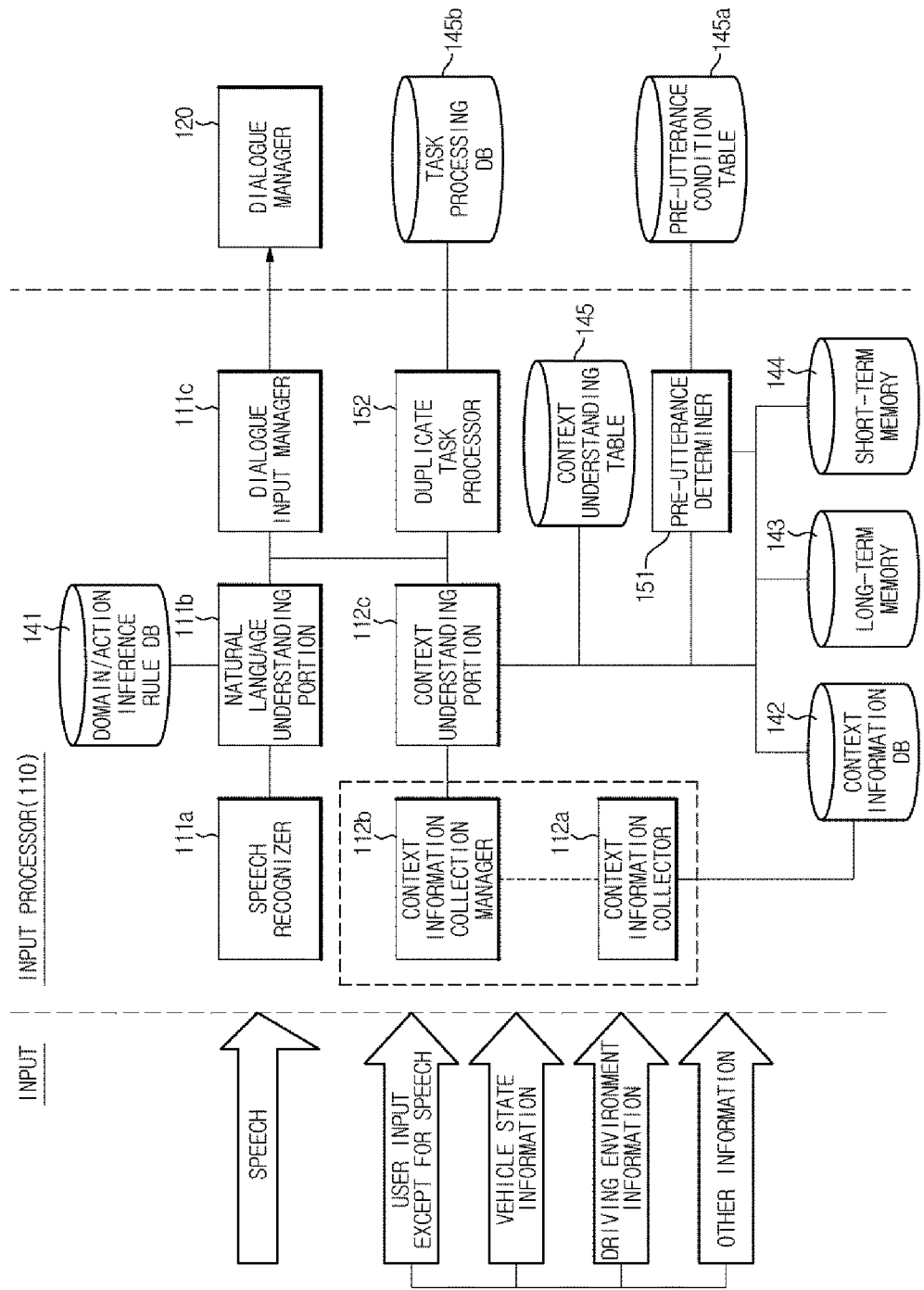
FIG. 21 is a control block diagram illustrating a dialogue system applicable to a case in which the dialogue system first outputs an utterance before receiving a user's input.
Figure 22A:
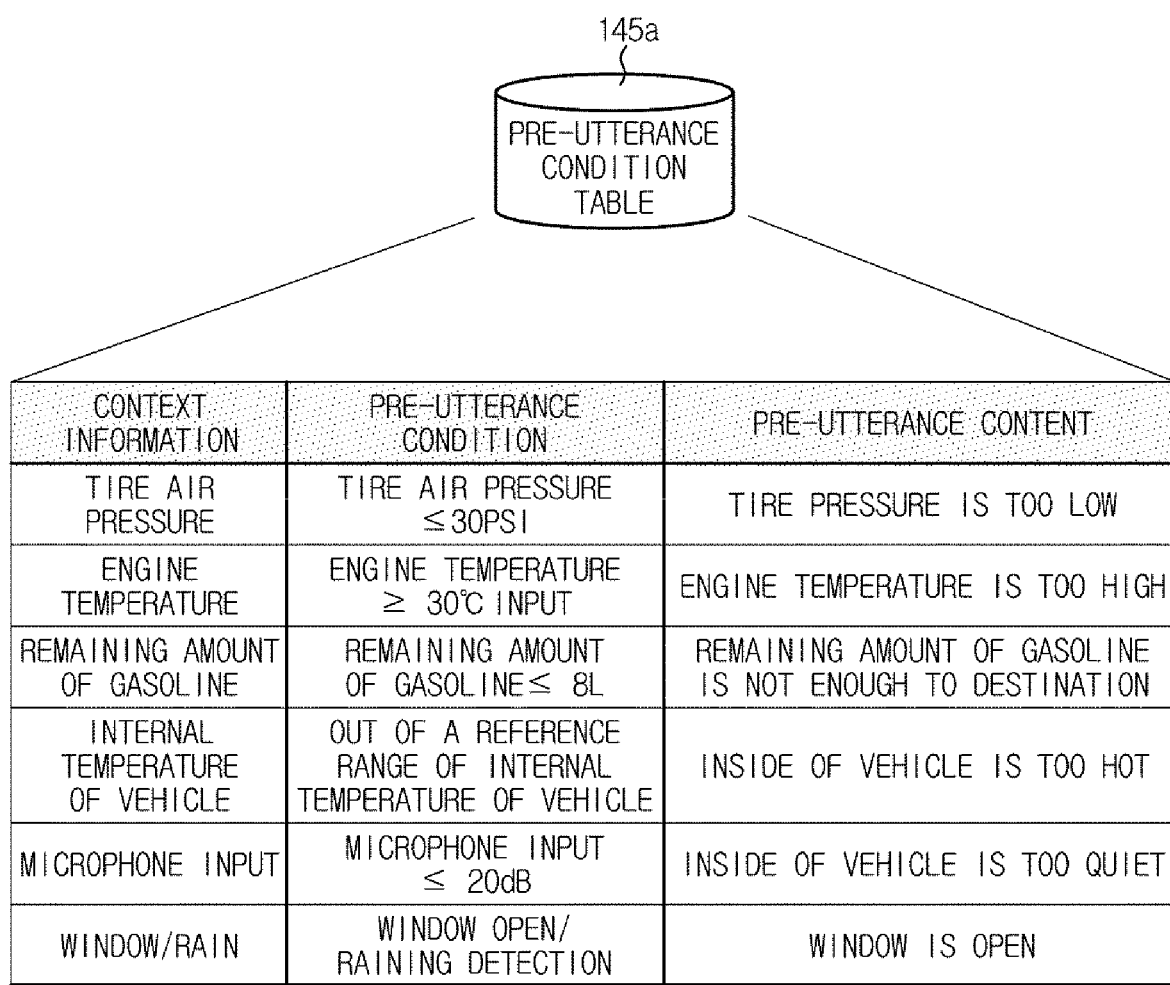
FIGS. 22A, 22B and 22C are views illustrating an example of information stored in a pre-utterance condition table.
Figure 22B:
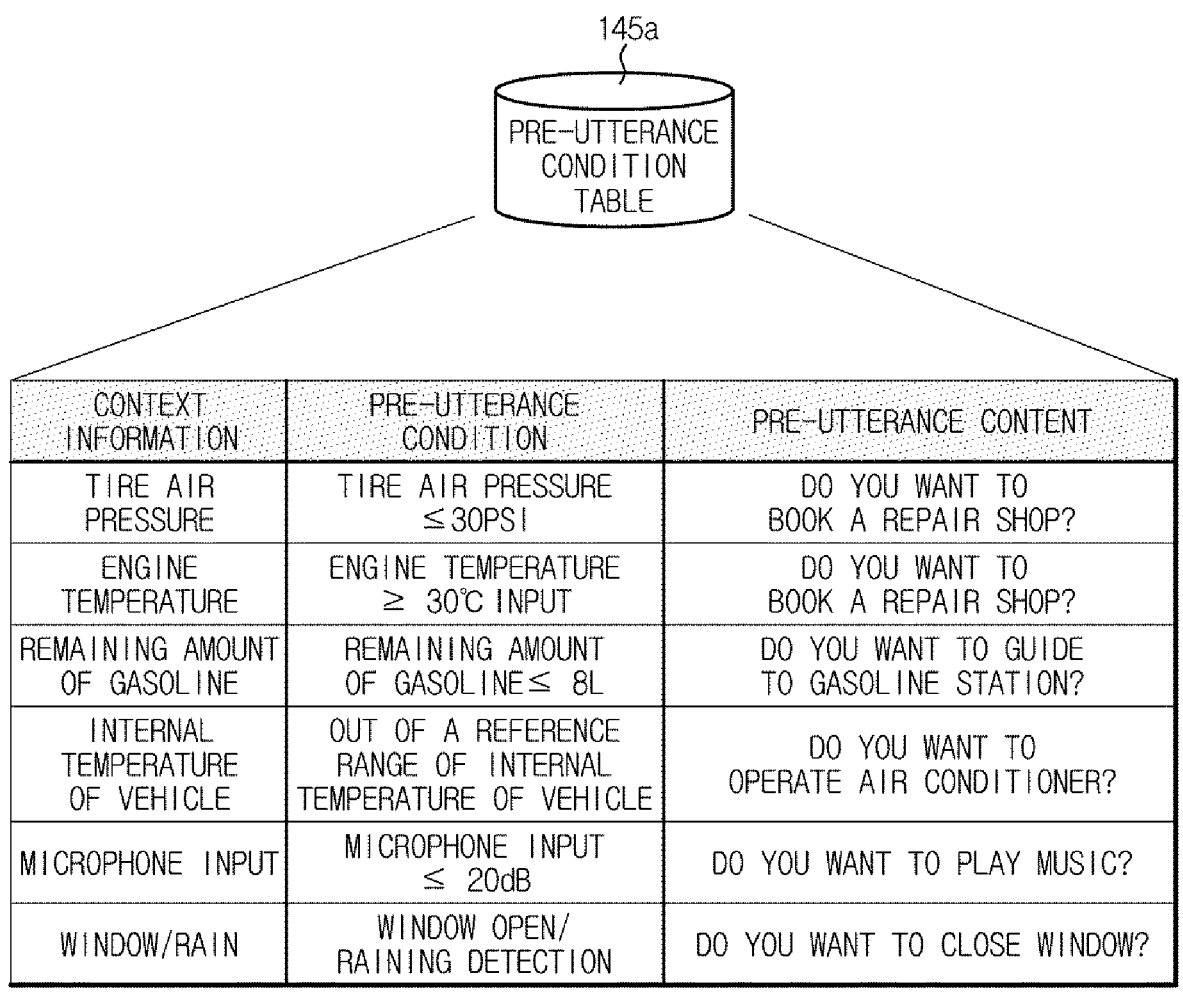
Figure 22C:
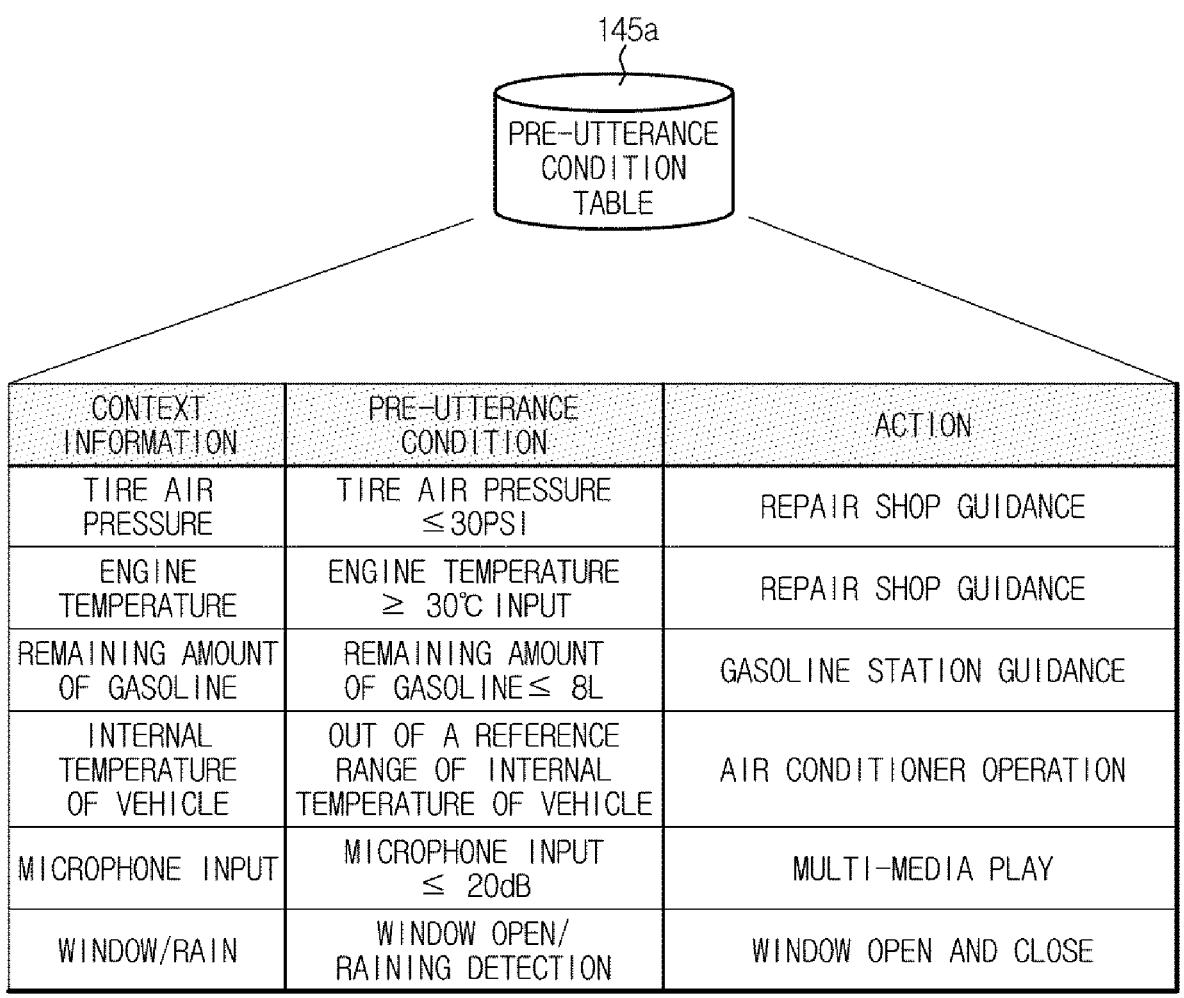

FIG. 21 is a control block diagram illustrating a dialogue system applicable to a case in which the dialogue system first outputs an utterance before receiving a user's input and FIGS. 22A, 22B and 22C are views illustrating an example of information stored in a pre-utterance condition table.

Referring to FIG. 21, the input processor 110 of the dialogue system 100 may further include a pre-utterance determiner 151 determining whether it is a pre-utterance context, and a duplicate task processor 152. The storage 140 may further include a pre-utterance condition table 145*a* storing pre-utterance conditions, and a task processing DB 145*b*.

Data stored in the context information DB 142, the long-term memory 143, and the short-term memory 144 may be transmitted to the pre-utterance determiner 151. The pre-utterance determiner 151 may analyze the transmitted data and determine whether the transmitted data satisfies the pre-utterance condition stored in the pre-utterance condition table 145*a*.

Referring to an example of FIG. 22A, in the pre-utterance condition table 145*a*, a pre-utterance condition related to context information and a pre-utterance message, which is output when a corresponding pre-utterance condition is satisfied, may be stored for each context information.

When the context information transmitted from the context information DB 142 satisfies the pre-utterance condition, the pre-utterance determiner 151 may determine that it is the pre-utterance context, and generate a pre-utterance trigger signal.

The pre-utterance determiner 151 may transmit the pre-utterance trigger signal to the context understanding portion 112*c* with a pre-utterance message corresponding to the corresponding pre-utterance context. Further, the pre-utterance determiner 151 may transmit information related to the corresponding pre-utterance context. The information related to the corresponding pre-utterance context may include a pre-utterance condition corresponding to the corresponding pre-utterance context or an action corresponding to the pre-utterance context, described later.

For example, when context information is related to a tire air pressure and the tire air pressure is equal to or less than a predetermined reference value, the pre-utterance condition may be satisfied. When the pre-utterance condition of the tire air pressure is satisfied, the pre-utterance determiner 151 may determine that a pre-utterance context is caused by the tire air pressure shortage, and generate a pre-utterance trigger signal.

The pre-utterance determiner 151 may transmit the pre-utterance trigger signal with a pre-utterance message, to the context understanding portion 112*c*. For example, in the pre-utterance context caused by the tire air pressure shortage, a pre-utterance message indicating that the tire air pressure is low such as "tire pressure is too low", may be transmitted to the context understanding portion 112*c*.

In addition, when context information is related to an engine temperature and the engine temperature is equal to or higher than a predetermined reference value, the pre-utterance condition may be satisfied. When the pre-utterance condition of the engine temperature is satisfied, the pre-utterance determiner 151 may determine that a pre-utterance context is caused by the abnormality in the engine temperature, and generate a pre-utterance trigger signal.

The pre-utterance determiner 151 may transmit the pre-utterance trigger signal with a pre-utterance message, to the context understanding portion 112*c*. For example, in the pre-utterance context caused by the abnormality in the engine temperature, a pre-utterance message indicating that the engine is overheated such as "engine temperature is too high", may be transmitted to the context understanding portion 112*c*.

In addition, when context information is related to a remaining amount of gasoline and the remaining amount of gasoline is equal to or less than a predetermined reference value, the pre-utterance condition may be satisfied. When the user sets a destination using the navigation service of the vehicle, the predetermined reference value may be set based on a distance from the current position to the destination. When the destination is not set, a default value may be applied as the reference value. For example, when a value smaller than a reference value for indicating a fuel shortage warning lamp, may be set as the reference value for the pre-utterance condition related to the remaining amount of gasoline shortage. When the pre-utterance condition of the remaining amount of gasoline is satisfied, the pre-utterance determiner 151 may determine that a pre-utterance context is caused by the shortage of the remaining amount of gasoline, and generate a pre-utterance trigger signal.

The pre-utterance determiner 151 may transmit the pre-utterance trigger signal with a pre-utterance message, to the context understanding portion 112*c*. For example, in the pre-utterance context caused by the shortage of the remaining amount of gasoline, a pre-utterance message indicating that the remaining amount of gasoline is insufficient such as "the remaining amount of gasoline is not enough to the destination", may be transmitted to the context understanding portion 112*c*.

However, the pre-utterance condition and the pre-utterance message shown in FIG. 22A are merely examples that can be applied to the dialogue system 100. In the above-described example, a case in which the pre-utterance message corresponding to the pre-utterance context is a content informing the current situation has been described. However, it may be also possible that the dialogue system 100 first suggests execution of a specific function or service required for the pre-utterance context.

Referring to FIG. 22B, when the pre-utterance context is caused by the tire air pressure shortage or the abnormality in the engine temperature, it may be possible to store a pre-utterance message corresponding to a content, which proactively suggests a repair shop reservation service, such as "do you want to book the repair shop?".

In addition, when the pre-utterance context is caused by the shortage of remaining gasoline, it may be possible to store a pre-utterance message corresponding to a content, which proactively suggests a gasoline station guidance service, such as "do you want to guide the gasoline station?".

In addition, when the pre-utterance context is caused by the internal temperature of the vehicle and when the internal temperature of the vehicle is out of a predetermined reference range, a pre-utterance condition may be satisfied. When the pre-utterance condition of the internal temperature of the vehicle is satisfied, the context understanding portion 112*c* may determine that a pre-utterance context is caused by the abnormality in the internal temperature of the vehicle, and generate a pre-utterance trigger signal.

In the pre-utterance context caused by the abnormality in the internal temperature of the vehicle, it may be possible to store a pre-utterance message corresponding to a content, which proactively suggests an internal temperature control function, such as "do you want to operate the air conditioner?".

In addition, when the context information is related to the microphone input and when a microphone input value is equal to or less than a predetermined reference value, a pre-utterance condition may be satisfied. When the pre-utterance condition of the microphone input is satisfied, the context understanding portion 112c may determine that it is a pre-utterance context for changing the mood, and generate a pre-utterance trigger signal. Accordingly, it may be possible to store a pre-utterance message corresponding to a content, which proactively suggests a multi-media playing service, such as "do you want to play the music?".

In addition, when the context information is related to the open and close of the window and whether it is raining, and when the window is open and it is raining, the pre-utterance condition may be satisfied. When the window is open and it is raining, the context understanding portion 112c may determine that a pre-utterance context is caused by the open of the window, and generate a pre-utterance trigger signal.

In the pre-utterance context caused by the open of the window, it may be possible to store a pre-utterance message corresponding to a content, which proactively suggests a window close function, such as "do you want to close the window?".

In the above-mentioned example of FIGS. 22A and 22B, a case in which the pre-utterance message corresponding to the pre-utterance context is pre-stored in the pre-utterance condition table 145a has been described. However, the example of the dialogue system 100 is not limited thereto, and thus an action corresponding to the pre-utterance context may be pre-stored.

As mentioned above, when the user's utterance is input, the natural language understanding portion 111b may extract an action corresponding to the user's utterance with reference to the domain/action inference rule DB 141. When the dialogue system 100 outputs the pre-utterance, an action corresponding to the pre-utterance context may be pre-stored upon each pre-utterance context, as illustrated in FIG. 22C.

For example, when the pre-utterance context is caused by the abnormality in the tire air pressure and the engine temperature, "repair shop guidance" may be stored as the corresponding action, and when the pre-utterance context is caused by the lack of remaining amount of gasoline, "gasoline station guidance" may be stored as the corresponding action.

In addition, when the pre-utterance context is caused by the abnormality in the internal temperature of the vehicle, "the air conditioner operation" may be stored as the corresponding action, and when the pre-utterance context is for the change of mood, "multi-media play" may be stored as the corresponding action. When the pre-utterance context is caused by the open of the window, "the open and close of the window" may be stored as the corresponding action.

As mentioned above, when the action corresponding to the pre-utterance context is pre-stored, the pre-utterance trigger signal with the action corresponding to the pre-utterance context may be transmitted to the context understanding portion 112c, and the dialogue input manager 111c may input the pre-utterance trigger signal with the action corresponding to the pre-utterance context, to the dialogue manager 120. In this case, an operation, which is the same as a case in which the user utterance is input, may be performed in the dialogue manager 120.

For another example, in the pre-utterance condition table 145a, the pre-utterance context may be stored in such a manner that the pre-utterance context is matched with a virtual user utterance corresponding to each of the pre-utterance context, and the pre-utterance determiner 151 may generate a virtual user utterance corresponding to the pre-utterance context. The pre-utterance determiner 151 may transmit the user utterance which is stored in the pre-utterance condition table 145a or generated by the pre-utterance determiner 151, to the natural language understanding portion 111b in the text type. For example, when the pre-utterance context is caused by the abnormality in the tire air pressure, a virtual user utterance, such as "check the tire pressure" or "guide to the repair shop" may be stored or generated. In addition, when the pre-utterance context is caused by the abnormality in the internal temperature of the vehicle, a virtual user utterance, such as "turn on the air conditioner" may be stored or generated.

In addition, according to the mobile gateway method in which the mobile device 400 acts as a gateway between the vehicle and the dialogue system 100, the dialogue system client 470 of the mobile device 400 may perform some of operations of the pre-utterance determiner 151. In this case, the dialogue system client 470 may generate a virtual user utterance corresponding to the pre-utterance context and transmit the virtual user utterance to the natural language understanding portion 111b.

The natural language understanding portion 111b may extract a domain and an action corresponding to the transmitted virtual user utterance, and transmit the domain and action to the dialogue input manager 111c. The action extracted by the natural language understanding portion 111b may become an action corresponding to the pre-utterance context. A process, which is performed after the action corresponding to the pre-utterance context is transmitted to the dialogue manager 120, may be performed in the same manner as the case in which the user firstly utters.

The above-mentioned context information, pre-utterance condition, pre-utterance message, and action are merely examples applied to embodiments of the dialogue system 100, but embodiments of the dialogue system 100 are not limited thereto. In addition, a variety of context information, pre-utterance conditions, pre-utterance messages, and actions may be stored.

When the pre-utterance determiner 151 transmits information related to the pre-utterance trigger signal and the pre-utterance context, to the context understanding portion 112c, the context understanding portion 112c may transmit the information related to the pre-utterance context, to the duplicate task processor 152.

The duplicate task processor 152 may determine whether a task, which is related to the pre-utterance context that currently occurs, is already processed, or whether the task is a duplicate task.

In the task processing DB 145b, information related to the task which is already processed or currently processed may be stored. For example, dialogue history (including dialogue content and each dialogue time), a vehicle state and whether a task is completed in the dialogue time, etc. may be stored. In addition, a result of processing and a task process, such as a route guidance using the navigation function regardless of the dialogue, may be stored.

Particularly, when the pre-utterance context is caused by the lack of remaining amount of gasoline, the duplicate task processor 152 may determine whether a gasoline station guidance task is currently processed or not, based on the information stored in the task processing DB 145b. When a dialogue for the gasoline station guidance is currently performed or a gasoline station guidance action is currently performed, the duplicate task processor 152 may determine that a task related to the current pre-utterance context, is a duplicate task, and terminate the pre-utterance context.

Further, when an utterance for the gasoline station guidance is previously output and when a dialogue history in which a user rejects the gasoline station guidance, is present, the duplicate task processor 152 may determine that a task related to the current pre-utterance context, is a duplicate task, and terminate the pre-utterance context.

Further, when the gasoline station guidance task using the navigation function is currently processed regardless of the dialogue history for the gasoline station guidance, the duplicate task processor 152 may determine that a task related to the current pre-utterance context, is a duplicate task, and terminate the pre-utterance context. The duplicate task processor 152 may recognize that the gasoline station guidance task using the navigation function is currently processed, based on the information stored in the task processing DB 145*b*.

Further, when a reference period of time is not elapsed from when a dialogue, which is related to the guidance of the remaining amount of gasoline, is performed, it may be assumed that the user drives to the gasoline station by himself or herself although the gasoline station guidance is currently not performed. Therefore, the duplicate task processor 152 may determine that a task related to the current pre-utterance context, is a duplicate task, and terminate the pre-utterance context.

Further, in a state in which a pre-utterance context is for indicating a schedule based on information, such as user's birthday or family members birthday, stored in the long-term memory 143, when a dialogue history, in which the same schedule is previously guided, is present and a reference period of time is not elapsed from when the corresponding dialogue is performed, the duplicate task processor 152 may determine that a task related to the current pre-utterance context, is a duplicate task and terminate the pre-utterance context.

That is, the duplicate task processor 152 may determine whether the pre-utterance is previously output, and the user intention about the pre-utterance context, based on the dialogue history stored in the task processing DB 145*b*. The duplicate task processor 152 may determine whether it is the duplicate task, based on the stored dialogue time, the user's intention, the vehicle state or the completion of the task.

In the duplicate task processor 152, a policy configured to determine whether it is the duplicate task, that is, whether to terminate the pre-utterance context, based on the information stored in the task processing DB 145*b*, may be stored. The duplicate task processor 152 may determine whether the task related to the current pre-utterance context, is a duplicate task, according to the stored policy, and when it is determined that it is the duplicate task, the duplicate task processor 152 may terminate the pre-utterance context.

In the above-mentioned example, a case in which the dialogue system 100 includes the pre-utterance determiner 151, the duplicate task processor 152, the pre-utterance condition table 145*a* and the task processing DB 145*b* has been described.

However, the example of the dialogue system 100 is not limited thereto, and thus it may be possible for the components shown in FIGS. 19A and 19B to perform the operation of the above-mentioned components.

For example, the context understanding portion 112*c* may perform the operation of the pre-utterance determiner 151 corresponding to determining whether to satisfy the pre-utterance condition, and the operation of the duplicate task processor 152 corresponding to processing the duplicate task.

The information stored in the pre-utterance condition table 145*a* may be stored in the context understating table 145 and the information stored in the task processing DB 145*b* may be stored in a dialogue and action state DB 147 described later.

Figure 23:
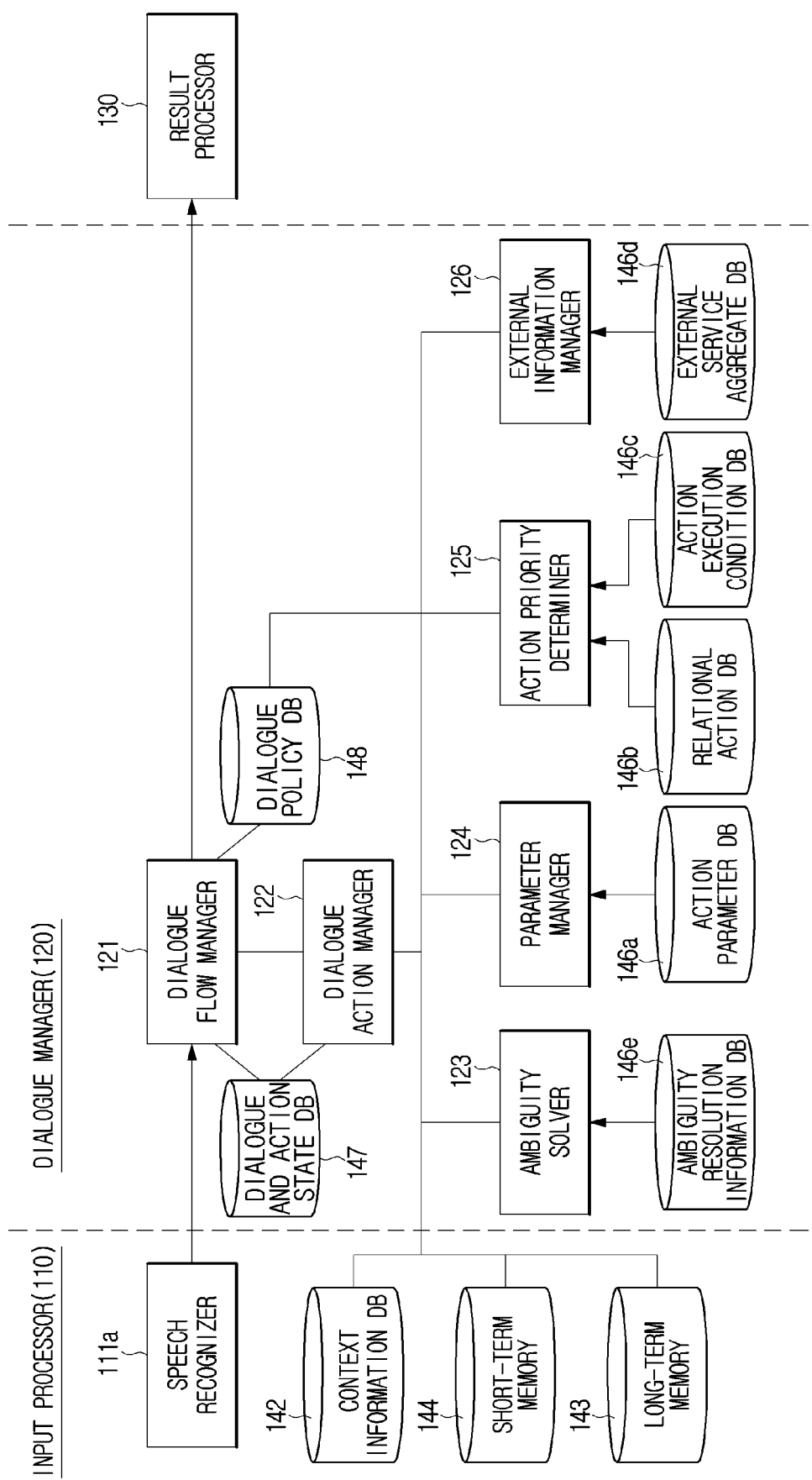
FIG. 23 is a control block diagram illustrating a configuration of a dialogue manager in detail.
Figure 24:
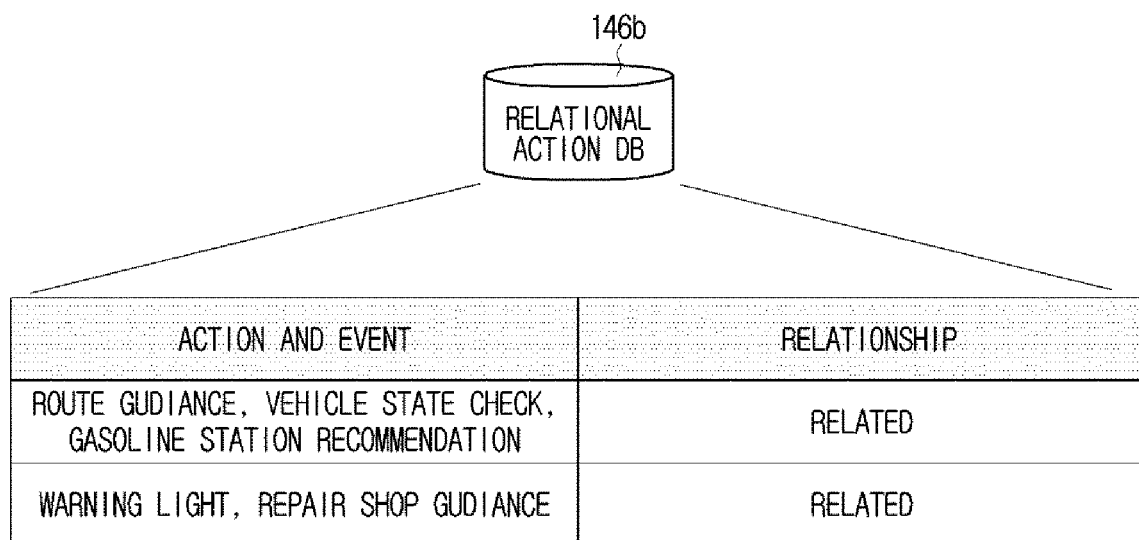
FIG. 24 is a view illustrating an example of information stored in a relational action DB.
Figure 25:
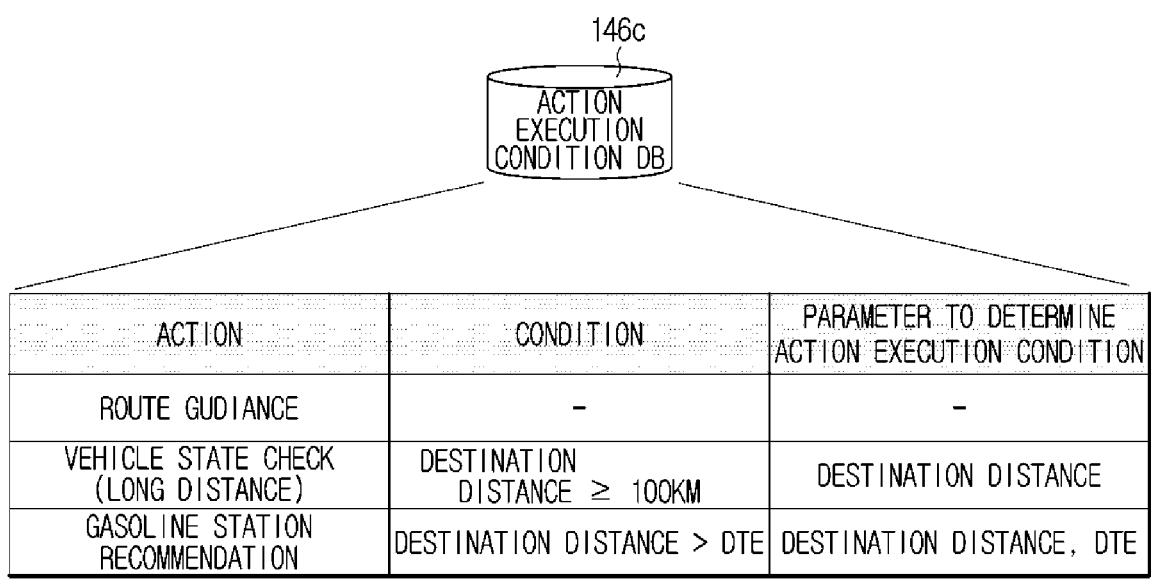
FIG. 25 is a view illustrating an example of information stored in an action execution condition DB.
Figure 26:
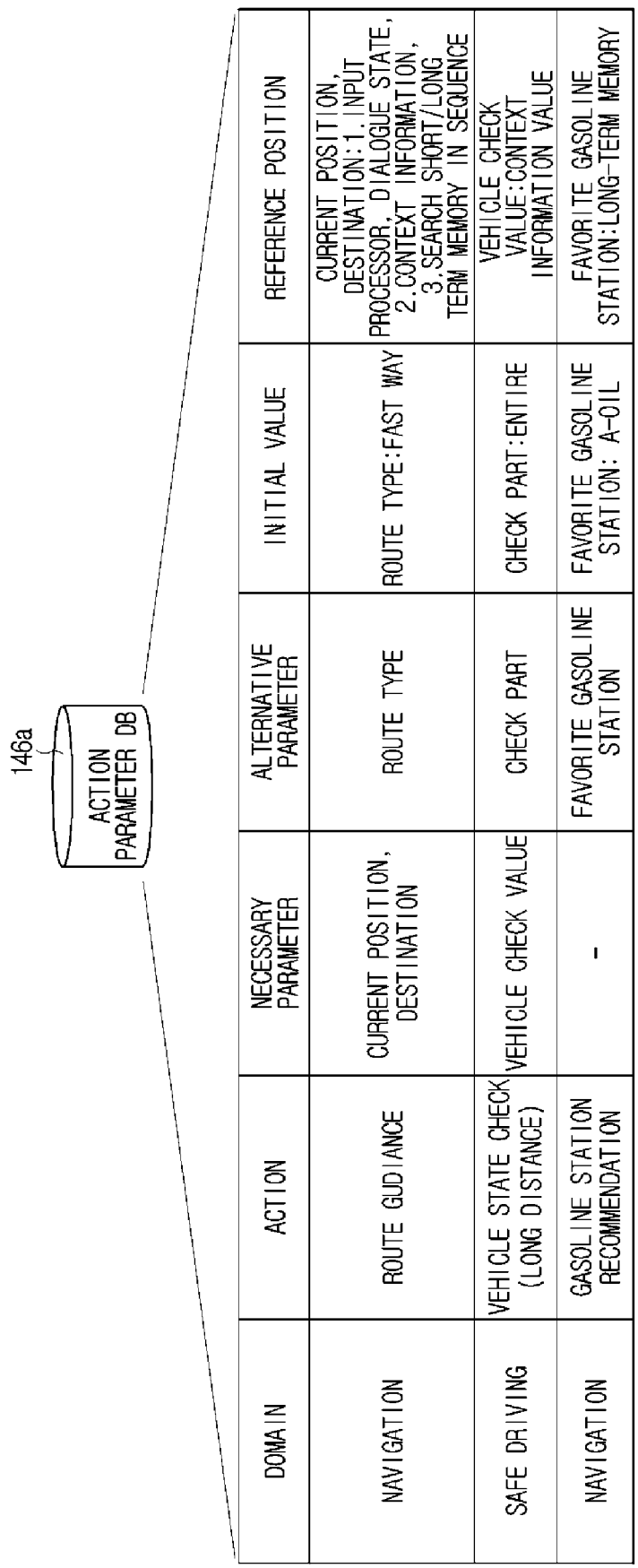
FIG. 26 is a view illustrating an example of information stored in an action parameter DB.

FIG. 23 is a control block diagram illustrating a configuration of a dialogue manager in detail, FIG. 24 is a view illustrating an example of information stored in a relational action DB, FIG. 25 is a view illustrating an example of information stored in an action execution condition DB, and FIG. 26 is a view illustrating an example of information stored in an action parameter DB.

Referring to FIG. 23, the dialogue manager 120 may include a dialogue flow manager 121 requesting for generating, deleting and updating dialogue or action; a dialogue action manager 122 generating, deleting and updating dialogue or action according to the request of the dialogue flow manager 121; an ambiguity solver 123 clarifying a user's intention by resolving an ambiguity of context and an ambiguity of dialogue; a parameter manager 124 managing parameters needed for the action execution; an action priority determiner 125 determining whether an action is executable about a plurality of candidate actions; and an external information manager 126 managing an external content list and related information, and managing parameter information for an external content query.

The dialogue manager 120 may include a memory in which a program for performing the above-described operation and the operation described later is stored, and a processor for executing the stored program. At least one memory and one processor may be provided, and when a plurality of memory and processors are provided, they may be integrated on one chip or physically separated.

Each component contained in the dialogue manager 120 may be implemented by the same processor or by a separate processor.

In addition, the dialogue manager 120 and the input processor 110 may be implemented by the same processor or by a separate processor.

When the user utterance is input or when the user utterance matched with the pre-utterance context is transmitted to the natural language understanding portion 111*b*, the dialogue input manager 111*c* may transmit the result of the natural language understanding (the output of the natural language understanding portion) and context information (the output of the context understanding portion) to the dialogue flow manager 121. In addition, when the pre-utterance context occurs, the dialogue input manager 111*c* may transmit the pre-utterance trigger signal.

The output of the natural language understanding portion 111*b* may include information which is related to the user's utterance content, e.g., a morphological analysis result, as well as information, e.g., domain and action. The output of the context understanding portion 112*c* may include events determined by the context information collection manager 112*b*, as well as the context information.

The dialogue flow manager 121 may search for whether a dialogue task or an action task corresponding to the input by the dialogue input manager 111*c* is present in the dialogue and action state DB 147.

The dialogue and action state DB 147 may be a storage space for managing the dialogue state and the action state, and thus the dialogue and action state DB 147 may store currently progressing dialogue and action, and dialogue state and action state related to preliminary actions to be processed. For example, the dialogue and action state DB 147 may store states related to completed dialogue and action, stopped dialogue and action, progressing dialogue and action, and dialogue and action to be processed.

The dialogue and action state DB 147 may store last output state related to whether to switch and to nest an action, switched action index, action change time, and screen/voice/command.

For example, in a case in which the domain and the action corresponding to a user utterance is extracted, when dialogue and action corresponding to the corresponding domain and action is present in the most recently stored dialogue, the dialogue and action state DB 147 may determine it as the dialogue task or action task corresponding to the input from the dialogue input manager 111*c*.

When the domain and the action corresponding to a user utterance is not extracted, the dialogue and action state DB 147 may generate a random task or request that the dialogue action manager 122 refers to the most recently stored task.

When the dialogue task or action task corresponding to the input of the input processor 110 is not present in the dialogue and action state DB 147, the dialogue flow manager 121 may request that the dialogue action manager 122 generates new dialogue task or action task.

Further, when the pre-utterance trigger signal is transmitted from the input processor 110, it may be possible to temporarily stop the dialogue task or the action task although the dialogue task or the action task, which is currently performed, is present, and it may be possible to firstly generate a dialogue task or an action task corresponding to the pre-utterance context. In addition, it may be possible to select the priority according to the established rules.

When the pre-utterance trigger signal and an action corresponding to the pre-utterance trigger signal are input from the dialogue input manager 111*c*, the dialogue flow manager 121 may request that the dialogue action manager 122 generates new dialogue task or action task, which is the same manner as the case in which the action is obtained from the user utterance.

Further, when the pre-utterance trigger signal and a pre-utterance message corresponding to the pre-utterance trigger signal are input from the dialogue input manager 111*c*, the dialogue flow manager 121 may request that the dialogue action manager 122 generates new dialogue task or action task for outputting the input pre-utterance message.

When the dialogue flow manager 121 manages the dialogue flow, the dialogue flow manager 121 may refer to a dialogue policy DB 148. The dialogue policy DB 148 may store a policy to continue the dialogue, wherein the policy may represent a policy for selecting, starting, suggesting, stopping and terminating the dialogue.

In addition, the dialogue policy DB 148 may store a point of time in which a system outputs a response, and a policy about a methodology. The dialogue policy DB 148 may store a policy for generating a response by linking multiple services and a policy for deleting previous action and replacing the action with another action.

For example, two policies may be allowed, wherein the two polices may include a policy in which a response for two actions is generated at once, e.g., "Is it needed to perform B action after performing A action?" and a policy in which a separate response for another action is generated after a response for an action is generated, e.g., "A action is executed"☐→"Do you want to execute B action?".

The dialogue and action state DB 147 may store a policy for determining the priority among the candidate actions. A priority determination policy will be described later.

The dialogue action manager 122 may designate a storage space to the dialogue and action state DB 147 and generate dialogue task and action task corresponding to the output of the input processor 110.

When it is impossible to extract a domain and an action from the user's utterance, the dialogue action manager 122 may generate a random dialogue state. In this case, as mentioned later, the ambiguity solver 123 may identify the user's intention based on the content of the user's utterance, the environment condition, the vehicle state, and the user information, and determine an action appropriate for the user's intention.

When the dialogue task or action task corresponding to the output of the input processor 110 is present in the dialogue and action state DB 147, the dialogue flow manager 121 may request that the dialogue action manager 122 refers to the corresponding dialogue task or action task.

The action priority determiner 125 may search the relational action DB 146*b* to search for an action list related to the action or the event contained in the output of the input processor 110, and then the action priority determiner 125 may extract the candidate action. As illustrated in FIG. 24, the relational action DB 146*b* may indicate actions related to each other, a relationship among the actions, an action related to an event and a relationship among the events. For example, the route guidance, the vehicle state check, and gasoline station recommendation may be classified as the relational action, and a relationship thereamong may correspond to an association.

Therefore, when executing the route guidance, the vehicle state check and gasoline station recommendation may be performed together. In this case, "performing together" may include a case in which the vehicle state check and gasoline station recommendation are performed before or after the route guidance and a case in which the vehicle state check and gasoline station recommendation are performed during the route guidance (e.g., adding as a stopover).

A warning light output event may be stored as an event-action related to a repair shop guidance action and a relationship therebetween may correspond to an association.

When the warning light output event occurs, the repair shop guidance action may be performed according to the warning light type or whether to need the repair.

When the input processor 110 transmit an action corresponding to the user's utterance together with an event determined by the context information collection manager 112*b*, an action related to the action corresponding to the user's utterance and an action related to the event may become a candidate action.

The extracted candidate action list may be transmitted to the dialogue action manager 122 and the dialogue action manager 122 may update the action state of the dialogue and action state DB 147 by adding the candidate action list.

The action priority determiner 125 may search for conditions to execute each candidate action in an action execution condition DB 146*c*.

As illustrated in FIG. 25, the action execution condition DB 146*c* may store conditions, which are needed for performing the action, and parameters, which are to determine whether to meet the corresponding condition, according to each action.

For example, an execution condition for the vehicle state check may be a case in which a destination distance is equal to or greater than 100 km, wherein a parameter for determining the condition may correspond to the destination distance. A condition for the gasoline station recommendation may be a case in which a destination distance is greater than a distance to empty (DTE), wherein a parameter for determining the condition may correspond to the destination distance and the distance to empty (DTE).

The action priority determiner 125 may transmit the execution condition of the candidate action to the dialogue action manager 122 and the dialogue action manager 122 may add the execution condition according to each candidate action and update the action state of the dialogue and action state DB 147.

The action priority determiner 125 may search for a parameter that is needed to determine an action execution condition (hereinafter refer to condition determination parameter), from the context information DB 142, the long-term memory 143, the short-term memory 144 or the dialogue and action state DB 147, and determine whether it is possible to execute the candidate action, using the searched parameter.

When a parameter used to determine an action execution condition is not stored in the context information DB 142, the long-term memory 143, the short-term memory 144 or the dialogue and action state DB 147, the action priority determiner 125 may bring the needed parameter from the external content server 300 via the external information manager 126.

The action priority determiner 125 may determine whether it is possible to perform the candidate action using the parameter used to determine an action execution condition. In addition, the action priority determiner 125 may determine the priority of the candidate action based on whether to perform the candidate action and priority determination rules stored in the dialogue policy DB 148.

A score for each candidate action may be calculated according to the current situation. A higher priority may be given to a candidate action having more of calculated score. For example, an action corresponding to the user's utterance, a safety score, a convenience score, a processing time, a processing point of time (whether to immediately process or not), a user preference (the user's reception level when suggesting a service or a preference pre-determined by a user), an administrator score, a score related to vehicle state, and an action success rate (dialogue success rate) may be used as a parameter for calculating the score, as illustrated in the following equation 1. w1, w2, w3, w4, w5, w6, w7, w8, and w9 represent a weight value for each parameter.

Priority score=$w1$\*user utterance action+$w2$\*safety score+$w3$\*convenience score+$w4$\*processing time+$w5$\*processing point of time+$w6$\*user preference+$w7$\*administrator score+$w8$\*score related to vehicle state+$w9$\*action success rate\*possibility of action execution (1: possible, not yet known, 0: impossible)\*action completion status (completion: 1, incompletion: 0). [Equation 1]

As mentioned above, the action priority determiner 125 may provide the most needed service to a user by searching for an action directly connected to the user's utterance and context information and an action list related thereto, and by determining a priority therebetween.

The action priority determiner 125 may transmit the possibility of the candidate action execution and the priority to the dialogue action manager 122 and the dialogue action manager 122 may update the action state of the dialogue and action state DB 147 by adding the transmitted information.

The parameter manager 124 may search for a parameter used to perform each candidate action (hereinafter refer to action parameter) in an action parameter DB 146a.

As illustrated in FIG. 26, the action parameter DB 146a may store a necessary parameter, an alternative parameter, an initial value of parameter and a reference position for bring the parameter, according to each action. In a state in which the initial value of parameter is stored, when a parameter value corresponding to the corresponding parameter is not present in the user's utterance and the context information output from the input processor 110 and when the parameter value is not present in the context information DB 142, it may be possible to perform an action according to the stored initial value or it may be possible to confirm whether to perform an action according to the stored initial value, to a user.

For example, the necessary parameter used for the route guidance may include the current position and the destination, and the alternative parameter may include the type of route. An initial value of the alternative parameter may be stored as a fast route. The current position and the destination may be acquired by searching the dialogue and action state DB 147, the context information DB 142, the short-term memory 144 or the long-term memory 143 in an order.

The necessary parameter used for the vehicle state check may include vehicle state information, and the alternative parameter may include a part to be examined (hereinafter referred as "check part"). An entire part may be stored as an initial value of the alternative parameter. The vehicle state information may be acquired from the context information DB 142.

The alternative parameter for the gasoline station recommendation may include a favorite gasoline station, and "A oil" may be stored as an initial value of the alternative parameter. The favorite gasoline station may be acquired from the long-term memory 143. The alternative parameter may further include the fuel type of the vehicle, and the fuel price.

As mentioned above, the parameter manager 124 may bring the parameter value of the parameter searched in the action parameter DB 146a, from the corresponding reference position. The reference position from which the parameter value is brought may be at least one of the context information DB 142, the short-term memory 144 or the long-term memory 143, the dialogue and action state DB 147, and the external content server 300.

The parameter manager 124 may bring the parameter value from the 300 via the external information manager 126. The external information manager 126 may determine from which information is brought, by referring to the external service aggregate DB 146d.

The external service aggregate DB 146d may store information related to the external content server connected to the dialogue system 100. For example, the external service aggregate DB 146d may store external service name, explanation about an external service, the type of information provided from an external service, external service using method, and a subject of providing the external service.

The initial value acquired by the parameter manager 124 may be transmitted to the dialogue action manager 122 and the dialogue action manager 122 may update the dialogue and action state DB 147 by adding the initial value according to the candidate action to the action state.

The parameter manager 124 may acquire initial values of all of the candidate actions or the parameter manager 124 may acquire only initial values of the candidate actions which are determined to be executable by the action priority determiner 125.

The parameter manager 124 may selectively use an initial value among a different type of initial values indicating the same information. For example, "Seoul station" indicating the destination and which is in the form of text may be converted into "Seoul station" in the form of POI, by using a destination search service by the navigation system.

When the ambiguity is not present in the dialogue and the context, it may be possible to acquire the needed information and to manage the dialogue and action according to the above mentioned operation of the action priority determiner 125, the parameter manager 124 and the external information manager 126. When the ambiguity is present in the dialogue and the context, it may be difficult to provide a service needed for the user using only an operation of the action priority determiner 125, the parameter manager 124 and the external information manager 126.

In this case, the ambiguity solver 123 may deal with the ambiguity in the dialogue or in the context. For example, when anaphora, e.g., the person, that place on yesterday, father, mother, grandmother, and daughter-in-law, is contained in the dialogue, there may be ambiguity because it is not clear that the anaphora represents whom or which. In this case, the ambiguity solver 123 may resolve the ambiguity by referring to the context information DB 142, the long-term memory 143 or the short-term memory 144 or provide a guidance to resolve the ambiguity.

For example, an ambiguous word contained in "that place on yesterday", "the market near the house", and "Seoul station I went yesterday" may correspond to a parameter value of the action parameter or a parameter value of the condition determination parameter. However, in this case, it is impossible to perform a real action or to determine an action execution condition by using the corresponding word, due to the ambiguity of the word.

The ambiguity solver 123 may resolve the ambiguity of the initial value by referring to the information stored in the context information DB 142, the long-term memory 143 or the short-term memory 144. As needed, the ambiguity solver 123 may bring the needed information from the external content server 300 by using the external information manager 126.

For example, the ambiguity solver 123 may search for a place where a user went yesterday by referring to the short-term memory 144, so as to convert "that place on yesterday" into information that is available as a destination for the route guidance action. The ambiguity solver 123 may search for a user's house address by referring to the long-term memory 143 and bring location information related to A market near the user's house address, from the external content server 300. Therefore, the ambiguity solver 123 may convert "A market near house" into information that is available as a destination for the route guidance action.

When an action (object and operator) is not clearly extracted by the input processor 110 or when the user' intention is not clear, the ambiguity solver 123 may identify the user's intention by referring to an ambiguity resolution information DB 146e, and determine an action corresponding to the identified intention.

FIG. 27 is a table illustrating an example of information stored in the ambiguity resolution information DB.

Based on the vehicle state information and the surrounding environment information, the ambiguity resolution information DB 146e may match an utterance with an action corresponding to the utterance and then store the utterance and the action. The utterance stored in the ambiguity resolution information DB 146e may be an utterance in which an action cannot be extracted by the natural language understanding. FIG. 27 illustrates a case in which an utterance's content according to the morphological analysis result is that hands are freezing or hands are cold.

The surrounding environment information may include the outside temperature of the vehicle and whether it is raining, and the vehicle state information may include ON/OFF of air conditioner and heater and wind volume and wind direction of the air conditioner, and ON/OFF of the steering wheel heating wire.

Particularly, in a state in which the outside temperature is more than 20 degree while it is raining, when the air conditioner is turned on (ON), it may be identified that an air conditioner temperature is set to be low and thus "increasing an air conditioner temperature by 3 degree" may be stored as a vehicle control action corresponding thereto.

In a state in which the outside temperature is more than 20 degree while it is raining, when the air conditioner is turned off (OFF), it may be identified that the user feels the cold due to the rain, and thus "heater ON" may be stored as a vehicle control action corresponding thereto.

In a state in which the outside temperature is more than 20 degree while it is not raining, when the air conditioner is turned on (ON) and the wind direction of the air conditioner is an upside, it may be identified that hands are freezing since the wind of the air condition directly affects to the hands, and thus "changing the wind direction of the air conditioner to the down side" may be stored as a vehicle control action corresponding thereto.

In a state in which the outside temperature is more than 20 degree while it is not raining, when the air conditioner is turned on (ON), the wind direction of the air conditioner is the down side and the wind volume is set to be more than a middle level, it may be identified that a user feels the cold due to an excessively strong wind volume of the air conditioner, and thus "lowering the wind volume of the air conditioner" may be stored as a vehicle control action corresponding thereto.

In a state in which the outside temperature is more than 20 degree while it is not raining, when the air conditioner is turned on (ON), the wind direction of the air conditioner is the down side and the wind volume is set to be weak, "increasing an air conditioner temperature by 3 degree" may be stored as a vehicle control action corresponding thereto.

In a state in which the outside temperature is lower than 20 degree, when the heater is turned off (OFF), it may be identified that hands are freezing due to the cold weather, and thus "turning on heater" may be stored as a vehicle control action corresponding thereto.

In a state in which the outside temperature is lower than 20 degree, when the heater is turned on (ON) and the steering wheel heating wire is turned off, it may be identified that hands are freezing since hot air is not transmitted to the hands, and thus "steering wheel heating wire ON" may be stored as a vehicle control action corresponding thereto.

In a state in which the outside temperature is lower than 20 degree, when the heater and the steering wheel heating wire are turned on (ON) and the wind direction of the heater is the down side, it may be identified that hands are freezing since the wind of the heater is not transmitted to the hands, and thus "changing the wind direction of the heater to the bi-directions" may be stored as a vehicle control action corresponding thereto.

In a state in which the outside temperature is lower than 20 degree, the heater and the steering wheel heating wire are turned on (ON), the wind direction of the heater is the up side, when a heater temperature is set to be lower than the highest, "increasing the temperature of the heater" may be stored as a vehicle control action corresponding thereto.

In a state in which the outside temperature is lower than 20 degree, the heater and the steering wheel heating wire are turned on (ON), the wind direction of the heater is the up side, and the heater temperature is set to be the highest, when the volume of the heater is not set to be the highest, "increasing the wind volume of the heater" may be stored as a vehicle control action corresponding thereto.

In a state in which the outside temperature is lower than 20 degree, the heater and the steering wheel heating wire are turned on (ON), the wind direction of the heater is the up side, and a heater temperature and the wind volume of the heater are set to be the highest, when the seat heat line is turned off, "turning on the seat heat line" may be stored as a vehicle control action corresponding thereto.

In a state in which the outside temperature is lower than 20 degree, the heater and the steering wheel heating wire are turned on (ON), the wind direction of the heater is the up side, and the heater temperature and the wind volume of the heater are set to be the highest, when the seat heat line is turned on, "informing that wait for a while because heater is in full operation now" may be stored as a vehicle control action corresponding thereto.

FIGS. 28A and 28B are tables illustrating a variety of examples in which the vehicle control is performed since the ambiguity solver resolves the ambiguity by referring to the ambiguity resolution information DB and extracting an action.

For example, as illustrated in FIGS. 28A and 28B, in a state in which an utterance's content according to the morphological analysis result is that hands are freezing or hands are cold, when the surrounding environment is summer, the vehicle state is that the wind direction of the air conditioner is an upper side (upside) of the passenger's head, an air conditioner set temperature is 19 degree, and the wind volume of the air conditioner is a high level, it may be identified that hands are freezing since the wind of the air conditioner is directed to the hands. An air conditioner control action for lowering the wind volume strength while changing the wind direction to the foot side (downside) may be extracted as an action corresponding to the utterance and it may be possible to control the vehicle according to the extracted action.

In the utterance having the same content, when the surrounding environment is winter, the vehicle state is that the wind direction of the air conditioner is the passenger's feet, an air conditioner set temperature is 25 degree, and the wind volume of the air conditioner is a high level, it may be identified that hands are freezing since hot air is not transmitted to the hands. "Turning on steering wheel heat line" action may be extracted as an action corresponding to the utterance and it may be possible to control the vehicle according to the extracted action.

In a state in which an utterance's content according to the morphological analysis result is "stuffiness", when a vehicle speed is 30 km or less and a front and rear clearance is less than 30 cm, it may be identified that stuffiness is caused by the heavy traffic. Therefore, "changing a route option (fast route guidance) in the route guidance action", "playing a multi content, e.g., music", or "turning on chatting function" may be extracted as an action corresponding to the utterance and it may be possible to control the vehicle according to the extracted action.

In a state in which an utterance's content according to the morphological analysis result is "drowsiness", when the vehicle state is an internal air mode, it may be identified that the drowsiness is caused by the lack of air circulation. Therefore, "changing into an external air mode" may be extracted as an action corresponding to the utterance and it may be possible to control the vehicle according to the extracted action.

In the utterance having the same content, when the vehicle state is the external air mode and the heater is turned on (ON), it may be identified that the drowsiness is caused by the hot air emitted from the heater. "Opening window" may be extracted as an action corresponding to the utterance and it may be possible to control the vehicle according to the extracted action.

In a state in which an utterance's content according to the morphological analysis result is "sweating" or "hot", when the surrounding environment is winter and the heater is turned on (ON), it may be identified that the heat is caused by the hot air emitted from the heater. Therefore, "lowering the heater temperature" or "reducing the wind volume" may be stored as an action corresponding to the utterance.

In the utterance having the same content, when the surrounding environment is winter and when the heater is turned off (OFF), it may be identified that the heat is caused by the user' body heat. Therefore, "opening the window" or "suggesting opening the window" may be extracted as an action corresponding to the utterance and it may be possible to control the vehicle according to the extracted action.

In the utterance having the same content, when the surrounding environment is summer and when the air conditioner is turned off (OFF), it may be identified that the heat is caused by increased internal temperature of the vehicle. Therefore, "turning on the air conditioner" may be extracted as an action corresponding to the utterance and it may be possible to control the vehicle according to the extracted action.

In the utterance having the same content, when the surrounding environment is summer and when the air conditioner is turned on (ON), it may be identified that the heat is caused by the air conditioner temperature set to be high. Therefore, "lowering the air conditioner temperature" or "increasing the wind volume of the air conditioner" may be extracted as an action corresponding to the utterance and it may be possible to control the vehicle according to the extracted action.

In a state in which an utterance's content according to the morphological analysis result is "cold", when the surrounding environment is summer and when the air conditioner is turned on (ON), it may be identified that the cold is caused by the air conditioner temperature set to be excessively low or by the excessively strong wind of the air conditioner. Therefore, "increasing the air conditioner temperature" or "reducing the wind volume" may be extracted as an action corresponding to the utterance and it may be possible to control the vehicle according to the extracted action.

In the utterance having the same content, when the surrounding environment is summer and when the air conditioner is turned off (OFF), it may be identified that the cold is caused by the user's body condition. "Operating the heater" or "checking user's biorhythm" may be extracted as an action corresponding to the utterance and it may be possible to control the vehicle according to the extracted action.

In the utterance having the same content, when the surrounding environment is winter and the heater is turned on (ON), it may be identified that the cold is caused by the heater temperature set to be low or the weak wind volume. Therefore, "increasing the heater temperature" or "increasing the wind volume" may be extracted as an action corresponding to the utterance and it may be possible to control the vehicle according to the extracted action.

In the utterance having the same content, when the surrounding environment is winter and the heater is turned off (OFF), it may be identified that the cold is caused by the non-operation of the heater. "Operating the heater" may be extracted as an action corresponding to the utterance and it may be possible to control the vehicle according to the extracted action.

In a state in which an utterance's content according to the morphological analysis result is "head hurts", when the surrounding environment is winter and the heater is turned on (ON), it may be identified that the headache is caused by the lack of the air circulation. Therefore, "changing into an external air mode" or "opening the window" may be extracted as an action corresponding to the utterance and it may be possible to control the vehicle according to the extracted action.

In the utterance having the same content, when the surrounding environment is winter and the heater is turned off (OFF), it may be identified that the headache is caused by the cold. "Operating the heater" may be extracted as an action corresponding to the utterance and it may be possible to control the vehicle according to the extracted action.

In the utterance having the same content, when the surrounding environment is summer and the air conditioner is turned off (OFF), it may be identified that the headache is caused by the heat. "Operating the air conditioner" may be extracted as an action corresponding to the utterance and it may be possible to control the vehicle according to the extracted action.

In the utterance having the same content, when the surrounding environment is summer and the air conditioner is turned on (ON), it may be identified that the headache is caused by the air-conditioningitis. "Changing the wind direction or the wind volume of the air conditioner" may be extracted as an action corresponding to the utterance and it may be possible to control the vehicle according to the extracted action.

In a state in which an utterance's content according to the morphological analysis result is "uncomfortable", when the surrounding environment is winter and it is raining, it may be identified that the uncomfortableness is caused by the high humidity. Therefore, "operating defogging function" or "operating dehumidifying function" may be extracted as an action corresponding to the utterance and it may be possible to control the vehicle according to the extracted action.

In the utterance having the same content, when the surrounding environment is summer and it is not raining, it may be identified that the uncomfortableness is caused by the seasonal characteristics and the heat. Therefore, "operating the air conditioner at the lowest temperature" may be extracted as an action corresponding to the utterance and it may be possible to control the vehicle according to the extracted action.

In the utterance having the same content, when the surrounding environment is summer and it is raining, it may be identified that the uncomfortableness is caused by the heat and the high humidity. Therefore, "operating the air conditioner at the dehumidifying mode" may be extracted as an action corresponding to the utterance and it may be possible to control the vehicle according to the extracted action.

According to the operation of the ambiguity solver 123 described above, although there is the ambiguity in the user's utterance or situation, the ambiguity solver 123 may precisely identify an action that is actually desired by a user, or an action that is actually needed for a user, and provide the desired action and the needed action by integrally considering the surrounding environment information and the vehicle state information with the user's utterance.

The information related to the action determined by the ambiguity solver 123 may be transmitted to the dialogue action manager 122 and the dialogue action manager 122 may update the dialogue and action state DB 147 based on the transmitted information.

As mentioned above, the action priority determiner 125 and the parameter manager 124 may determine an action execution condition about the action determined by the ambiguity solver 123, determine the priority thereof and bring the parameter value.

When all of values are acquired wherein the values are acquired by the current context and dialogue, among parameter values used to execute each action, the dialogue action manager 122 may transmit a signal to the dialogue flow manager 121.

When the necessary parameter value for the action execution and the condition determination is acquired through the user since the necessary parameter is not present in the dialogue and action state DB 147, the external content server 300, the long-term memory 143, the short-term memory 144 and the context information DB 142, the result processor 130 may generate a dialogue response for asking parameter values to the user.

The dialogue flow manager 121 may transmit information and dialogue state related to an action corresponding to the first priority action to the result processor 130. In addition, the dialogue flow manager 121 may transmit the information related to the plurality of candidate actions, according to the dialogue policy.

When the dialogue system 100 outputs the pre-utterance, that is the pre-utterance trigger signal is generated by the input processor 110, the dialogue state transmitted from the result processor 130 may include the pre-utterance trigger signal. However, it is not required that the pre-utterance trigger signal is contained in the dialogue state, but any type of information may be contained in the dialogue state as long as indicating the pre-utterance context. When the information indicating the pre-utterance context is contained in the dialogue state, the result processor 130 may firstly output a dialogue response over than other type response, or output the dialogue response together with other type response.

In a state in which the dialogue system 100 outputs the pre-utterance, when a pre-utterance message corresponding to the pre-utterance context is input from the dialogue input manager 111c, it may be possible to transmit the pre-utterance message to the result processor 130 without the above-mentioned process of the ambiguity solution, the parameter management, and the action priority determination.

In a state in which the dialogue system 100 outputs the pre-utterance, when an action corresponding to the pre-utterance context is input from the dialogue input manager 111c, it may be possible to transmit the pre-utterance message to the result processor 130 with or without the above-mentioned process of the ambiguity solution, the parameter management, and the action priority determination.

Figure 29:
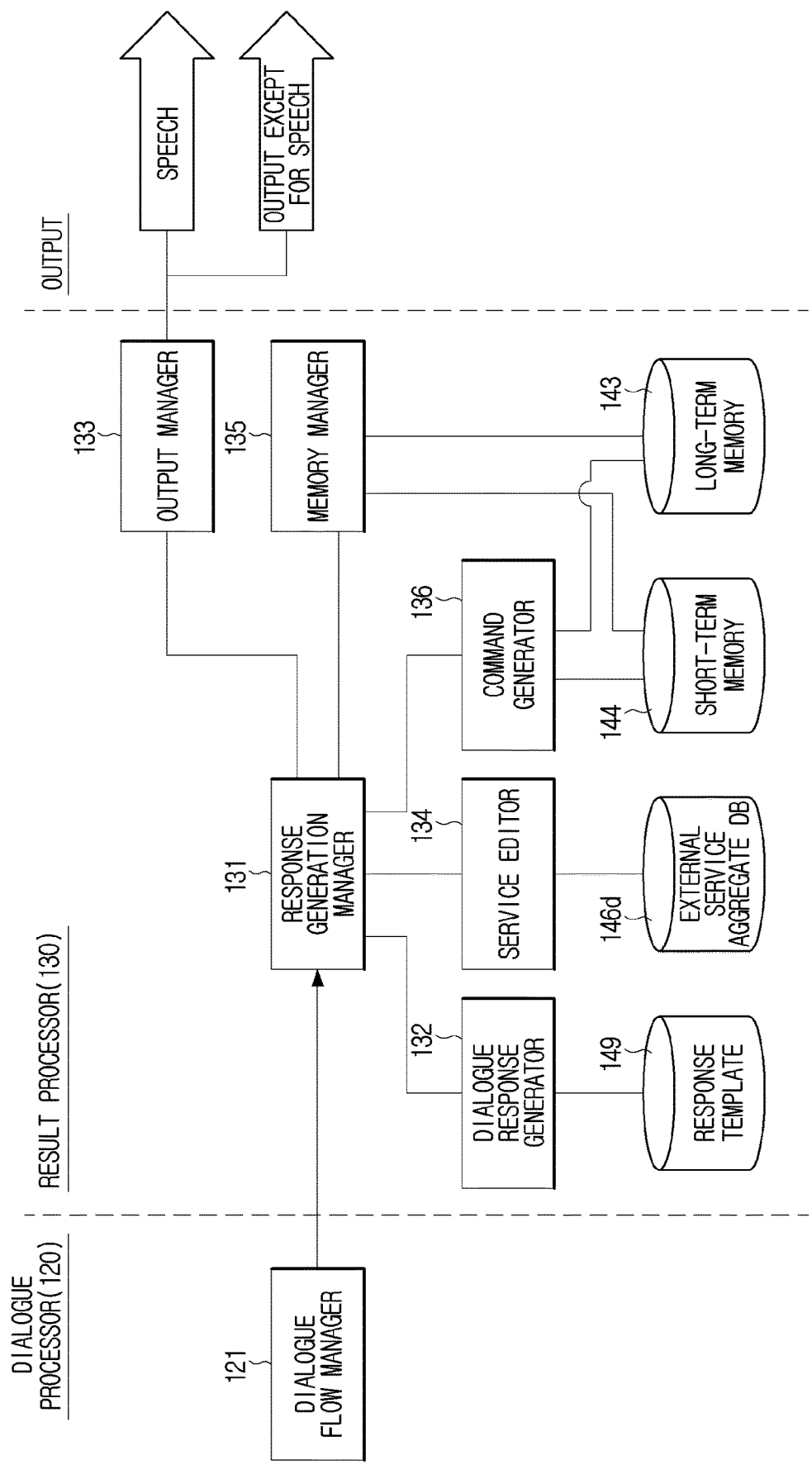
FIG. 29 is a control block diagram illustrating a configuration of the result processor in details.

FIG. 29 is a control block diagram illustrating a configuration of the result processor in details.

Referring to FIG. 29, the result processor 130 may include a response generation manager 131 managing generation of a response needed for executing an action input from the dialogue manager 120; a dialogue response generator 132 generating a response in text, image or audio type according to the request of the response generation manager 131; a command generator 136 generating a command for the vehicle control or the provision of service using an external content according to a request of the response generation manager 131; a service editor 134 sequentially or sporadically executing a plurality of service and collection a result thereof to provide a service desired by a user; an output manager 133 outputting the generated text type response, image type response, or audio type response, outputting the command generated by the command generator 136, or determining an order of the output when the output is plural; and a memory manager 135 managing the long-term memory 143 and the short-term memory 144 based on the output of the response generation manager 131 and the output manager 133.

The result processor 130 may include a memory in which a program for performing the above-described operation and the operation described later is stored, and a processor for executing the stored program. At least one memory and one processor may be provided, and when a plurality of memory and processors are provided, they may be integrated on a single chip or physically separated.

Each component contained in the result processor 130 may be implemented by the same processor or by a separate processor.

In addition, the result processor 130, the dialogue manager 120 and the input processor 110 may be implemented by the same processor or by a separate processor.

The response that is output by corresponding to the user's utterance or context may include the dialogue response, the vehicle control, and the external content provision. The dialogue response may include an initial dialogue, a question, and an answer including information. The dialogue response may be stored as database in a response template 149.

The response generation manager 131 may request that the dialogue response generator 132 and the command generator 136 generate a response that is needed to execute an action, which is determined by the dialogue manager 120. For this, the response generation manager 131 may transmit information related to the action to be executed, to the dialogue response generator 132 and the command generator 136, wherein the information related to the action to be executed may include an action name and a parameter value. When generating a response, the dialogue response generator 132 and the command generator 136 may refer to the current dialogue state and action state.

The dialogue response generator 132 may extract a dialogue response template by searching the response template 149, and generate the dialogue response by filling the extracted dialogue response template with the parameter value. The generated dialogue response may be transmitted to the response generation manager 131. When the parameter value needed to generate the dialogue response is not transmitted from the dialogue manager 120 or when an introduction of using the external content is transmitted, the dialogue response generator 132 may receive the parameter value from the external content server 300 or search the long-term memory 143, the short-term memory 144 or the context information DB 142.

For example, when the action determined by the dialogue manager 120 corresponds to the route guidance, the dialogue response generator 132 may search the response template 149 and then extract a dialogue response template "[duration:-] will be taken from [current position:-] to [destination:-]. Start the guidance?"

[Current position] and [destination] among parameters which are needed to be filled, in the dialogue response template may be transmitted from the dialogue manager 120, and a parameter value for [duration] may be not transmitted. In this case, the dialogue response generator 132 may request a duration that is taken from [current position] to [destination], to the external content server 300.

When the response to the user utterance or context includes the vehicle control or the external content provision, the command generator 136 may generate a command to execute the vehicle control or the external content provision. For example, when the action determined by the dialogue manager 120 is the control of the air conditioning device, window and AVN, the command generator 136 may generate a command to execute the control and then transmit the command to the response generation manager 131.

When the action determined by the dialogue manager 120 needs the external content provision, the command generator 136 may generate a command to receive the corresponding content from the external content server 300 and then transmit the command to the response generation manager 131.

When a plurality of commands is provided by the command generator 136, the service editor 134 may determine a method and an order to execute the plurality of commands and transmit the method and order to the response generation manager 131.

The response generation manager 131 may transmit the response, which is transmitted from the dialogue response generator 132, the command generator 136, or the service editor 134, to the output manager 133.

The output manager 133 may determine an output timing, an output sequence and an output position of the dialogue response generated by the dialogue response generator 132 and the command generated by the command generator 136.

The output manager 133 may output a response by transmitting the dialogue response generated by the dialogue response generator 132 and the command generated by the command generator 136 to an appropriate output position at an appropriate order with an appropriate timing. The output manager 133 may output Text to speech (TTS) response via the speaker 232 and a text response via the display 231. When outputting the dialogue response in the TTS type, the output manager 133 may use a TTS module provided in the vehicle 200 or alternatively the output manager 133 may include a TTS module.

According to the control target, the command may be transmitted to the vehicle controller 240 or the communication device 280 for communicating with the external content server 300.

The response generation manager 131 may also transmit the response transmitted from the dialogue response generator 132, the command generator 136, or the service editor 134, to the memory manager 135.

The output manager 133 may transmit a response that is output by itself, to the memory manager 135.

The memory manager 135 may manage the long-term memory 143 or the short-term memory 144 based on the content transmitted from the response generation manager 131 and the output manager 133. For example, the memory manager 135 may update the short-term memory 144 by storing the dialogue content between the user and the system, based on the generated and output dialogue response. The memory manager 135 may update the long-term memory 143 by storing information related to the user that is acquired by the dialogue with the user.

In the information stored in the short-term memory 144, the persistent information, e.g., user's preference or orientation, or information which is used to acquire the persistent information, may be stored in the long-term memory 143.

Based on the vehicle control and the external content request corresponding to the generated and output command, the user preference or the vehicle control history stored in the long-term memory 143 may be updated.

Meanwhile, in a state in which the dialogue system 100 outputs the pre-utterance before the user inputs the utterance, when the action corresponding to the pre-utterance context is input from the dialogue input manager 111c, the dialogue response generator 132 receiving information related to an action may extract a dialogue response template by searching the response template 149, and generate the dialogue response by filling the extracted dialogue response template with the parameter value. The generated dialogue response may be transmitted to the response generation manager 131. The dialogue response may become the pre-utterance of the dialogue system 100.

The response generation manager 131 may transmit the dialogue response transmitted from the dialogue response generator 132, to the output manager 133.

The output manager 133 may output the dialogue response generated by the dialogue response generator 132 via the speaker 232.

When the result processor 130 receives the pre-utterance message as it is, corresponding to the pre-utterance context, from the dialogue flow manager 121, the input pre-utterance message may become the dialogue response and the input pre-utterance message may be transmitted to the output manager 133.

The output manager 133 may output the transmitted pre-utterance message via the speaker 232.

When the user utterance is input after the dialogue system 100 outputs the pre-utterance, the operation that is the same as the operation for processing the user utterance may be performed.

According to the above mentioned embodiment, the dialogue system 100 may provide a service which is the most appropriate for a user, by considering a variety of situations occurring inside of the vehicle. Without inputting the user's utterance, the dialogue system 100 may determine a service needed for a user by itself based on the context information or the driver information, which is collected by itself, and proactively provide the service.

For example, evaluation criteria for the vehicle state may be variable according to the situation when starting the vehicle, and thus it may be possible to proactively provide a feed-back. A driving start time may be defined as a vehicle starting time, a point of time when releasing an electronic parking brake (EPB) or a point of time when setting a navigation destination. A vehicle condition evaluation system calculating a driving available score may give a weight to an individual device, and change a variable weight applied to the individual device, according to the situation factors. When it is determined that there is problems in the vehicle state, it may be possible to provide a solution about the individual device, e.g., a repair shop guidance.

It may be possible to determine whether the vehicle is lack of fuel or not by considering the destination when the vehicle starting. When the lack of fuel, it may be possible to perform adding a user's favorite gasoline station to an automatic stopover in the route to the destination, as a feedback of the lack of fuel, and to inform the user the change in the stopover. In addition, according to the user's response, the gasoline station which is added as the automatic stopover may be changed.

Although the current vehicle state does not indicate the lack of fuel, it may be possible to proactively provide a gasoline station or a refueling time by comprehensively considering a user's next schedule, a major moving record and an amount of remaining fuel.

By acquiring information related to driver's body condition and sleeping record, it may be possible to conditionally permit a vehicle starting based on the acquired information. For example, when recognizing the risk of the drowsy driving by recognizing the body conditions and the sleeping record in the outside of the vehicle, it may be possible to recommend that a user does not drive the vehicle. Alternatively, it may be possible to provide information related to a recommended driving time according to the body conditions or the sleeping record.

When a trigger indicating the risk of the drowsy driving occurs, repeatedly, it may be possible to detect the risk of the drowsy driving and output the warning according to the degree of the risk or to provide a feedback such as automatically changing the route, i.e., changing the route to a rest area. The trigger indicating the risk of the drowsy driving may be acquired by manually measuring the driver's state and the vehicle state, e.g., a case in which a hear rate is reduced, a case in which a front and rear clearance is a reference distance or more, a case in which the vehicle speed is a reference speed or less, or by active measurement via the dialogue, e.g., a case of uttering a question to a driver and measuring a driver's response speed to the question.

When a user inputs an utterance indication an emotion, the dialogue system 100 may not extract a certain domain or an action from the user's utterance. However, the dialogue system 100 may identity the user's intention by using the surrounding environment information, the vehicle state information and the user state information, and then continue the dialogue. As mentioned above, the embodiment may be performed by resolving the ambiguity of the user's utterance through the ambiguity solver 123.

Hereinafter an example of dialogue processing using the dialogue system 100 will be described in details.

FIGS. 30 to 42 are views illustrating a particular example in which the dialogue system 100 processes an input, manages a dialogue, and outputs a result when a user inputs an utterance related to a route guidance.

Figure 30:
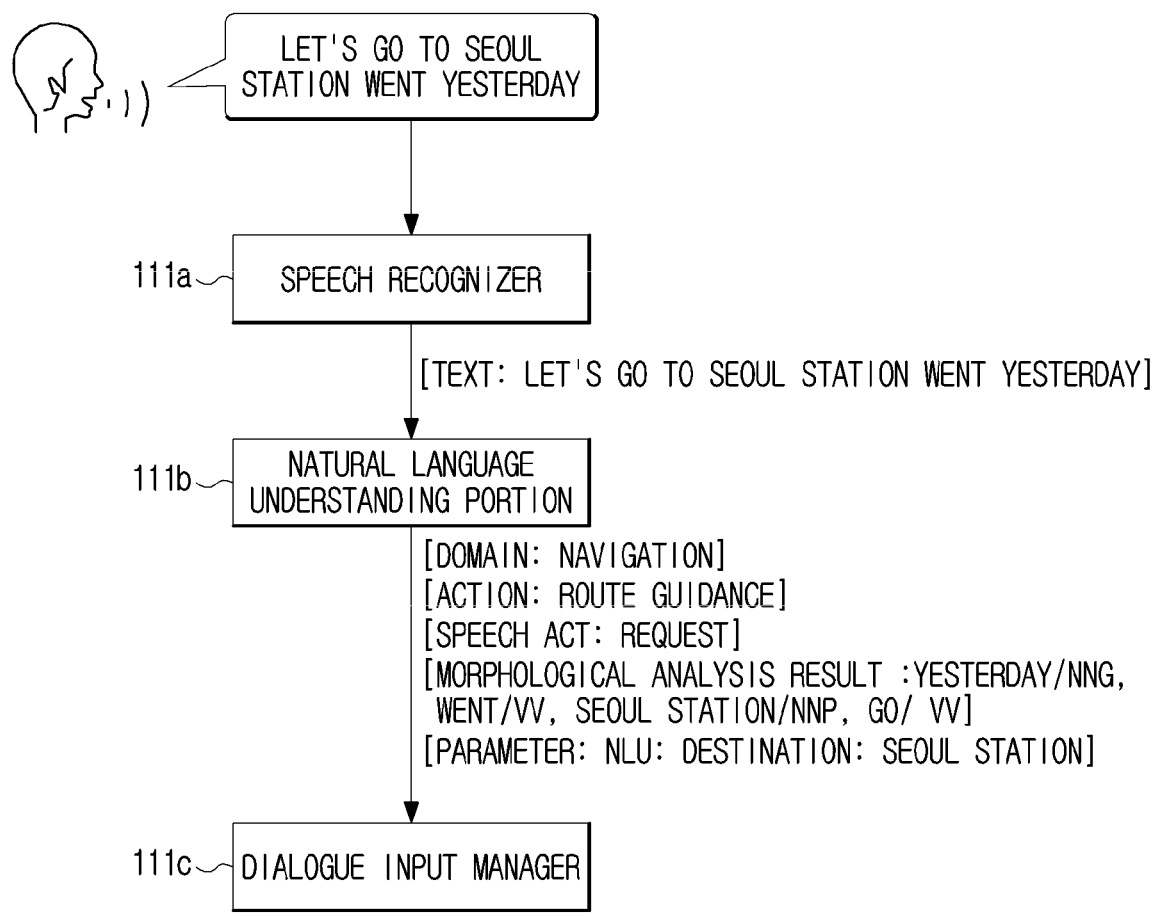
FIGS. 30 to 42 are views illustrating a particular example in which the dialogue system processes an input, manages a dialogue, and outputs a result when a user inputs an utterance related to a route guidance.

As illustrated in FIG. 30, when a user input an utterance "let's go to Seoul station we went yesterday" the speech recognizer 111a may output the user's speech as the utterance in the text form (let's go to Seoul station we went yesterday).

The natural language understanding portion 111b may perform the morphological analysis and output [domain: navigation], [action: route guidance], [speech act; request], and [parameter: NLU: destination: Seoul station] from a morphological analysis result (yesterday/NNG, went/VV, Seoul station/NNP, go/VV), by referring to the domain/action inference rule DB 141 and then input them to the dialogue input manager 111c.

Figure 31:
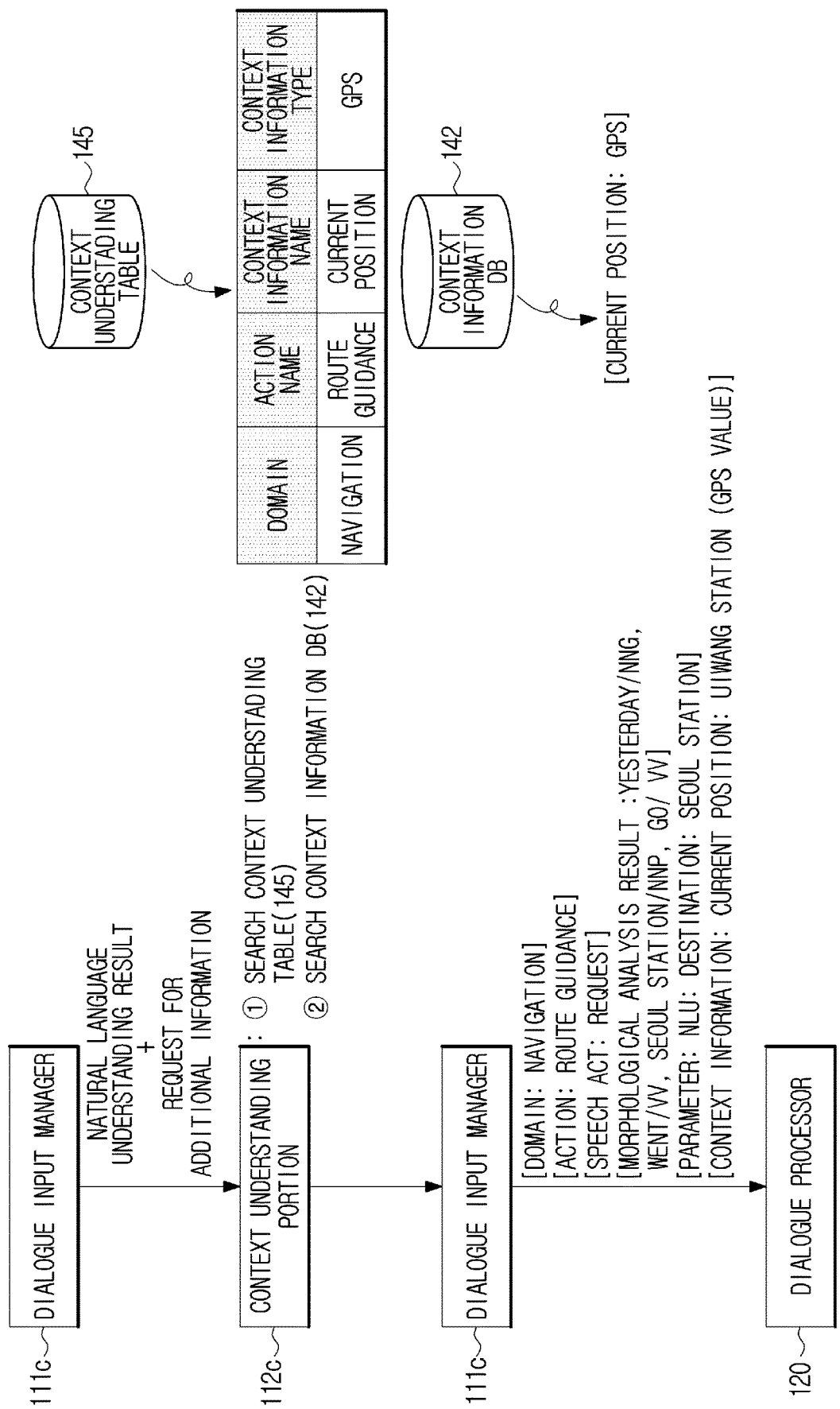

Referring to FIG. 31, while transmitting the natural language understanding result of the natural language understanding portion 111b to the context understanding portion 112c, the dialogue input manager 111c may request that the context understanding portion 112c send additional information when additional information is present in the context understanding portion 112c.

The context understanding portion 112c may search the context understating table 145 and extract a fact that context information related to [domain: navigation] and [action: route guidance], is the current position" and the type of the context information is GPS value.

The context understanding portion 112c may extract a GPS value of the current position by searching the context information DB 142. When the GPS value of the current position is not stored in the context information DB 142, the context understanding portion 112c may request the GPS value of the current position to the context information collection manager 112b.

The context information collection manager 112b may transmit a signal to the context information collector 112a so that the context information collector 112a collects the GPS value of the current position. The context information collector 112a may collect the GPS value of the current position from the vehicle controller 240 and then store the GPS value of the current position in the context information DB 142 while sending a GPS value collection confirmation signal to the context information collection manager 112b. When the context information collection manager 112b transmits the GPS value collection confirmation signal to the context understanding portion 112c, the context understanding portion 112c may extract the GPS value of the current position from the context information DB 142 and then transmit the GPS value of the current position to the dialogue input manager 111c.

The dialogue input manager 111c may combine [domain: navigation], [action: route guidance], [speech act; request], [parameter: NLU: destination: Seoul station] and [context information: current position: Uiwang station (GPS value)] which are the natural language understanding result and then transmit the combined information to the dialogue manager 120.

Figure 32:
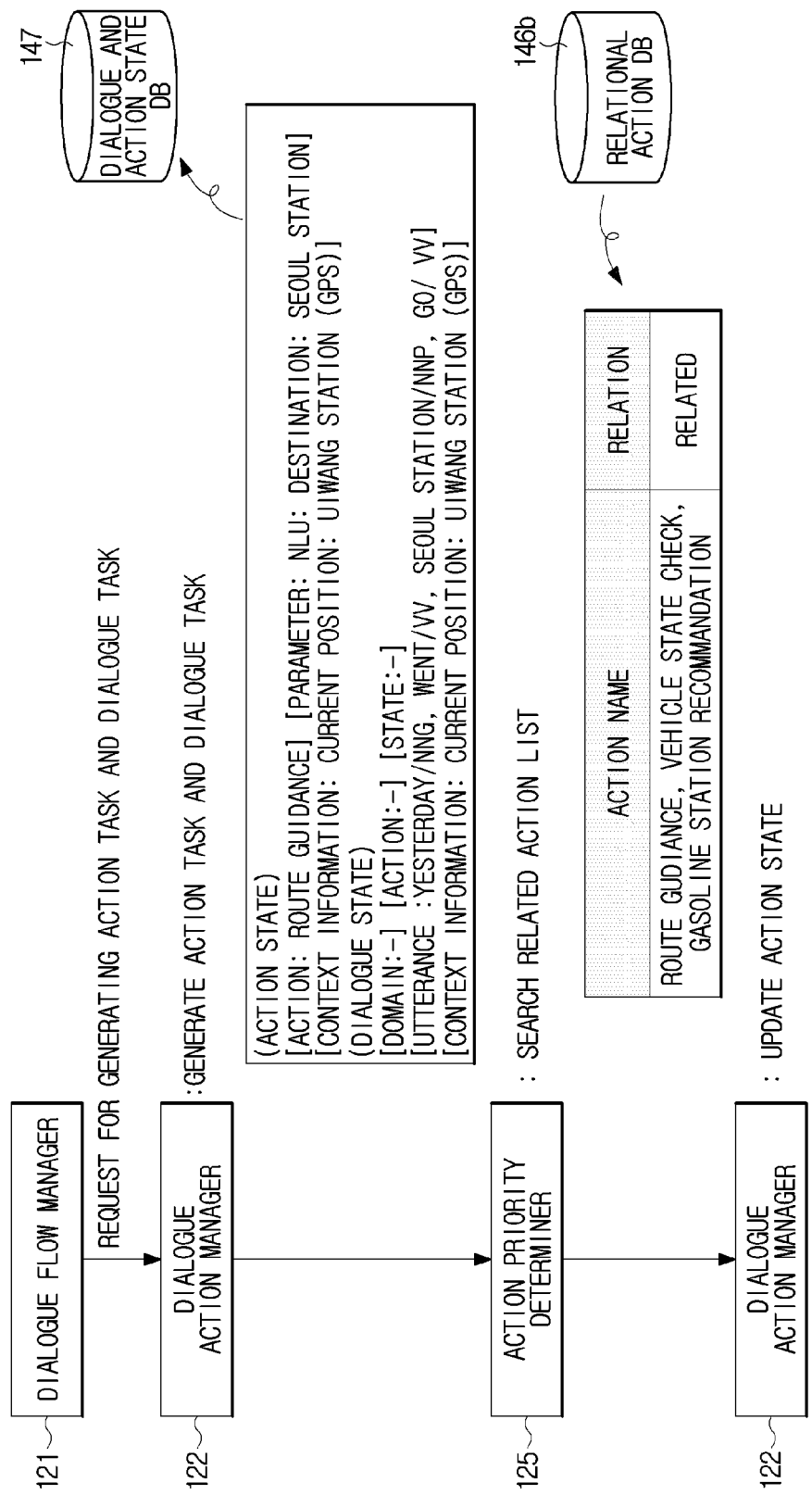

Referring to FIG. 32, the dialogue flow manager 121 may search the dialogue and action state DB 147 and determine whether dialogue task or action task, which is currently progressing, is present. In this time, the dialogue flow manager 121 may refer to the dialogue policy DB 148. According to the embodiment, it is assumed that dialogue task or action task, which is currently progressing, is not present.

The dialogue flow manager 121 may request that the dialogue action manager 122 generate an action task and dialogue task corresponding to the output of the input processor 110. The generation of the action task and dialogue task may represent designating a storage space for storing and managing the information related to the action state and the dialogue state.

Therefore, the dialogue action manager 122 may designate the storage space in the dialogue and action state DB 147 to store the information related to the action state and the dialogue state.

The dialogue action manager 122 may transmit the action state and the dialogue state to the action priority determiner 125.

The action priority determiner 125 may search for the vehicle state check and the gasoline station recommendation which are related to the route guidance, in the relational action DB 146b. The route guidance action and the relational action may become candidate actions.

The action priority determiner 125 may determine the priority of the candidate actions according to the pre-stored rules. Before the execution condition of the candidate action is determined, the priority may be determined or alternatively after the execution condition of the candidate action is determined, the priority may be determined about only candidate action which satisfies the execution condition.

The candidate action list may be transmitted to the dialogue action manager 122, again, and the dialogue action manager 122 may update the action state by adding the searched relational actions.

Figure 33:
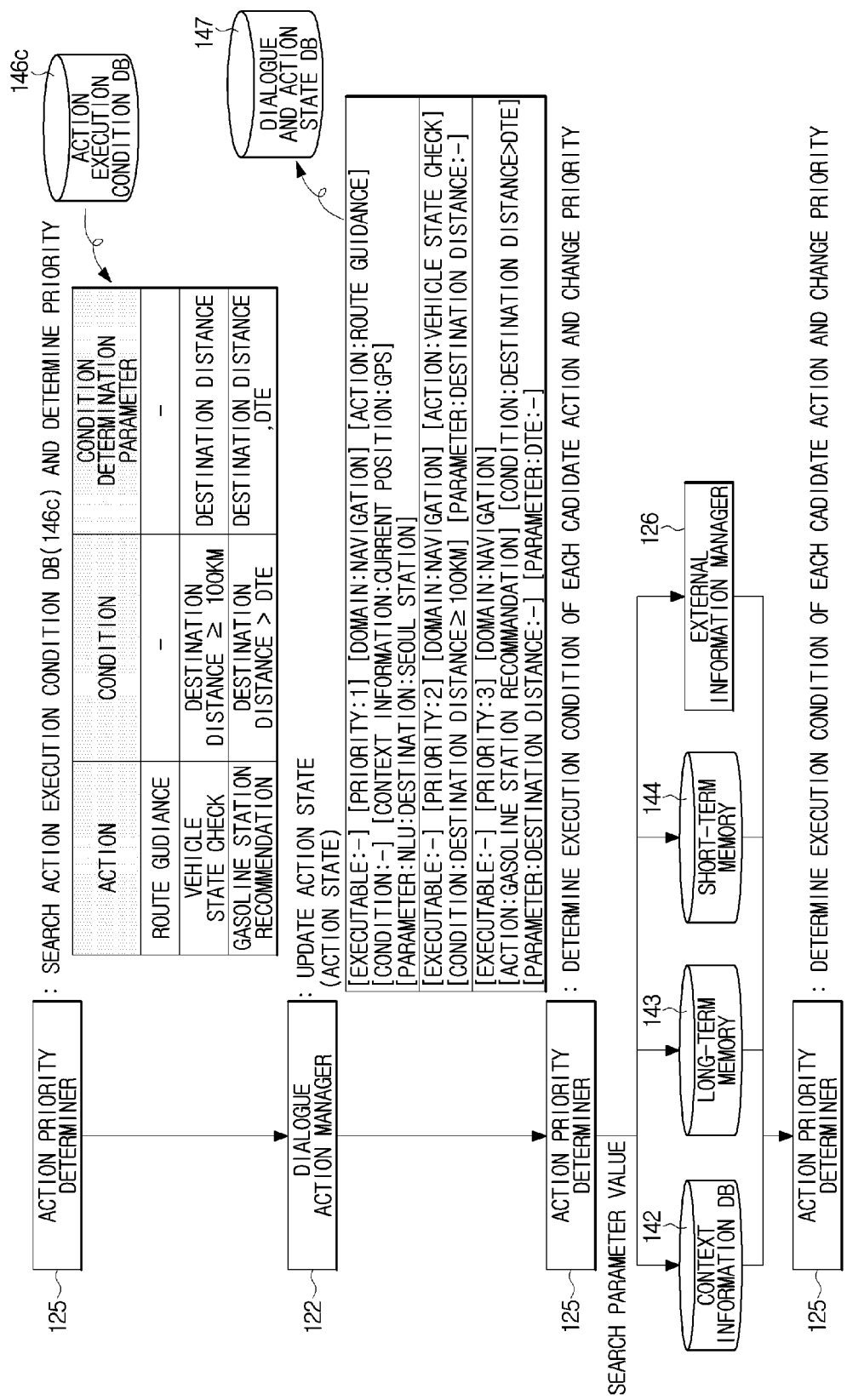

Referring to FIG. 33, the action priority determiner 125 may search for an execution condition about each candidate action or parameters to determine the execution condition in the action execution condition DB 146c. The action priority determiner 125 may also determine the priority among the candidate actions.

For example, a condition for the vehicle state check may be a case in which a destination distance is equal to or greater than 100 km, wherein a parameter for determining the condition may correspond to the destination distance.

A condition for the gasoline station recommendation may be a case in which a destination distance is greater than a distance to empty (DTE), wherein a parameter for determining the condition may correspond to the destination distance and the distance to empty (DTE).

The dialogue action manager 122 may update the action state by adding the condition for executing the each candidate action and a parameter needed to determine the condition, to the dialogue and action state DB 147.

The action priority determiner 125 may search for a parameter value that is needed to determine whether the candidate action satisfies the execution condition or not, in the dialogue and action state DB 147, the context information DB 142, the long-term memory 143, or the short-term memory 144 and bring the parameter value from the dialogue and action state DB 147, the context information DB 142, the long-term memory 143, or the short-term memory 144.

When the parameter value is contained in the previous dialogue content, in the context information related to the dialogue content, or in the context information related to the generated event, the action priority determiner 125 may bring the parameter value from the dialogue and action state DB 147.

When the action priority determiner 125 is not allowed to bring the parameter value from the dialogue and action state DB 147, the context information DB 142, the long-term memory 143, or the short-term memory 144, the action priority determiner 125 may request the parameter value to the external information manager 126.

For example, the destination distance may be brought from the external content server 300 providing a navigation service, and DTE may be brought from the context information DB 142 via the external information manager 126. Meanwhile, in order to search for the destination distance, correct destination information used for the navigation service may be needed. In the embodiment, a destination which is input from the user's utterance may correspond to "seoul station", wherein "seoul station" may include a variety of places having a name started with "seoul station", and "Seoul station" having a particular meaning. Therefore, it may be difficult to search for a correct destination distance by using only "seoul station"

As needed, it may be possible to bring the parameter value from the mobile device 400 connected to the vehicle 200. For example, when user information, e.g., contacts, and schedule which are not stored in the long-term memory 143, is needed as the parameter value, the external information manager 126 may request the needed information to the mobile device 400 and then acquire the needed parameter value.

When it may be impossible to acquire the parameter value via the storage 140, the external content server 300 and the mobile device 400, it may be possible to acquire the needed parameter value by asking the user.

The action priority determiner 125 may determine the execution condition of the candidate action by using the parameter value. Since the destination distance is not searched, the determination of the execution condition related to the vehicle state check action and the gasoline station recommendation may be postponed.

Figure 34:
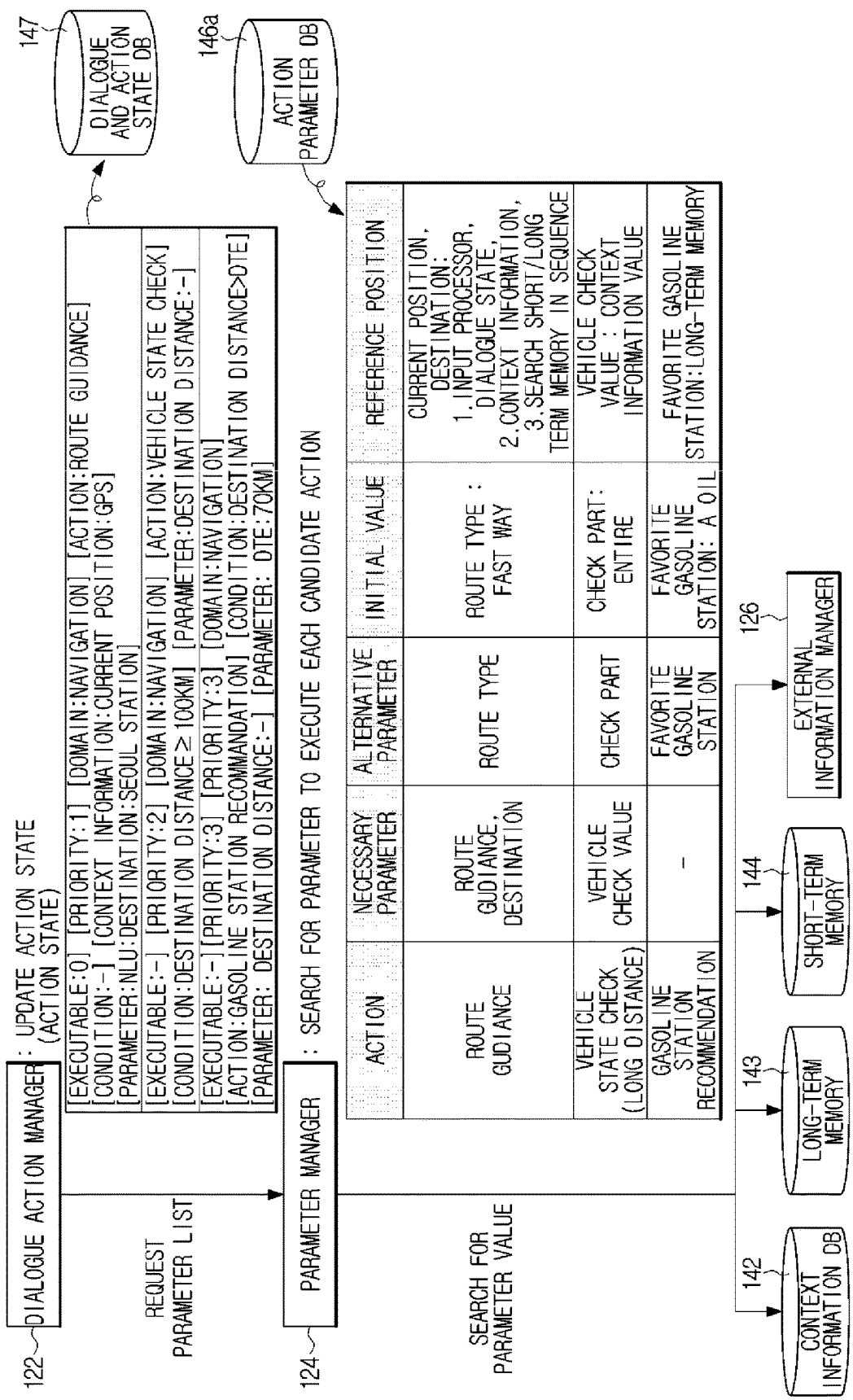

As illustrated in FIG. 34, the dialogue action manager 122 may update the action state by adding the acquired parameter value and whether to meet the action execution condition, which is determined by using the corresponding parameter value, to the dialogue and action state DB 147.

The dialogue action manager 122 may request the parameter list used to execute the candidate actions, to the parameter manager 124.

The parameter manager 124 may extract the current position and destination as the necessary parameter used for the execution of the route guidance action, from the action parameter DB 146*a* and extract the route type (initial value: fast route) as the alternative parameter.

The parameter manager 124 may extract check part (initial value: entire part) used for the execution of the vehicle state check action, as the alternative parameter, and extract the favorite gasoline station (initial value: A-oil) as the alternative parameter used for the execution of the gasoline station recommendation action.

The extracted parameter list may be transmitted to the dialogue action manager 122 and used for updating the action state.

The parameter manager 124 may search for the corresponding parameter value in the reference position of each parameter in the dialogue and action state DB 147, the context information DB 142, the long-term memory 143 and the short-term memory 144 to acquire a parameter value corresponding to the necessary parameter and the alternative parameter of the candidate actions. When it is needed that the parameter value is provided via the external service, the parameter manager 124 may request the needed parameter value to the external content server 300 via the external information manager 126.

The parameter used to determine the execution condition of the candidate action and the parameter used to execute the candidate action may be duplicated. When there is a parameter corresponding to a parameter (necessary parameter and alternative parameter) used to execute the candidate actions, among the parameter values, which is acquired by the action priority determiner 125 and then stored in the dialogue and action state DB 147, the corresponding parameter may be used.

Figure 35:
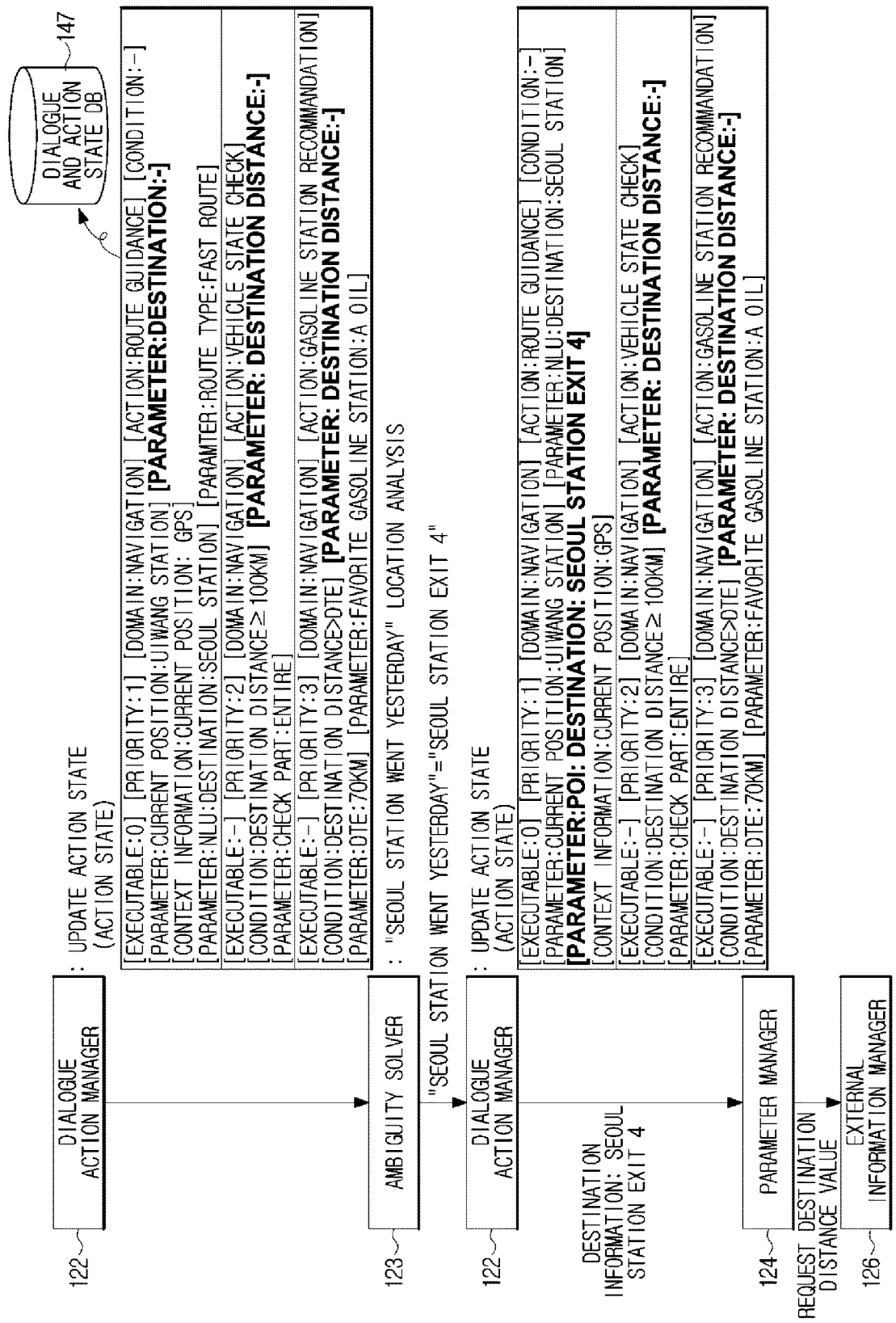

Referring to FIG. 35, the dialogue action manager 122 may update the action state by adding the parameter value acquired by the parameter manager 124.

As mentioned above, when using a destination (seoul station) extracted from the user's utterance as the parameter of the route guidance action, there may be the ambiguity. Therefore, a parameter of the route guidance action (destination), a parameter of the vehicle state check action (destination distance), and a parameter of the gasoline station recommendation (destination distance) may be not yet acquired.

The ambiguity solver 123 may check whether there is the ambiguity when [parameter: NLU: destination: seoul station] is converted into a destination parameter appropriate for the route guidance action. As mentioned above, "seoul station" may include different kind of places having a name started with "seoul station", and "Seoul station" having a particular meaning by a user.

The ambiguity solver 123 may confirm that there is a modifier for "seoul station" among the user utterance, by referring to the morphological analysis result. The ambiguity solver 123 may search for the schedule, the moving position and the contact, in the long-term memory 143 or the short-term memory 144 to identify the location of "seoul station we went yesterday"

For example, the ambiguity solver 123 may confirm that "seoul station we went yesterday" is "Seoul station exit 4", from the user's moving position performed yesterday. After confirming that POI, e.g., "Seoul station exit 4" is present, the ambiguity solver 123 may bring the corresponding value.

The destination information acquired by the ambiguity solver 123 may be transmitted to the dialogue action manager 122 and the dialogue action manager 122 may update the action state by adding "Seoul station exit 4" to the destination parameter of the candidate action.

The parameter manager 124 may bring the destination information (Seoul station exit 4) from the dialogue and action state DB 147 and request a destination distance value to the external content server 300 providing the navigation service via the external information manager 126.

Figure 36:
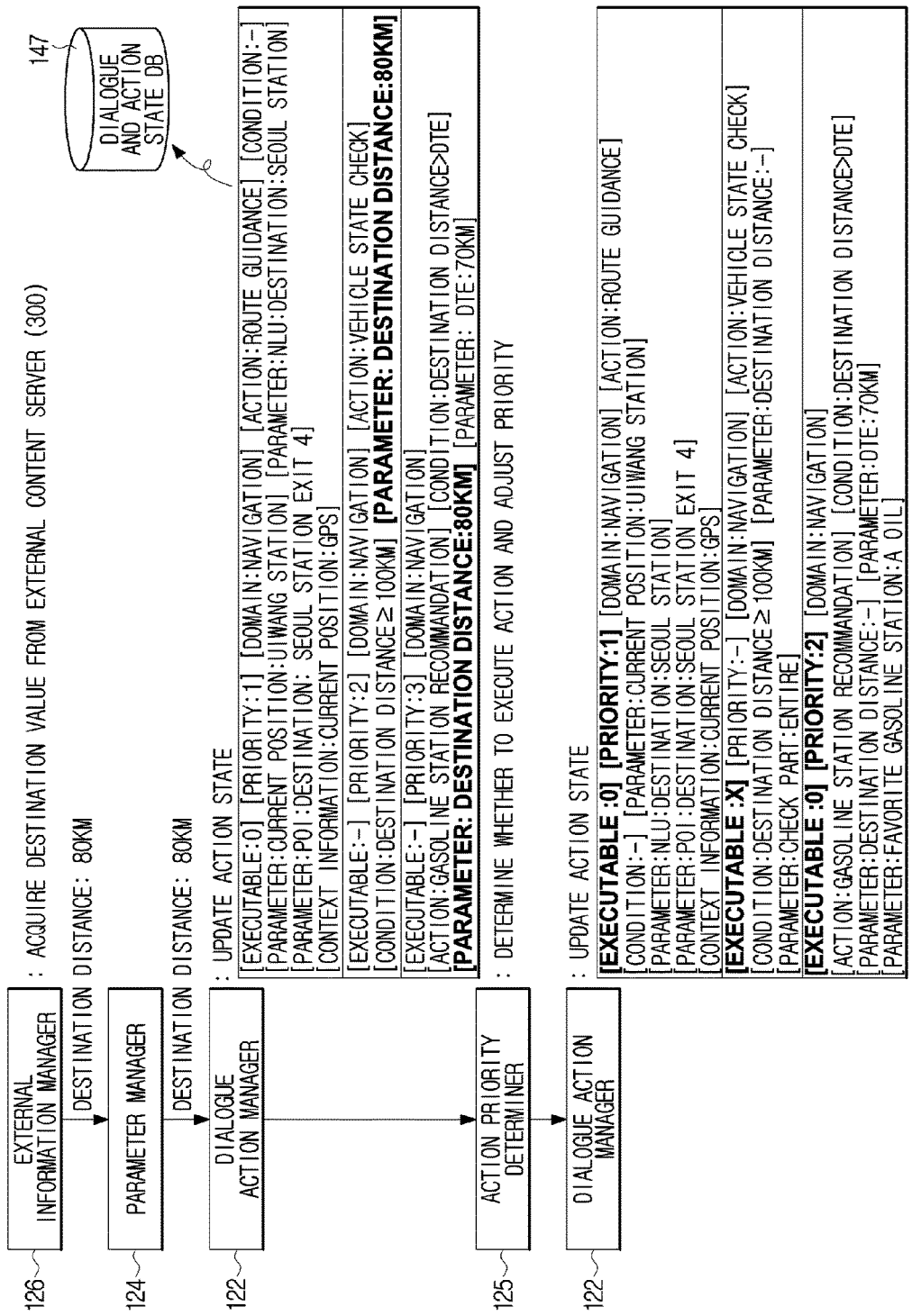

Referring to FIG. 36, when the external information manager 126 acquires the destination distance value (80 km) from the external content server 300 and then transmit the destination distance value to the parameter manager 124, the parameter manager 124 may transmit the destination distance value to the dialogue action manager 122 to allow the action state to be updated.

The action priority determiner 125 may determine whether the candidate actions is executable by referring to the action state, and adjust the priority of the candidate actions. It may be determined that the route guidance action is executable since the parameter value of the current position and destination which are the necessary parameter are acquired. It may be determined that the vehicle state check action is not executable since the destination distance (70 km) is less than 100 km. It may be determined that the gasoline station recommendation action is executable since the destination distance (80 km) is greater than DTE.

Since the vehicle state check action is not executable, the vehicle state check action may be excluded from the determination of the priority. Therefore, the route guidance action may be ranked as the first and the gasoline station recommendation action may be ranked as the second.

The dialogue action manager 122 may update the action state according to whether the candidate action is executable or not, and the modified priority.

The dialogue flow manager 121 may check the dialogue state and the action state stored in the dialogue and action state DB 147 and may develop a dialogue strategy to continue the dialogue by referring to the dialogue policy DB 148. For example, the dialogue flow manager 121 may select the highest priority action among the executable actions, and the dialogue flow manager 121 may request that the response generation manager 131 generate a response for the progress of the dialogue according to the dialogue policy DB 148.

The dialogue state and the action state stored in the dialogue and action state DB 147 may be updated to [state: confirm route guidance start]

Figure 37:
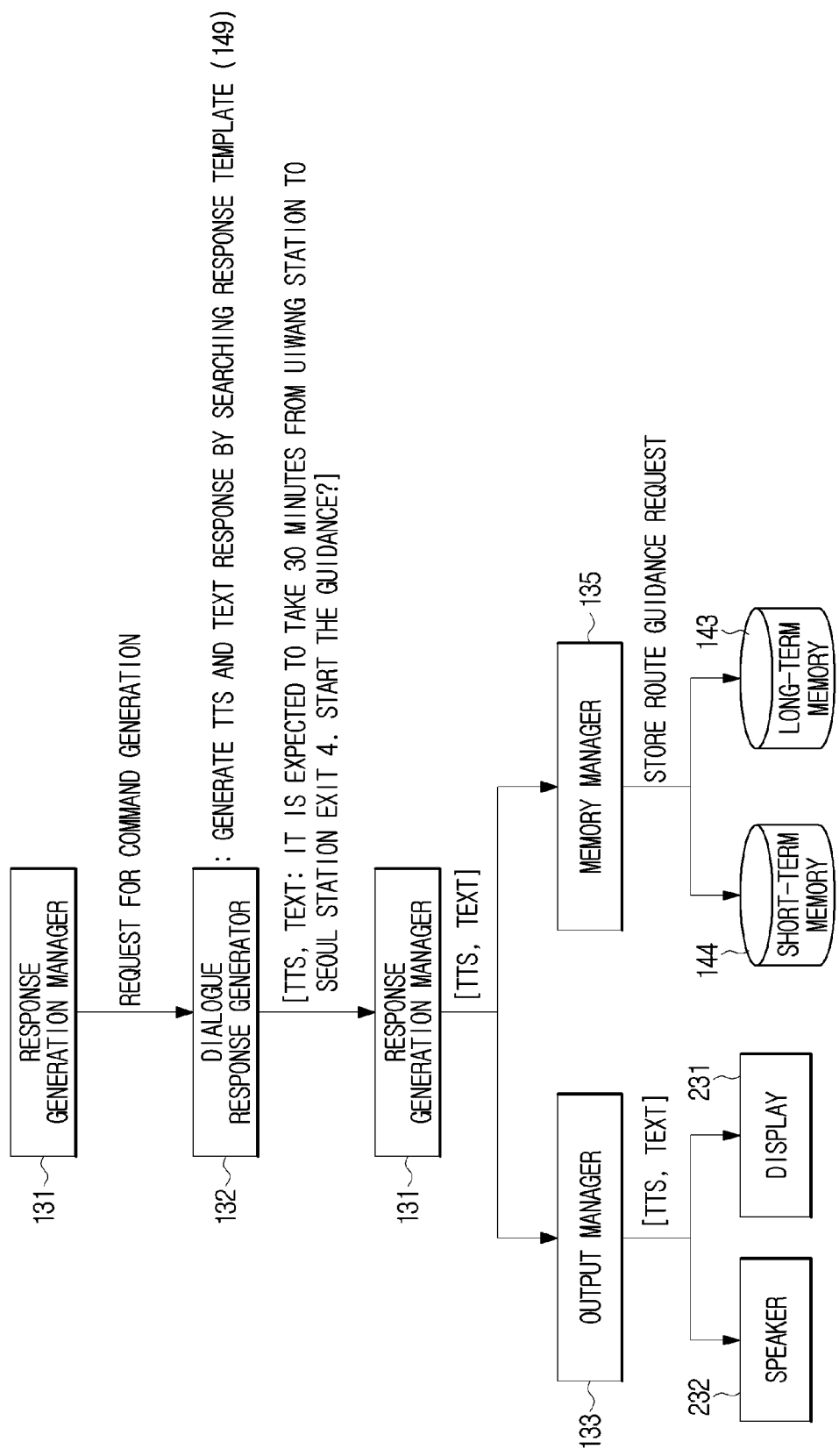

Referring to FIG. 37, the response generation manager 131 may request the generation of the response to the dialogue response generator 132 in response to the request of the dialogue flow manager 121.

The dialogue response generator 132 may generate a TTS response and a text response by searching the response template 149. For example, the dialogue response generator 132 may generate a dialogue response configured to output "It is expected to take 30 minutes from Uiwang station to Seoul station Exit 4. Do you want to start the guidance?" as TTS and text form.

The response generation manager 131 may transmit TTS response and text response generated by the dialogue response generator 132 to the output manager 133 and the memory manager 135, and the output manager 133 may transmit the TTS response to the speaker 232 and transmit the text response to the display 231. In this time, the output manager 133 may transmit the TTS response to the speaker 232 after passing thorough the TTS module configured to combine the text to the speech.

The memory manager 135 may store that a user requests the route guidance, in the short-term memory 144 or the long-term memory 143.

Figure 38:
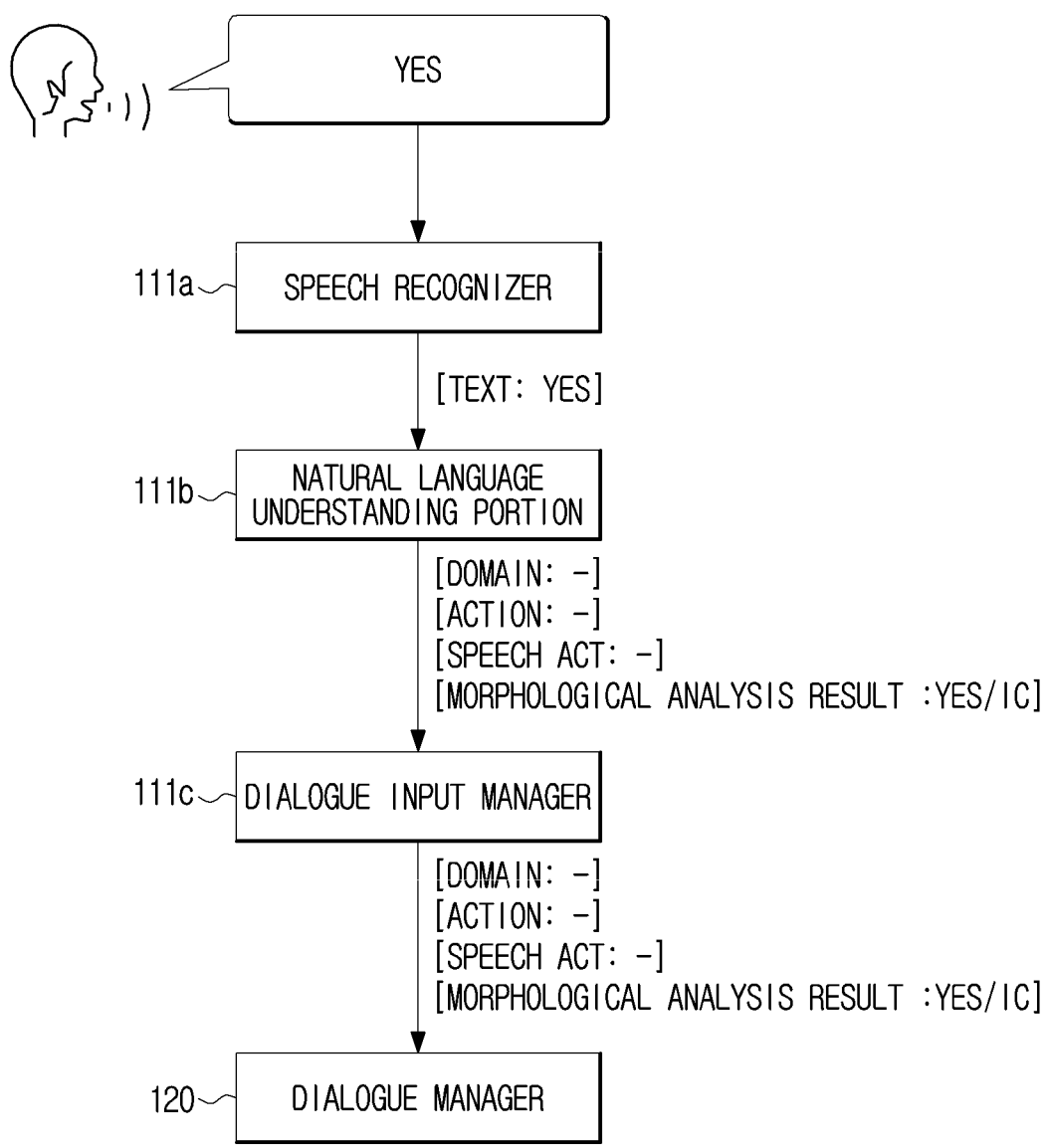

The dialogue response configured to ask "It is expected to take 30 minutes from Uiwang station to Seoul station Exit 4. Do you want to start the guidance?" may be output via the display 231 and the speaker 232. As illustrated in FIG. 38, when a user utters "yes", the user's utterance may be input to the speech recognizer 111a and then output as [text: yes] and the natural language understanding portion 111b may output [domain:-], [action:-], [speech act:-], and [morphological analysis result: yes/IC]

The natural language understanding result may be transmitted to the dialogue input manager 111c and the dialogue input manager 111c may transmit the natural language understanding result to the dialogue manager 120.

Figure 39:
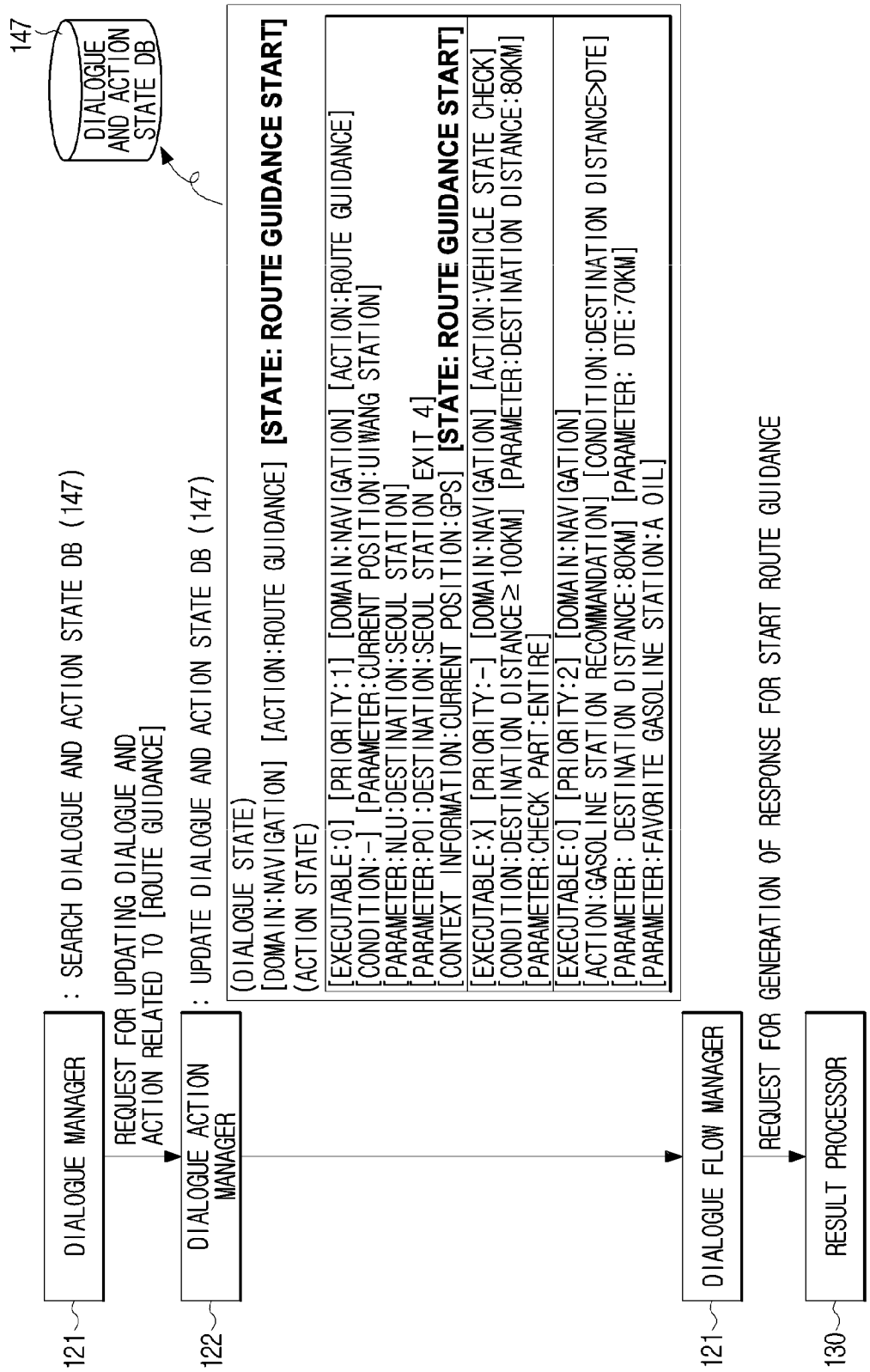

Referring to FIG. 39, the dialogue flow manager 121 may search the dialogue and action state DB 147 and analyze the previous dialogue state. The dialogue flow manager 121 may request that the dialogue action manager 122 update dialogue/action related to [route guidance] that is currently executed.

The dialogue action manager 122 may update the dialogue state and the action state to [state: route guidance start].

The dialogue flow manager 121 may request that the result processor 130 generate a response for starting the route guidance.

Figure 40:
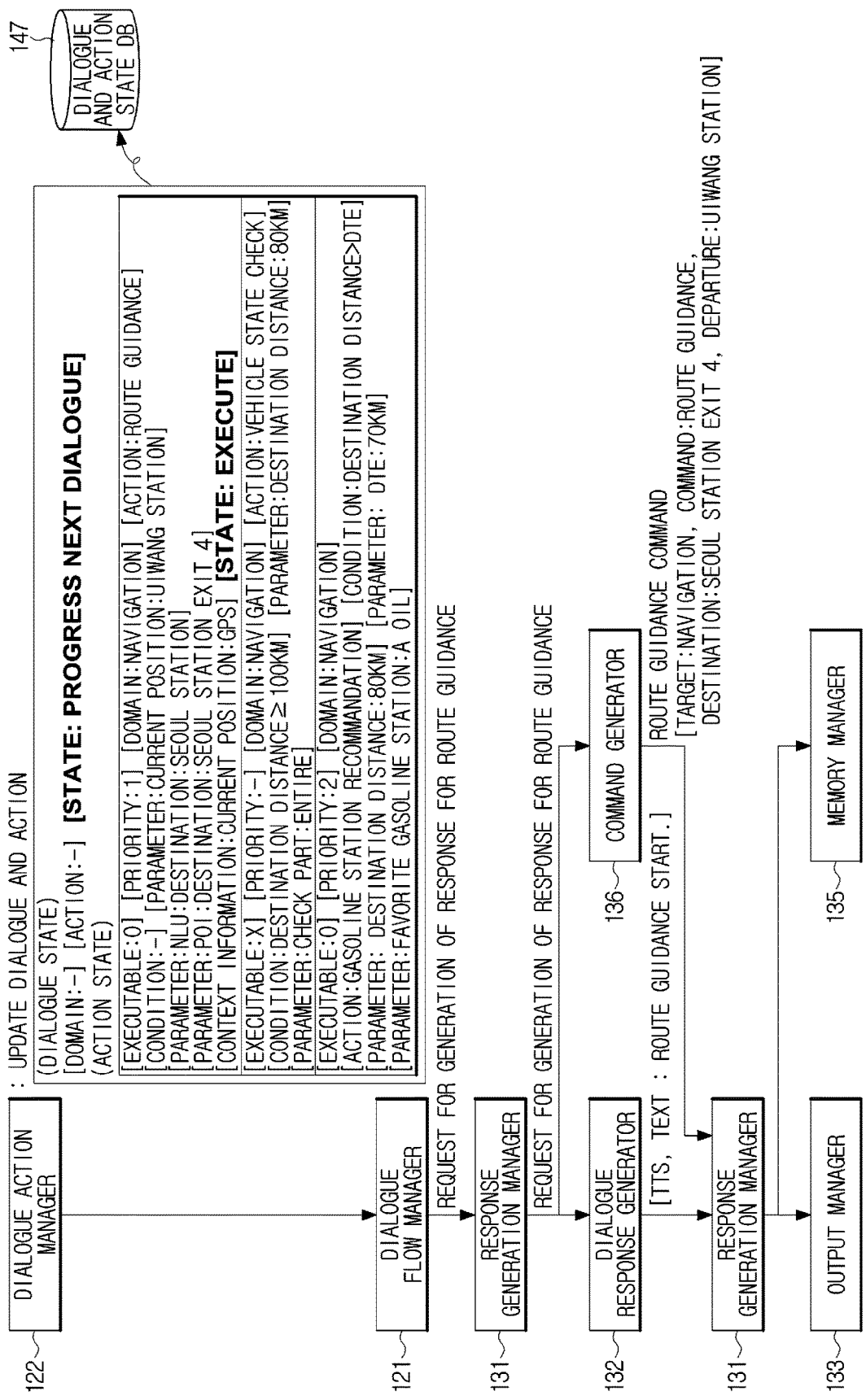

Referring to FIG. 40, the dialogue action manager 122 may update the dialogue state to [state: next dialogue progress] and update the action state to [state: execute].

The dialogue flow manager 121 may request that the response generation manager 131 generate a response for the route guidance.

The dialogue response generator 132 may generate a dialogue response configured to output "start route guidance" as TTS and text form, and then transmit the dialogue response to the response generation manager 131.

The command generator 136 may generate a command for executing the route guidance [target: navigation, command: route guidance, destination: Seoul station exit 4, departure: Uiwang station], and then transmit the command to the response generation manager 131.

The response generation manager 131 may transmit the generated dialogue response and command to the output manager 133. The output manager 133 may output the dialogue response via the display 231 and the speaker 232. The output manager 133 may transmit the route guidance command to the AVN 230 of the vehicle 200 via the vehicle controller 240 or to the external content server 300 providing the navigation service.

Figure 41:
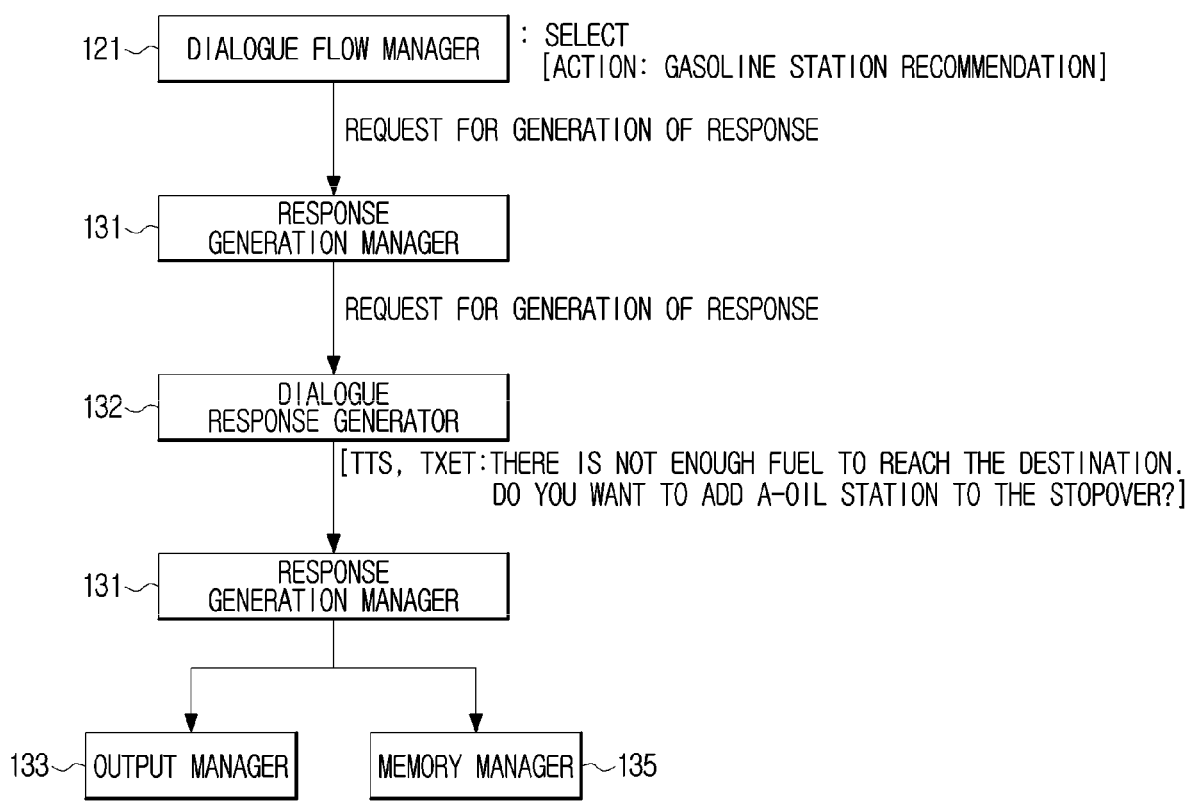

Referring to FIG. 41, the dialogue flow manager 121 may select the gasoline station recommendation as the next executable action, and request that the response generation manager 131 generate a response, which is configured to ask a user whether to recommend the gasoline station.

The dialogue state and the action state may be updated to [state: check related service recommendation].

The response generation manager 131 may request that the dialogue response generator 132 generate a TTS response and a text response, and the dialogue response generator 132 may generate a dialogue response configured to output "there is not enough fuel to reach the destination. Do you want to add A-oil station to the stopover?" in the TTS and text form. The dialogue response generator 132 may transmit the TTS and text to the response generation manager 131.

The response generation manager 131 may transmit the TTS response and text response generated by the dialogue response generator 132 to the output manager 133 and the memory manager 135, and the output manager 133 may transmit the TTS response to the speaker 232 and transmit the text response to the display 231.

Figure 42:
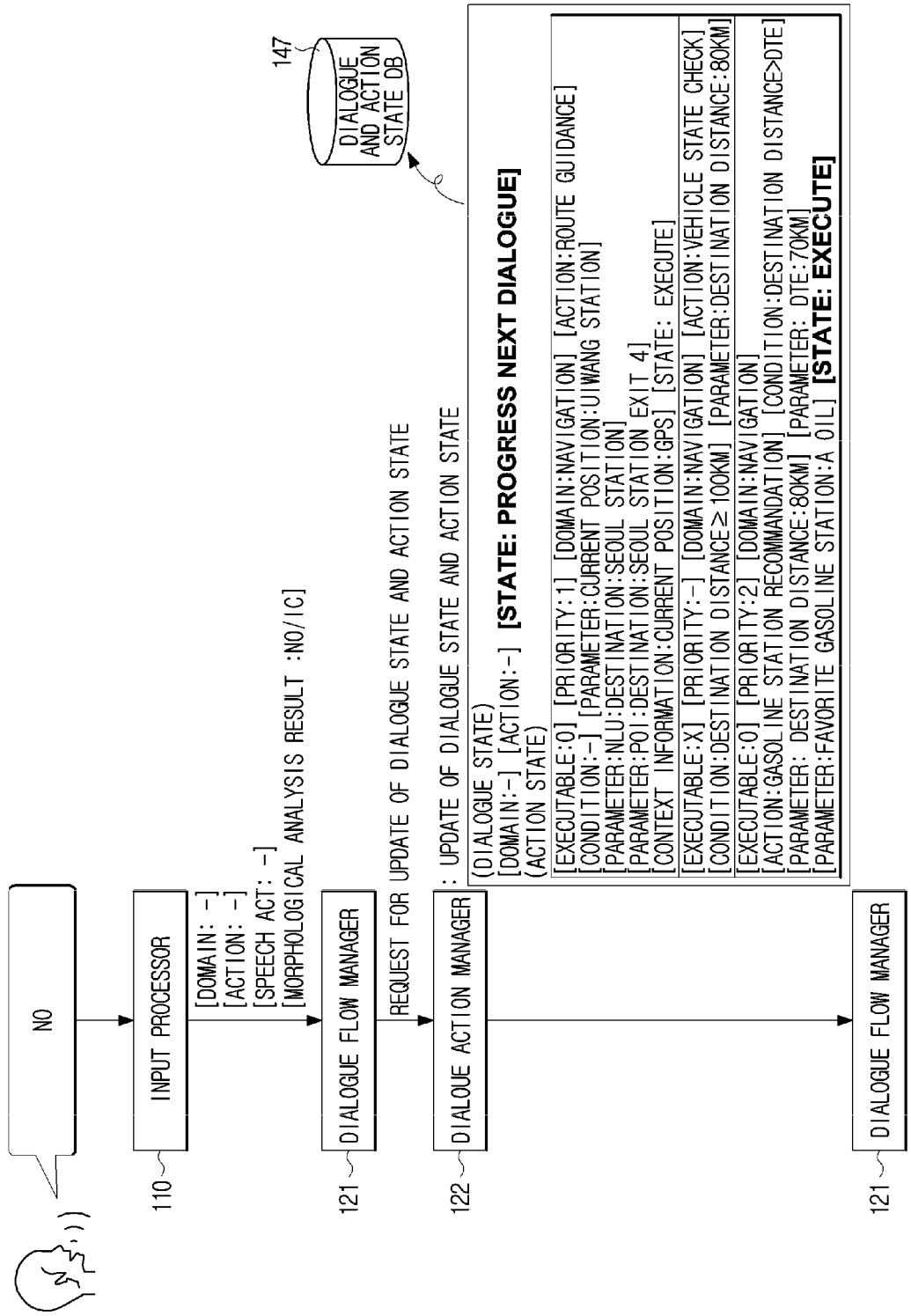

The dialogue response configured to ask "there is not enough fuel to reach the destination. Do you want to add A oil station to the stopover?" may be output via the display 231 and the speaker 232. As illustrated in FIG. 42, when a user utters "no", the user's utterance may be input to the speech recognizer 111a and then output as [text: no] and the natural language understanding portion 111b may output [domain:-], [action:-], [speech act:-], and [morphological analysis result: no/IC]

The dialogue flow manager 121 may request the dialogue action manager 122 update the dialogue state and the action state.

The dialogue action manager 122 may update the dialogue state to [state: next dialogue progress] and update the action state to [state: CANCEL].

The dialogue flow manager 121 may request that the response generation manager 131 generate a response indicating that the gasoline station recommendation service is cancelled, and the dialogue flow manager 121 may check whether a dialogue to be sequentially continued, is present. When the dialogue to be sequentially continued, is not present, the dialogue flow manager 121 may update the dialogue state to [state: IDLE] and wait for the user's input.

The above mentioned flow of the data processing is merely an example applied to the dialogue system 100. Therefore, the order of processing data by each component of the dialogue system 100 is not limited to the above mentioned example, and thus the plurality of components may process the data at the same time or the plurality of components may process the data in an order that is different from the above mentioned example.

Hereinafter according to an embodiment, a dialogue processing method will be described. According to an embodiment, the dialogue processing method may be applied to the above mentioned dialogue system 100 or the vehicle 200 provided with the dialogue system 100. Therefore, the description of FIGS. 1 to 42 will be applied to the dialogue processing method in the same manner.

Figure 43:
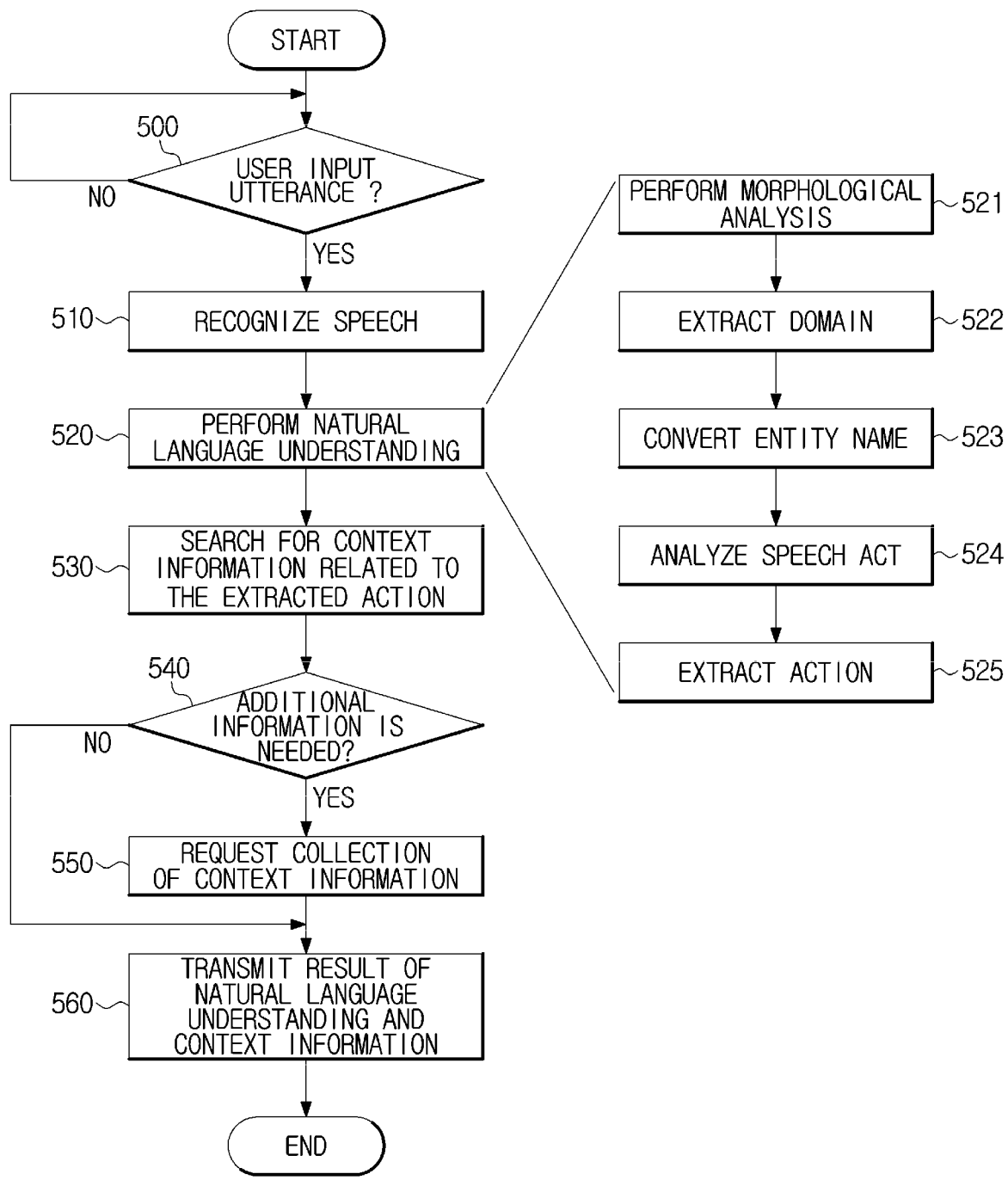
FIG. 43 is a flowchart illustrating a method of processing a user's input in a dialogue processing method in accordance with an embodiment.

FIG. 43 is a flowchart illustrating a method of processing a user's input in a dialogue processing method in accordance with an embodiment. The method of processing the user's input may be performed in the input processor 110 of the dialogue system 100.

Referring to FIG. 43, when a user's utterance is input (YES in 500), the speech recognizer 111*a* may recognize the input user's utterance (510). The user's utterance may be input to the speech input device 210 provided in the vehicle 200 or the speech input device 410 provided in the mobile device 400.

The speech recognizer 111*a* may recognize the input user's utterance and output an utterance in the text form.

The natural language understanding portion 111*b* may apply the natural language understanding technology to the utterance in the text form, (520) and output a result of the natural language understanding.

Particularly, the natural language understanding process (520) may include performing morphological analysis on the utterance in the form of text (521), extracting a domain from the utterance based on the morphological analysis result (522), recognizing an entity name (523), analyzing a speech act (524) and extracting an action (525).

The extraction of the domain, the recognition of the entity name and the extraction of the action may be performed by referring to the domain/action inference rule DB 141.

The output of the natural language understanding portion 111*b*, i.e., the result of the natural language understanding, may include a domain, an action, a speech act, and a result of the morphological analysis corresponding to the user's utterance.

The context information related to the extracted action may be searched (530). The context information related to the extracted action may be stored in the context understating table 145. The context understanding portion 112*c* may search for the context information related to the extracted action, in the context understating table 145 and the context information processor 112 may bring the information value of the searched context information from the context information DB 142, the long-term memory 143 or the short-term memory 144.

When additional context information is needed (YES in 540), that is a case in which context information is not acquired from the context information DB 142, the long-term memory 143 or the short-term memory 144, the context understanding portion 112*c* may request the collection of the corresponding context information (550). The input except for the speech, e.g., the vehicle state information, the surrounding environment information, and the driver information may be input via the context information collector 112*a*, which is performed separately from the input of the user's utterance.

The information may be periodically input or input only when a certain event occurs. In addition, the information may be periodically input and then additionally input when a certain event occurs. In any cases, when the collection of the information is requested, the corresponding information may be actively collected.

Therefore, when the context information related to the action is already collected, the corresponding information may be brought from the context information DB 142, the long-term memory 143 or the short-term memory 144 or otherwise, the corresponding information may be collected via the context information collector 112*a*.

When the context information collector 112*a* receiving the request for collecting the context information collects the corresponding context information and stores the information in the context information DB 142, the context understanding portion 112*c* may bring the corresponding context information from the context information DB 142.

When the context information collection manager 112*b* determines that a certain event occurs since data collected by the context information collector 112*a* satisfies a predetermined condition, the context information collection manager 112*b* may transmit an action trigger signal to the context understanding portion 112*c*.

The context understanding portion 112*c* may search the context understating table 145 for searching for context information related to the corresponding event, and when the searched context information is not stored in the context understating table 145, the context understanding portion 112*c* may transmit a context information request signal to the context information collection manager 112*b*, again.

When the collection of the needed context information is completed, the result of the natural language understanding and the context information may be transmitted to the dialogue manager 120 (560). When the event occurs, information related to the event (which event occurs) and the context information related to the occurred event may be also transmitted.

Figure 44:
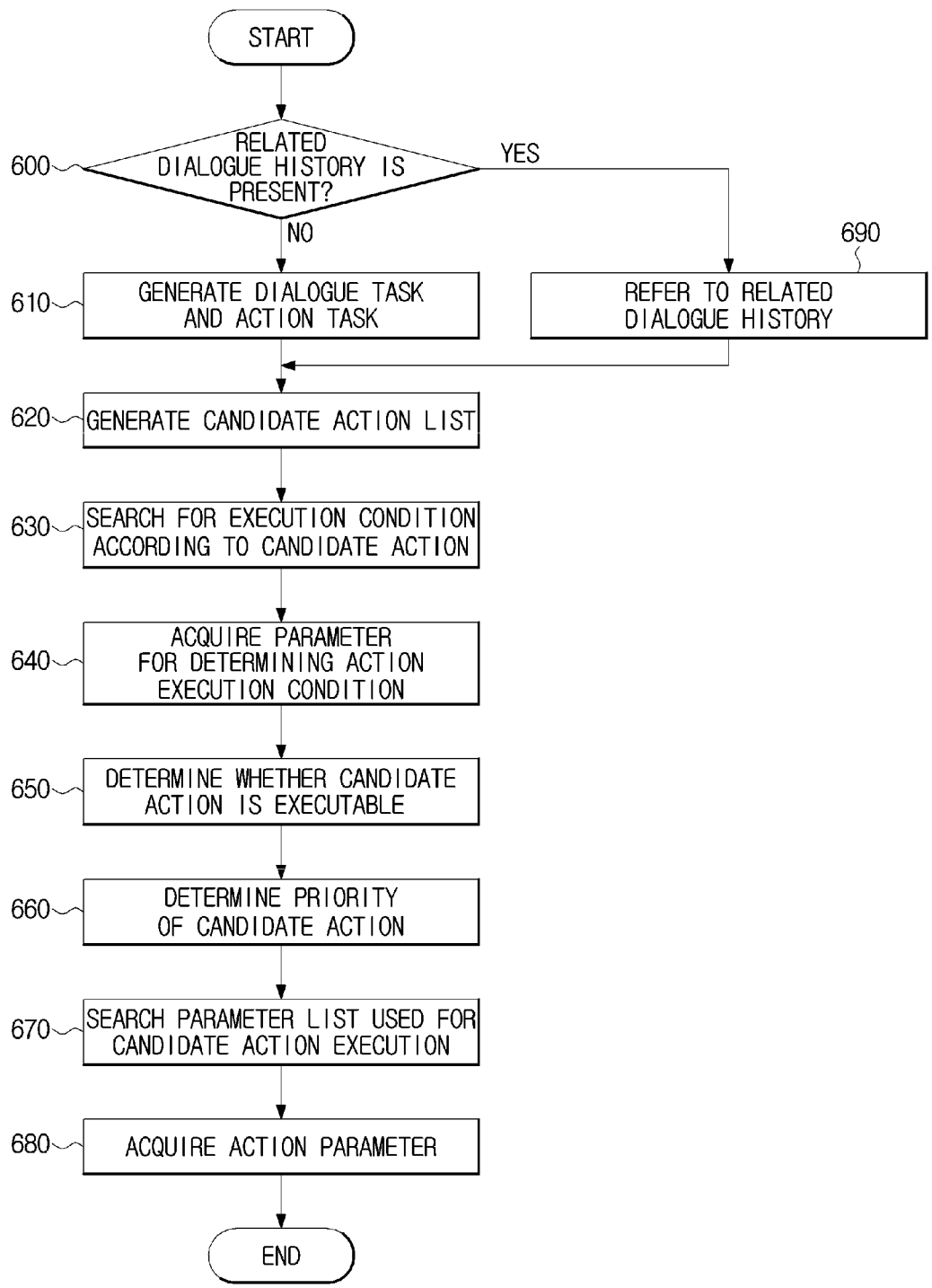
FIG. 44 is a flowchart illustrating a method of managing the dialogue using the output of the input processor in the dialogue processing method in accordance with an embodiment.

FIG. 44 is a flowchart illustrating a method of managing the dialogue using the output of the input processor in the dialogue processing method in accordance with an embodiment. The dialogue processing method may be performed by the dialogue manager 120 of the dialogue system 100.

Referring to FIG. 44, the dialogue flow manager 121 may search for the related dialogue history in the dialogue and action state DB 147 (600).

In the embodiment, the case in which the domain and action is extracted from the user's utterance has been described as an example, but there may be a case in which it is impossible to extract a domain and an action from the user's utterance, since there is the ambiguity in the utterance content or the context. In this case, the dialogue action manager 122 may generate a random dialogue state and the ambiguity solver 123 may identify the user's intention based on the content of the user's utterance, the environment condition, the vehicle state, and the user information, and determine an action appropriate for the user's intention.

When the related dialogue history is present (YES in 600), the related dialogue history may be referred (690). When the related dialogue history is not present (NO in 600), new dialogue task and action task may be generated (610).

A related action list, which is related to the action extracted from the user's utterance (hereinafter refer to input action), may be searched in the relational action DB 146*b* and candidate actions list may be generated (620). The input action and actions related to the input action may correspond to the candidate actions list.

The execution condition according to each candidate action may be searched in the action execution condition DB 146*c* (620). The execution condition may represent a necessary condition for the execution of the action. Therefore, when the corresponding condition is met, it may be determined that the action is executable but when the corresponding condition is not met, it may be determined that the action is not executable. In the action execution condition DB 146*c*, information related to the type of the parameter used for determining the action execution condition may be also stored.

The parameter value used for determining the action execution condition may be acquired (640). The parameter used for determining the action execution condition may be referred to as the condition determination parameter. The parameter value of the condition determination parameter may be acquired by searching the context information DB 142, the long-term memory 143, the short-term memory 144 or the dialogue and action state DB 147. When it is needed that the parameter value of the condition determination parameter is provided via the external service, the needed parameter value may be provided from the external content server 300 via the external information manager 126.

When it is impossible to acquire the needed parameter value due to the ambiguity in the context and the utterance, the needed parameter value may be acquired by resolving the ambiguity using the ambiguity solver 123.

Although the acquired parameter is an ineffective parameter having difficulties in the action execution condition determination, the ambiguity solver 123 may acquire the effective parameter from the ineffective parameter.

Based on the acquired condition determination parameter, whether each candidate action is executable may be determined (650), and the priority of the candidate actions may be determined (660). The rule for determining the priority of the candidate actions may be pre-stored. The action priority determiner 125 may determine the priority of the candidate actions by considering only the executable candidate actions after determining whether each candidate action is executable. Alternatively, after determining the priority of the candidate actions regardless whether each candidate action is executable, it may be possible to modify the priority of the candidate actions based on whether each candidate action is executable.

The parameter list used for executing the candidate actions may be searched in the action parameter DB 146a (670). The parameter used for executing the candidate actions may correspond to the action parameter. The action parameter may include a necessary parameter and an alternative parameter.

The parameter value used for executing the candidate actions may be acquired (680). The parameter value of the action parameter may be acquired by searching the context information DB 142, the long-term memory 143, the short-term memory 144 or the dialogue and action state DB 147. When it is needed that the parameter value of the action parameter is provided via the external service, the needed parameter value may be provided from the external content server 300 via the external information manager 126.

When it is impossible to acquire the needed parameter value due to the ambiguity in the context and the utterance, the needed parameter value may be acquired by resolving the ambiguity using the ambiguity solver 123.

Although the acquired parameter is an ineffective parameter having difficulties in the action execution condition determination, the ambiguity solver 123 may acquire the effective parameter from the ineffective parameter.

The dialogue state and the action state managed by the dialogue action manager 122 may be performed by the above mentioned steps and the dialogue state and the action state may be updated whenever the state is changed.

When all of the obtainable parameter values are obtained, the dialogue flow manager 121 may transmit information related to the candidate actions and the dialogue state, to the result processor 130. According to the dialogue policy, the dialogue flow manager 121 may transmit the information related to the action corresponding to the first priority or information related to the plurality of the candidate actions.

When the needed parameter value is acquired through only the user since the needed parameter value is not present in the external content server 300, the long-term memory 143, the short-term memory 144 and the context information DB 142, it may be possible to output a dialogue response for asking parameter values to a user.

Figure 45:
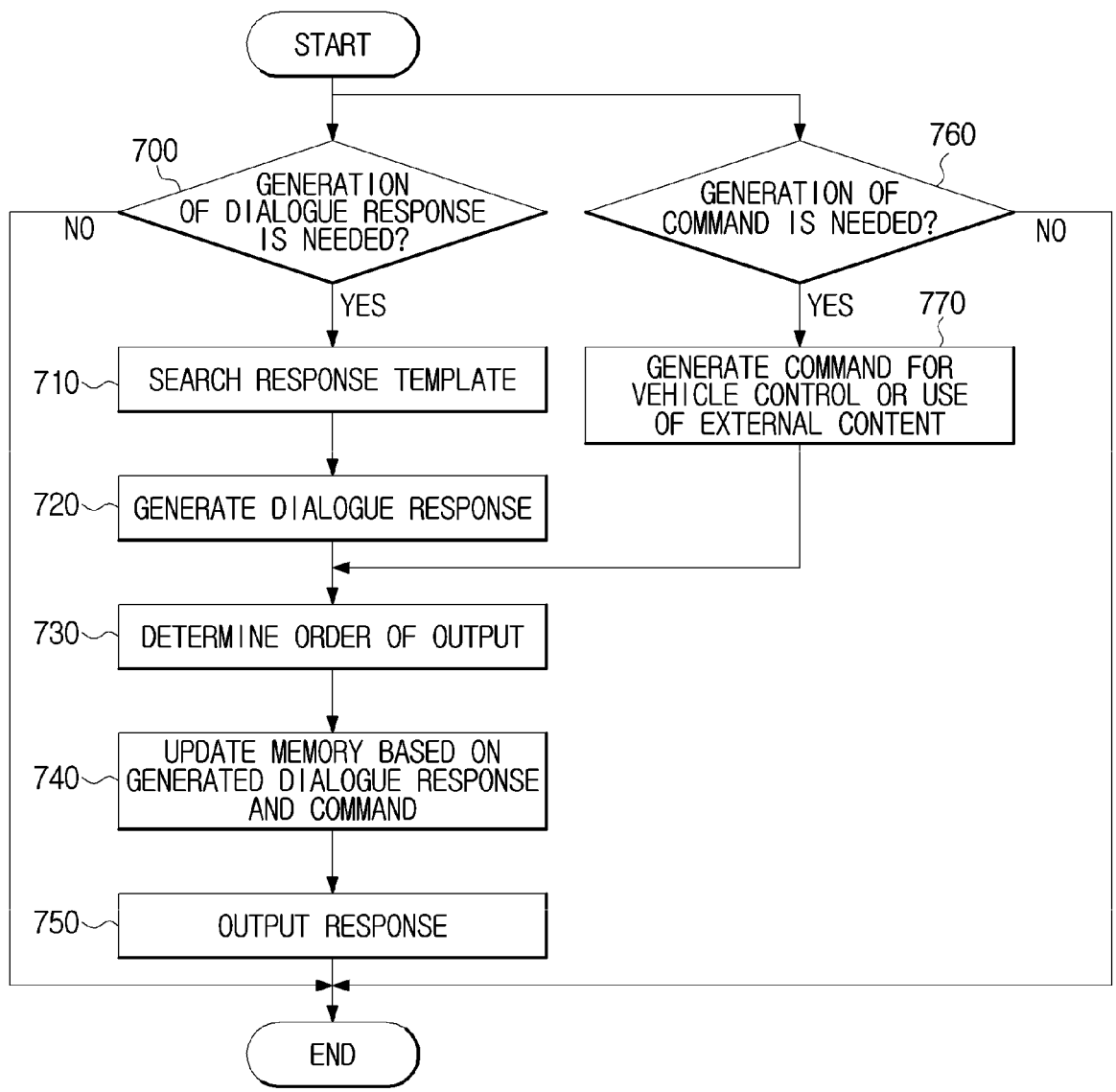
FIG. 45 is a flowchart illustrating a result processing method for generating a response corresponding to a result of the dialogue management in the dialogue processing method in accordance with an embodiment.

FIG. 45 is a flowchart illustrating a result processing method for generating a response corresponding to a result of the dialogue management in the dialogue processing method in accordance with an embodiment. The result processing method may be performed by the result processor 130 of the dialogue system 100.

Referring to FIG. 45, when the generation of the dialogue response is needed (YES in 700), the dialogue response generator 132 may search the response template 149 (710). The dialogue response generator 132 may extract a dialogue response template corresponding to the current dialogue state and action state, and fill the response template with the needed parameter value so as to generate the dialogue response (720).

When the parameter value needed for the generation of the dialogue response is not transmitted from the dialogue manager 120, or when an introduction of using the external content, is transmitted, the needed parameter value may be provided from the external content server 300 or searched in the long-term memory 143, the short-term memory 144 or the context information DB 142. When the needed parameter value is acquired through only the user since the needed parameter value is not present in the external content server 300, the long-term memory 143, the short-term memory 144 and the context information DB 142, it may be possible to generate a dialogue response for asking parameter values to the user.

When the generation of the command is needed (760), the command generator 136 may generate the command for the vehicle control or the external content (770).

The generated dialogue response or command may be input to the output manager 133 and the output manager 133 may determine the output order between the dialogue response and the command or the output order among the plurality of the commands (730).

The memory may be updated based on the generated dialogue response or command (740). The memory manager 135 may update the short-term memory 144 by storing the dialogue content between the user and the system based on the generated dialogue response or command, and update the long-term memory 143 by storing the information related to the user acquired through the dialogue with the user. The memory manager 135 may update the user's preference and the vehicle control history stored in the long-term memory 143 based on the generated and output vehicle control and external content request.

The output manager 133 may output the response by transmitting the dialogue response and command to an appropriate output position (750). TTS response may be output via the speaker 232 and text response may be output on the display 231. The command may be transmitted to the vehicle controller 240 according to the control target, or to the external content server 300. In addition, the command may be transmitted to the communication device 280 configured to communicate with the external content server 300.

Figure 46:
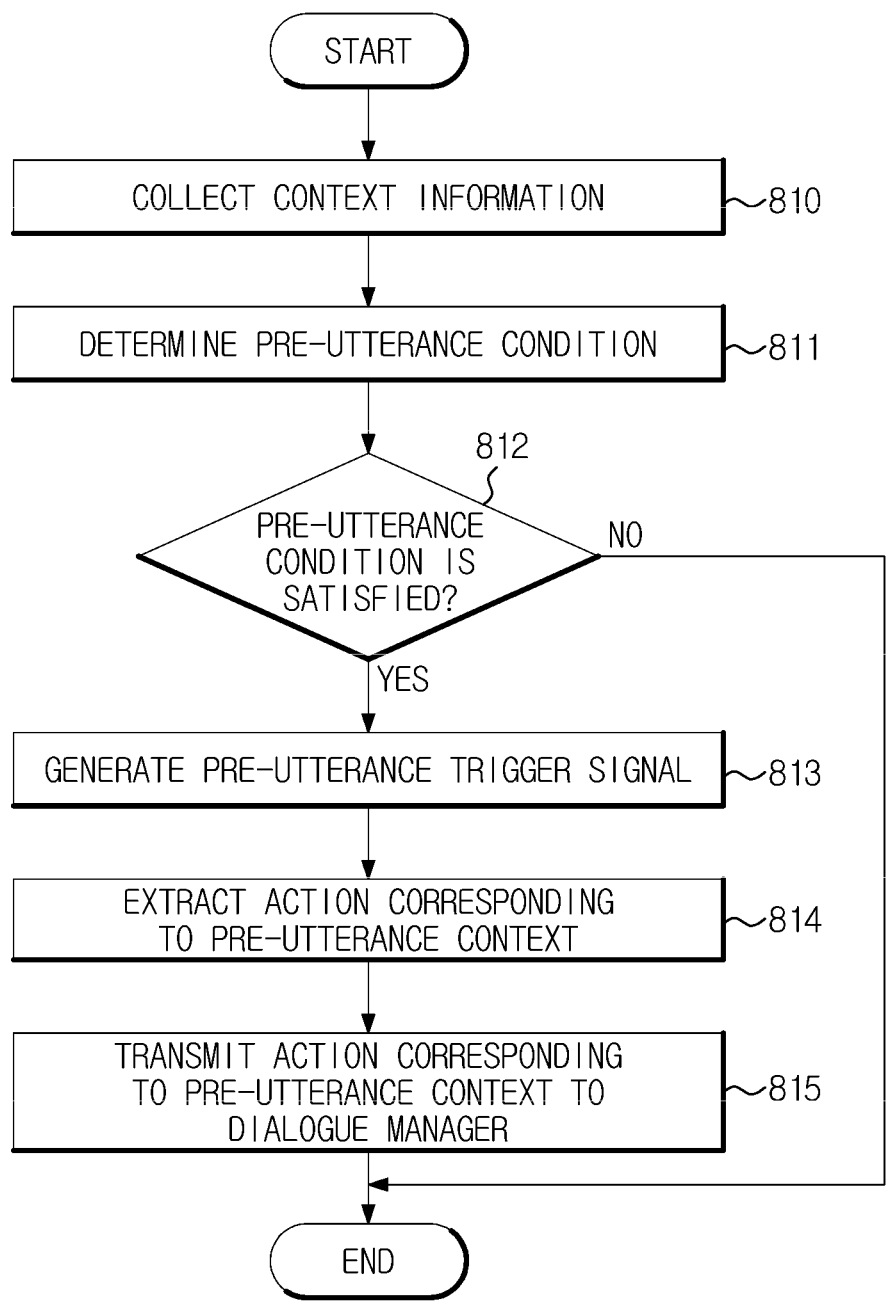
FIGS. 46 to 48 is a flowchart illustrating a case in which the dialogue system outputs a pre-utterance before a user inputs an utterance in the dialogue processing method in accordance with an embodiment.
Figure 47:
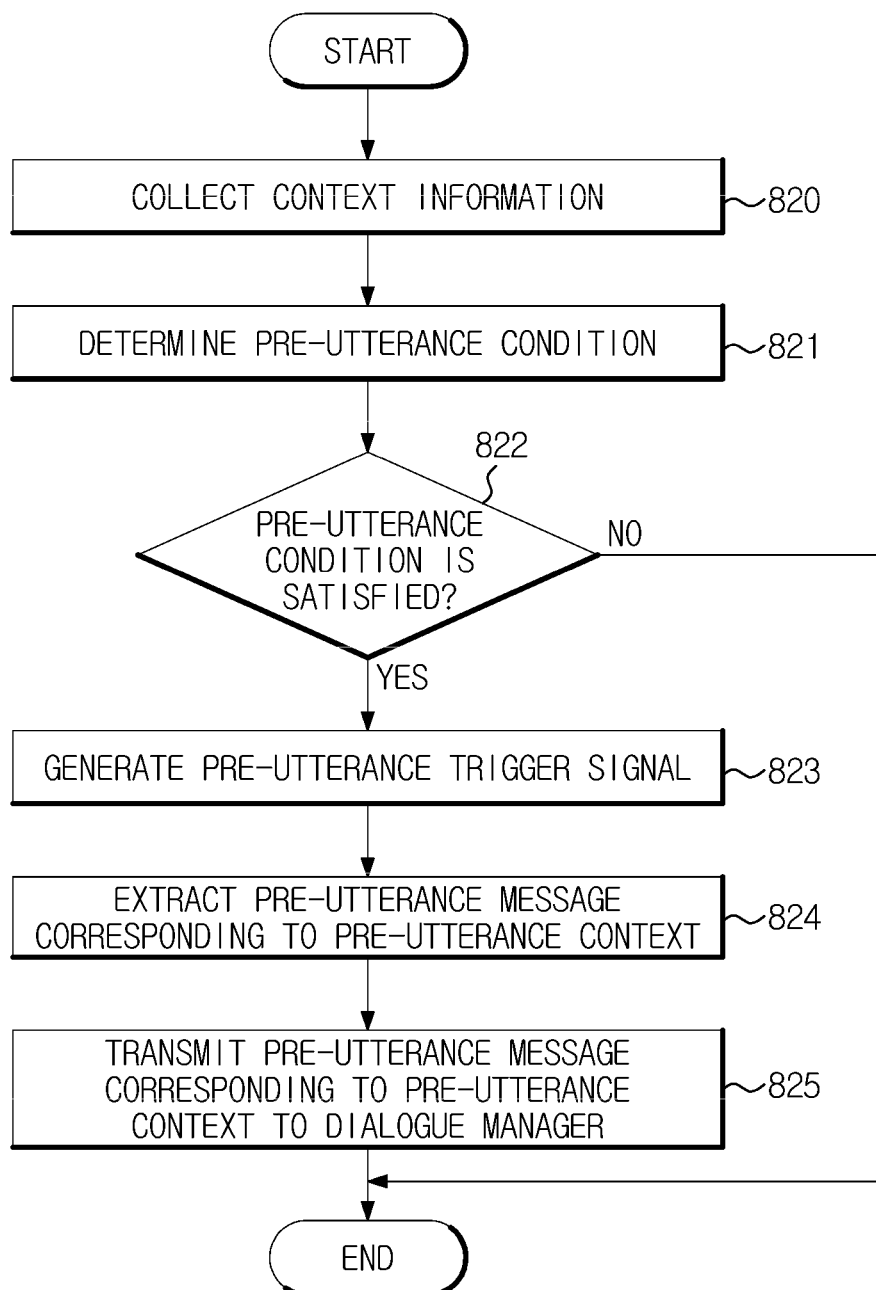
Figure 48:
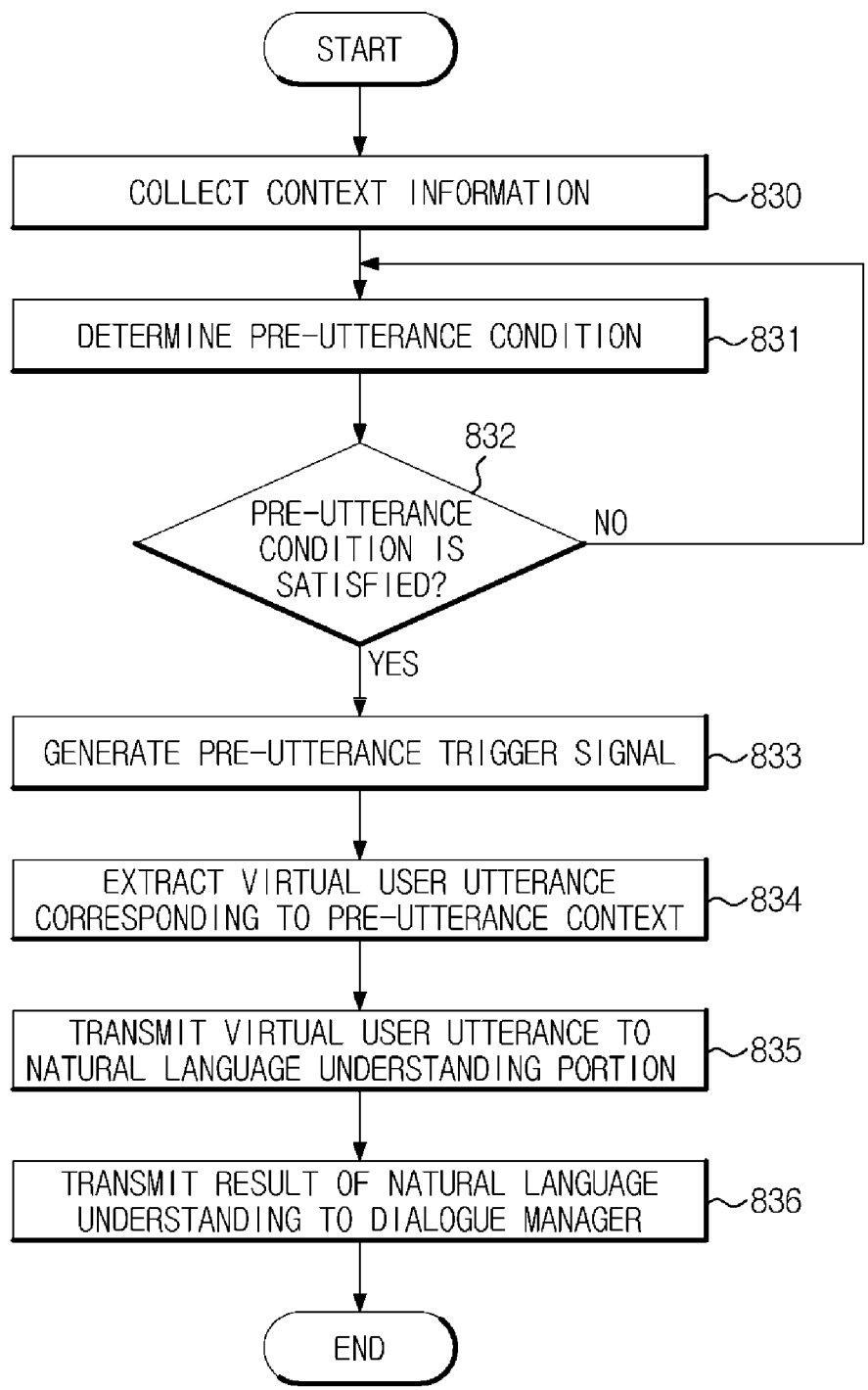

FIGS. 46 to 48 is a flowchart illustrating a case in which the dialogue system outputs a pre-utterance before a user inputs an utterance in the dialogue processing method in accordance with an embodiment.

Referring to FIG. 46, the context information collector 112a and the context information collection manager 112b collect the context information (810). Particularly, the vehicle controller 240 may input information acquired by the sensor provided in the vehicle, e.g., a remaining amount of fuel, an amount of rain, a rain speed, surrounding obstacle information, a speed, an engine temperature, a tire pressure, current position, and driving environment information, to the context information processor 112. The user information input via the information except for speech input device 220 and information acquired from the external content server 300 or the external device may be input to the context information processor 112. The collected context information may be stored in the context information DB 142, the long-term memory 143, or the short-term memory 144.

The pre-utterance determiner 151 determines the pre-utterance condition based on the context information (811). The pre-utterance condition may be stored in the pre-utterance condition table 145*a*. As illustrated in FIGS. 22A to 22C, the pre-utterance condition related to the context information may be stored for each context information in the pre-utterance condition table 145*a*.

When the context information transmitted from the context information DB 142, the long-term memory 143, or the short-term memory 144 satisfies the pre-utterance condition (YES in 812), the pre-utterance determiner 151 determines that it is the pre-utterance context, and generates the pre-utterance trigger signal (813).

The pre-utterance determiner 151 extracts an action corresponding to the pre-utterance context (814). As illustrated in FIG. 22C, an action corresponding to the pre-utterance context may be pre-stored in the pre-utterance condition table 145*a*. The pre-utterance determiner 151 may extract an action corresponding to the pre-utterance context, from the pre-utterance condition table 145*a*. In addition, the pre-utterance determiner 151 may generate an action corresponding to the pre-utterance context, according to the established rules.

When the pre-utterance determiner 151 transmits the pre-utterance trigger signal with the action corresponding to the pre-utterance context, to the dialogue input manager 111*c*, the dialogue input manager 111*c* transmits the action corresponding to the pre-utterance context, to the dialogue manager 120 (815). In this case, it may be possible to transmit the pre-utterance trigger signal with a signal indicating the pre-utterance context.

After the action corresponding to the pre-utterance context is transmitted to the dialogue manager 120, a series of process, such as the generation of the dialogue task and the action task, and the acquirement of the action parameter, may be performed as illustrated in FIG. 44. When other dialogue task or action task is performed, the dialogue flow manager 121 may firstly generate and process the task related to pre-utterance context or may select the priority according to the established rules.

When the dialogue manager 120 transmits information related to the action that is firstly performed, to the result processor 130, the dialogue response generator 132 may extract a dialogue response template by searching the response template 149, and generate the dialogue response by filling the extracted dialogue response template with the parameter value. The generated dialogue response may be transmitted to the output manager 133 via the response generation manager 131. The output manager 133 may output the generated dialogue response via the speaker provided in the vehicle 200 or the mobile device 400.

Further, it may be possible to obtain or generate the pre-utterance message as it is, corresponding to the pre-utterance context. Referring to FIG. 47, the context information collector 112*a* and the context information collection manager 112*b* collect the context information (820) and the pre-utterance determiner 151 determines the pre-utterance condition based on the context information (821).

When the context information transmitted from the context information DB 142, the long-term memory 143, or the short-term memory 144 satisfies the pre-utterance condition (YES in 822), the pre-utterance determiner 151 determines that it is the pre-utterance context, and generates the pre-utterance trigger signal (823).

The pre-utterance determiner 151 extracts a pre-utterance message corresponding to the pre-utterance context (824). As illustrated in FIGS. 22A and 22B, a pre-utterance message corresponding to the pre-utterance context may be pre-stored in the pre-utterance condition table 145*a*. The pre-utterance message stored in advance may be a content indicating the current context or a content which firstly suggests the execution of the certain function or the service needed for the pre-utterance context. In addition, the pre-utterance determiner 151 may generate a pre-utterance message according to the established rules.

When the pre-utterance determiner 151 transmits the pre-utterance trigger signal with the pre-utterance message, to the dialogue input manager 111*c*, the dialogue input manager 111*c* may transmit the pre-utterance message, to the dialogue manager 120 (825). In this case, it may be possible to transmit the pre-utterance trigger signal with a signal indicating the pre-utterance context.

The dialogue manager 120 may generate the dialogue task for outputting the transmitted pre-utterance message, and transmit the dialogue task to the result processor 130. The result processor 130 may output the input pre-utterance message, via the speaker 232.

Further, it may be possible to extract a virtual user utterance corresponding to the pre-utterance context. Referring to FIG. 48, the context information collector 112*a* and the context information collection manager 112*b* collect the context information (830) and the pre-utterance determiner 151 determines the pre-utterance condition based on the context information (831).

When the context information transmitted from the context information DB 142, the long-term memory 143, or the short-term memory 144 satisfies the pre-utterance condition (YES in 832), the pre-utterance determiner 151 determines that it is the pre-utterance context, and generates the pre-utterance trigger signal (833).

The pre-utterance determiner 151 extracts a virtual user utterance corresponding to the pre-utterance context (834). Although not shown in the drawings, a virtual user utterance corresponding to the pre-utterance context may be pre-stored in the pre-utterance condition table 145*a*. The pre-utterance determiner 151 may extract the virtual user utterance corresponding to the pre-utterance context from the pre-utterance condition table 145*a*. In addition, the pre-utterance determiner 151 may generate a virtual user utterance corresponding to the pre-utterance context, according to the established rules.

When the pre-utterance determiner 151 transmits the virtual user utterance in the text form, to the natural language understanding portion 111*b* (835), the natural language understanding portion 111*b* may extract a domain and action from the virtual user utterance, in the same manner as a case in which the user actually utters.

The dialogue input manager 111*c* transmits the pre-utterance trigger signal with the result of natural language understanding, to the dialogue manager 120 (836). The result of natural language understanding may include a domain and action extracted from the virtual user utterance, and the extracted domain and action may become a domain and action corresponding to the pre-utterance context.

For example, according to the mobile gateway method in which the mobile device 400 acts as a gateway between the vehicle and the dialogue system 100, the dialogue system client 470 of the mobile device 400 may perform some of operations of the pre-utterance determiner 151. In this case, the dialogue system client 470 may generate the virtual user utterance corresponding to the pre-utterance context and transmit the virtual user utterance to the natural language understanding portion 111b.

After the pre-utterance trigger signal with the result of natural language understanding are transmitted to the dialogue manager 120, a series of process, such as the generation of the dialogue task and the action task, and the acquirement of the action parameter, may be performed as illustrated in FIG. 44. When other dialogue task or action task is performed, the dialogue flow manager 121 may firstly generate and process the task related to pre-utterance context or may select the priority according to the established rules.

When the dialogue manager 120 transmits information related to the action that is firstly performed, to the result processor 130, the dialogue response generator 132 may extract a dialogue response template by searching the response template 149, and generate the dialogue response by filling the extracted dialogue response template with the parameter value. The generated dialogue response may be transmitted to the output manager 133 via the response generation manager 131. The output manager 133 may output the generated dialogue response via the speaker provided in the vehicle 200 or the mobile device 400.

Figure 49:
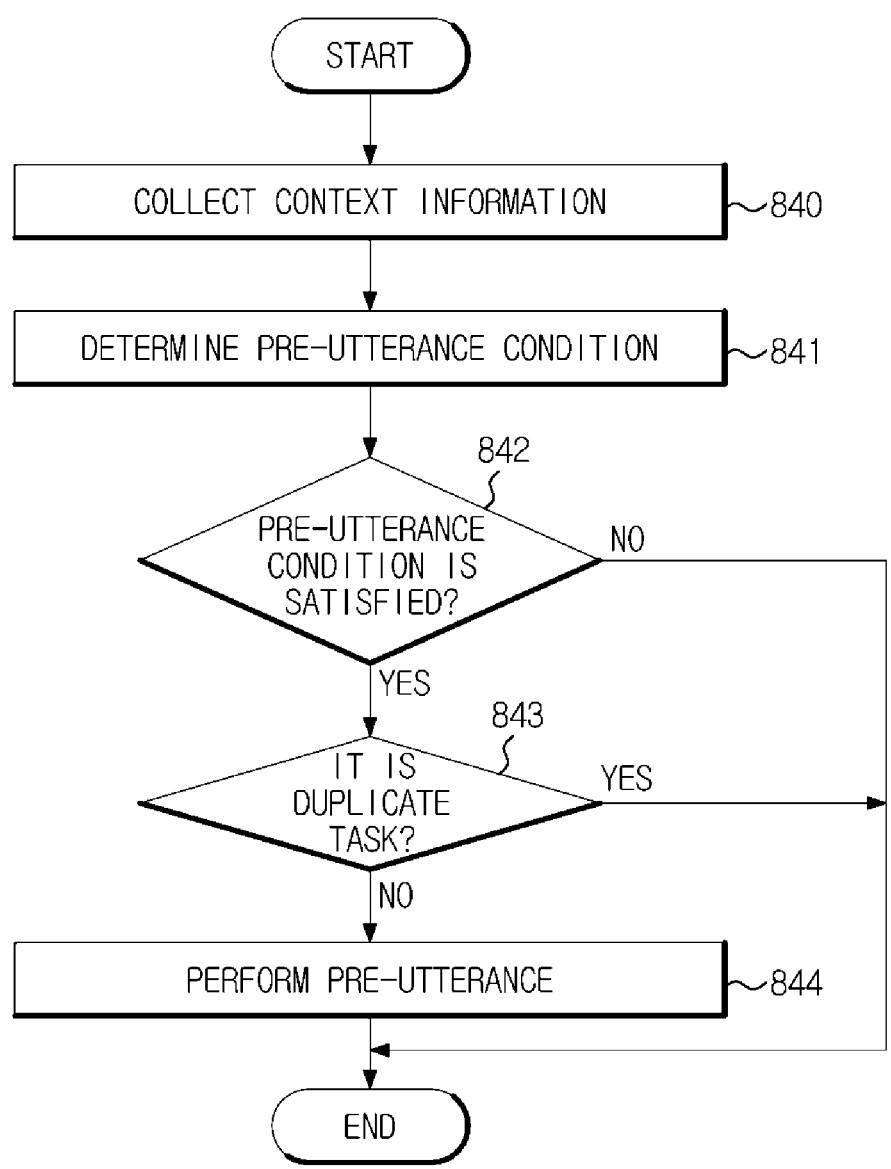
FIG. 49 is a flowchart illustrating of processing a duplicate task when the dialogue system outputs a pre-utterance before a user inputs an utterance in the dialogue processing method in accordance with an embodiment.

FIG. 49 is a flowchart illustrating of processing a duplicate task when the dialogue system outputs a pre-utterance before a user inputs an utterance in the dialogue processing method in accordance with an embodiment.

Referring to FIG. 49, the context information collector 112a and the context information collection manager 112b collect the context information (840) and the pre-utterance determiner 151 determines the pre-utterance condition based on the context information (841).

The pre-utterance determiner 151 determines whether the context information transmitted from the context information DB 142, the long-term memory 143, or the short-term memory satisfies the pre-utterance condition, and when the context information satisfies the pre-utterance condition (YES in 842), the duplicate task processor 152 determines whether a task related to the pre-utterance context that currently occurs, is duplicate or not (843).

Particularly, the duplicate task processor 152 may determine whether a task, such as a dialogue and an action related to the pre-utterance context that currently occurs, is already performed or is currently performed, based on the information, which is related to a task that is previously or currently performed in the dialogue system 100, stored in the task processing DB 145b.

For example, when a dialogue related to the pre-utterance context that currently occurs is already performed, and when a reference period of time is not elapsed from the dialogue point of time, the duplicate task processor 152 may determine that the task related to the current pre-utterance context is a duplicate task. In addition, when the dialogue and action related to the current pre-utterance context is currently performed, the duplicate task processor 152 may determine that the task related to the current pre-utterance context is a duplicate task.

That is, the duplicate task processor 152 may determine whether the pre-utterance is already output or not and the user's intention about the pre-utterance context, based on the dialogue history and whether the task is performed or not, which are stored in the task processing DB 145b. The duplicate task processor 152 may determine whether it is a duplicate task or not, based on the stored dialogue time, the user's intention or whether the task is processed or not.

When it is identified that the task related to the current pre-utterance context is a duplicate task (YES in 843), the duplicate task processor 152 terminates the pre-utterance context.

When it is determined that the task related to the current pre-utterance context is not a duplicate task (NO in 843), it may be possible to perform the pre-utterance operation as illustrated in the above-mentioned embodiment (844). For example, it may be possible to transmit the pre-utterance trigger signal and the action or the pre-utterance message corresponding to the pre-utterance context, to the dialogue manager 120. In addition, it may be possible to transmit the virtual user utterance corresponding to the pre-utterance context, to the natural language understanding portion 111b, and transmit the result of natural language understanding and the pre-utterance trigger signal, to the dialogue manager 120.

According to the above-mentioned embodiment, it is assumed that additional components, such as the pre-utterance determiner 151, and the duplicate task processor 152 and additional storage, such as the pre-utterance condition table 145a and the task processing DB 145b are used to perform the dialogue processing method for the pre-utterance. However, embodiments of the dialogue processing method are not limited thereto, but the context understanding portion 112c may perform the operation of the pre-utterance determiner 151 and the duplicate task processor 152 and the information stored in the pre-utterance condition table 145a and the task processing DB 145b may be stored in the context understating table 145.

The dialogue processing method according to an embodiment is not limited the order in the above mentioned flowchart. The flow according to the flowchart of FIGS. 41 to 49 may be merely an example applied to the dialogue processing method. Therefore, the plurality of steps may be performed at the same time it may be also possible to change the order of each step.

Figure 50:
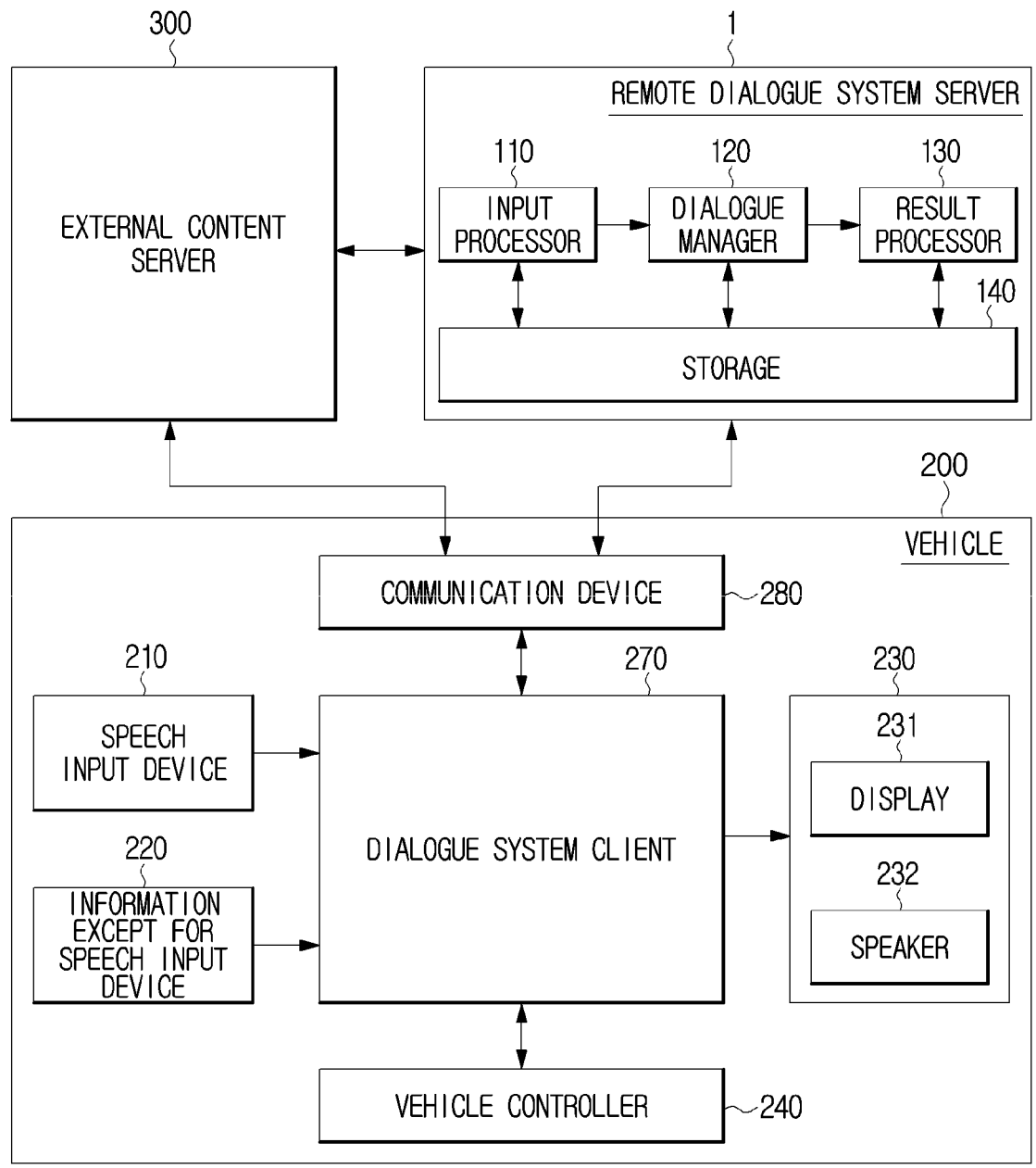
FIG. 50 is a control block diagram illustrating a vehicle gateway method in which a dialogue system is provided in a remote server and a vehicle acts as a gateway connecting a user to the dialogue system.

FIG. 50 is a control block diagram illustrating a vehicle gateway method in which a dialogue system is provided in a remote server and a vehicle acts as a gateway connecting a user to the dialogue system.

Hereinafter, a detailed description of the same configuration as described in the above description of FIG. 11 will be omitted.

Further, a description thereof will be described with reference to FIGS. 51 to 53 illustrating a method for acquiring user labeling context information.

According to the vehicle gateway method, as illustrated in FIG. 50, a remote dialogue system server 1 may be provided in the outside of the vehicle 200, and a dialogue system client 270 connected via the remote dialogue system server 1 and the communication device 280 may be provided in the vehicle 200. The communication device 280 serves as a gateway for connecting the vehicle 200 and the remote dialogue system server 1.

The dialogue system client 270 may serve as an interface connected to an input/output device and perform collecting, and sending and receiving data.

When the speech input device 210 and the information except for speech input device 220 provided in the vehicle 200 receive a user's input and transmit the user input to the dialogue system client 270, the dialogue system client 270 may transmit the input data to the remote dialogue system server 1 via the communication device 280.

The vehicle controller 240 may also transmit data detected by the vehicle detector 260 to the dialogue system client 270 and the dialogue system client 270 may transmit the data detected by the vehicle detector 260 to the remote dialogue system server 1 via the communication device 280.

According to a response transmitted from the remote dialogue system server 1, the vehicle 200 may bring information or content for the service needed for the user from the external content server 300.

The communication device 280 may include at least one communication module configured to communicate with an external device. For example, the communication device 280 may include at least one of the short range communication module 281, the wired communication module 282, and the wireless communication module 283.

Since the above mentioned dialogue system 100 is provided in the remote dialogue system server 1, the remote dialogue system server 1 may perform all of input data processing, dialogue processing based on the result of the input data processing, and result processing based on the result of the dialogue processing.

In addition, the remote dialogue system server 1 may bring information or content needed for the input data processing, the dialogue management, or the result processing, from the external content server 300.

Particularly, the dialogue system 100 may include the input processor 110, the dialogue manager 120, the result processor 130, and the storage 140.

The input processor 110 may recognize a user's speech, which is transmitted when the user performs an utterance, as a text, and assign a weight to the text according to objective context information at the time when the user's speech is recognized. The input processor 110 may identify an entity of the text and then acquire user labeling context information. When user's free utterance or designated entity utterance occurs, the input processor 110 may acquire at least one of an action corresponding to the user's free utterance or the designated entity utterance, and a pre-utterance message having an utterance content to be output.

The user labeling is defined as search indexing information for acquiring context information based on a user's utterance. In addition, the user labeling context information is defined as defining context information that is searched based on the user labeling.

When a button (push-to-talk) provided on the inside or the outside of the vehicle for the user utterance is selected by the user or when at least one of a predetermined speech (e.g., a pre-determined call word) or gesture is performed by the user, a trigger signal is generated. Therefore, the user's utterance may be recorded and then transmitted to the input processor 110, through the speech input device provided on the inside or the outside of the vehicle.

The input processor 110 may perform morphological analysis on the user's speech according to the language and convert the user's speech into a text. At this time, the morphological analysis is optional, and it is also possible to perform the text conversion without the morphological analysis.

The input processor 110 may correct the text using unique named entity recognition when a place, a name, music, and a movie and a pre-stored unique named entity are stored in the storage 140. When performing the entity recognition, it may be possible to correct some of the text not the unique named entity.

The input processor 110 may call objective context information including at least one of time information, place information, schedule, user's position in inside or outside of the vehicle or driving information from the storage 140 and assign a weight according to the importance and specificity of the objective context information.

For example, the time information may include daily timeline, day of the week, a specific holiday, and a season, and the place information may include a nearby POI, a place stored between house and company, and a road type, and the driving information may include speed, gears, and acceleration.

At this time, the input processor 110 may also acquire objective context information from the outside including the external content server 300, in addition to the storage 140.

The input processor 110 may assign a weight to frequency of referencing of an associative entity and the objective context information according to time, place, driving and boarding state, and vehicle driving information.

For example, when the vehicle drives and the user boards on the vehicle, the input processor 110 may firstly search for a vehicle, a schedule, a position of interest (POI), and a time-related entity and assign a weight thereto. In addition, when the daily timeline is night, holiday or weekends, the input processor 110 may firstly search for an entity related to schedule, leisure time, contact information, and POI, and assign a weight thereto. In addition, when a place is a road during the vehicle drives, the input processor 110 may firstly search for an entity related to the road such as a rest stop, an entrance and exit and a fee.

The input processor 110 may search for an entity having a weight in order of the weight having the higher priority and derive user labeling context information by using a word that describes the property of the entity, as a label and then transmit the user labeling context information to the storage 140 for constituting the ontology.

Particularly, the input processor 110 may first verify an entity having a high weight, search for a word describing a property of the entity, and connect the property description word to the entity. The input processor 110 may firstly search for an entity having a high weight according to a weight based on time, place, driving and boarding state, and vehicle driving information and use the word describing the property of the entity, as a label so as to acquire user labeling context information and transmit the user labeling context information to the storage 140 for constituting the ontology.

When the vehicle drives and the user boards on the vehicle, the input processor 110 may firstly search for an entity related to a vehicle, a schedule, POI, and time and assign a weight to the entity.

Referring to FIG. 51, when the user's utterance is 'This cafe coffee is delicious, so it is worth to stop by for a moment', the input processor 110 may call coffee shop information and POI business name from a map and change an entity name 'this café ' into 'A coffee shop', assign a label 'coffee is delicious, change an entity name 'for a moment' into 'within one hour', and assign a label 'it is worth to stop by'. "Within one hour" may be connected to a dependent entity of 'this café'

The input processor 110 may search for the entity included in pre-stored ontology in the storage 140 to derive user labeling context information by using a word describing the property of the entity as a label, and transmit the user labeling context information to the storage 140 for constituting the ontology. At this time, the entity may be in a non-weighted state. The pre-stored ontology may be a public ontology or a specialized ontology in which associative words collections and similar meaning is connected for each service function. In other words, it is possible to utilize common sense object information like an encyclopedia as the ontology.

The input processor 110 may derive the user labeling context information by referring to the pre-stored user information when labeling. At this time, the user information may include at least one of personal information, family, schedule, telephone number, preference, personality, educational history, occupation, current position, previous position or previous dialogue contents.

Referring to FIG. 52, when the user's utterance is 'There are far fewer people in the gasoline station in the morning', the input processor 110 may call gasoline station information and POI business name from a map and change an entity name "gasoline station" into "B oil city hall branch", assign a label "There are far fewer people". At this time, the input processor 110 may verify that there is no association expression and important information about the entity name 'morning', and may set 'morning' as a dependent entity for 'gas station'

Referring to FIG. 53, when the user's utterance is 'It's not easy to stop by kindergarten every morning', the input processor 110 may call POI business name about 'kindergarten' from a map and change an entity name "kindergarten" into "C kindergarten", add a label "stop by", add 'It's not easy' as a dependent label of 'stop by', check a previous driving record, verify whether a user repeatedly visits the corresponding place (visit history), check personal information of user's child, add an entity 'son' that is omitted, and assign the entity 'morning' as a dependent entity for 'kindergarten'.

The input processor 110 may verify whether a new route of the vehicle corresponds to the pre-utterance context identical to the object context information, and when it is determined that it corresponds to the pre-utterance context, the input processor 110 may acquire the entity ontology information corresponding to the object context information, from the storage 140, as a pre-utterance message.

The storage 140 may store the user labeling context information derived by the input processor 110 in such a manner to manage the user labeling context information in a form that allows entity ontology to be shared with other user.

When storing the user labeling context information, the storage 140 may store a labeling result and a frequency of referencing ontology entity by searching for the corresponding entity in the pre-stored ontology structure. In this time, the pre-stored ontology structure may utilize an open source.

According to a user setting, the storage 140 may set and store the labeling result and the frequency of referencing ontology entity as one of sharing or non-sharing.

According to a user's request, the storage 140 may allow non-shared data, shared-data, which is shared with other users, and pre-set ontology structure to be browsed.

When the input processor 110 acquires the action corresponding to the free utterance or the designated entity utterance, the dialogue manager 120 may acquire a parameter value of the action parameter that is used to perform the action corresponding to the free utterance or the designated entity utterance, from the storage 140.

When the user performs the free utterance or the designated entity utterance, the dialogue manager 120 may acquire the user labeling context information corresponding to the free utterance or the designated entity utterance, from the storage 140.

When the input processor 110 acquires an action corresponding to the free utterance or the designated entity utterance, the result processor 130 may generate a dialogue response to perform the action corresponding to the free utterance or the designated entity utterance by using the acquired parameter value of the action parameter.

For example, when a user (e.g., a driver) utters a designated entity 'take a break?' at a location adjacent to 'A coffee shop', the result processor 130 may output a dialogue response such as 'Would you like to go to near A coffee shop where coffee was delicious?'

In addition, when a user utters 'Is it time to put gasoline?' including an entity or an entity similar word, the result processor 130 may output a dialogue response such as 'in the morning, there are far fewer people in B oil city hall branch you visited the last time'. In this time 'gasoline' may be a similar entity of 'gasoline station' that is a pre-stored entity.

When the input processor 110 acquires the pre-utterance message, the result processor 130 may generate a dialogue response corresponding to the transmitted pre-utterance message.

At this time, the input processor 110 may verify whether a new route of the vehicle corresponds to a pre-utterance context identical to the objective context information, and when it is determined that the new route of the vehicle corresponds to the pre-utterance context, the input processor 110 may acquire entity ontology information corresponding to the objective context information, as the pre-utterance message, from the storage.

For example, when a repeated schedule is detected, the result processor 130 may output a pre-utterance message such as 'it is not easy to stop by C kindergarten in the morning. Would you like to leave 5 minutes early?' at the same time every day.

In addition, when the gasoline is not enough and the previously visited gasoline station is nearby, the result processor 130 may output a pre-utterance message 'fuelling is needed. Would you like to go to the nearby B-oil city hall branch there are few people in this time?'

Figure 54:
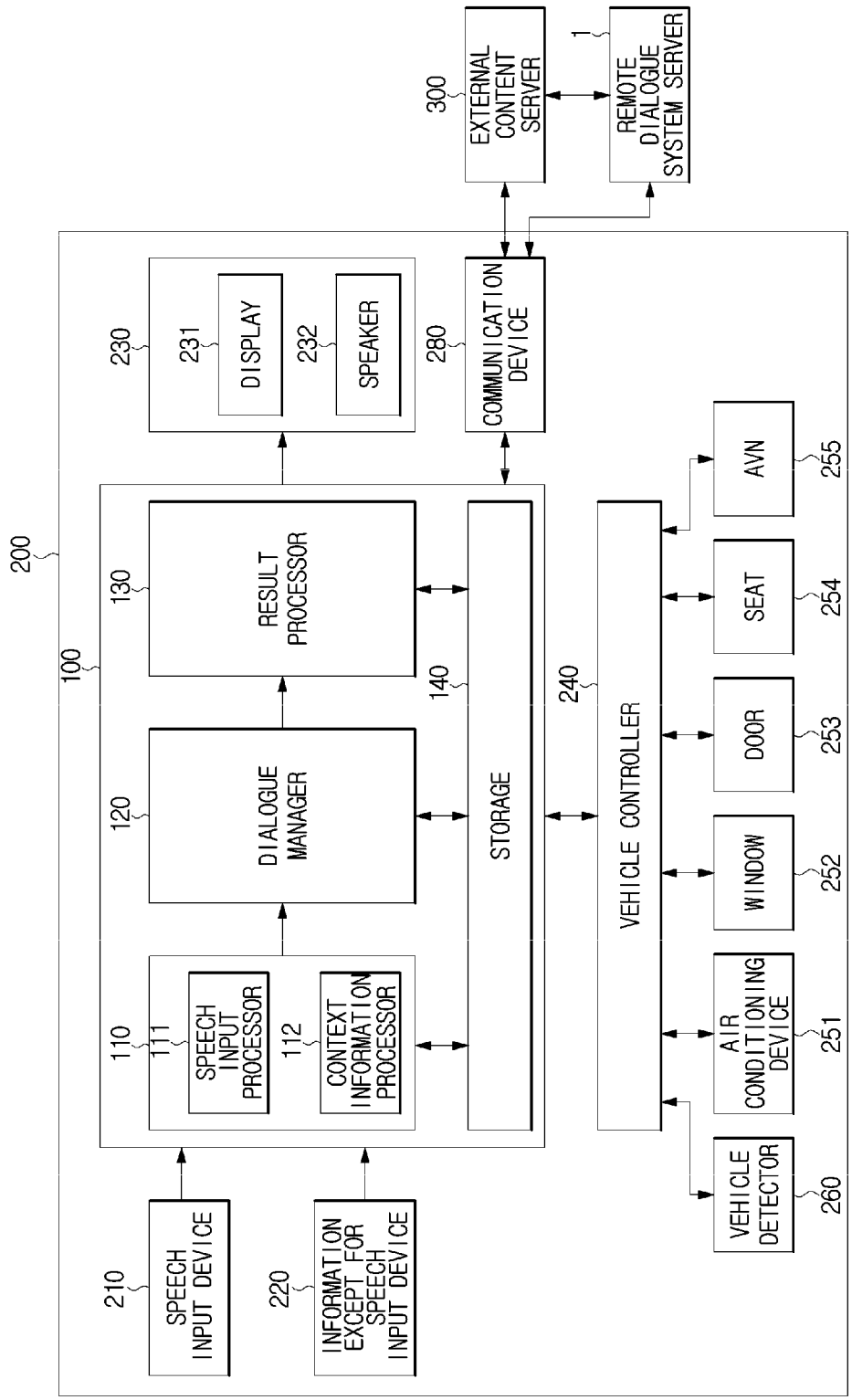
FIG. 54 is a control block diagram illustrating a vehicle independent method in which a dialogue system is provided in a vehicle.

FIG. 54 is a control block diagram illustrating a vehicle independent method in which a dialogue system is provided in a vehicle.

Hereinafter, a detailed description of the same configuration as described in the above description of FIG. 10 will be omitted.

According to the vehicle independent method, the dialogue system 100 having the input processor 110, the dialogue manager 120, the result processor 130 and the storage 140 may be contained in the vehicle 200, as illustrated in FIG. 54.

The vehicle 200 may include the speech input device 210 configured to receive a user's speech and transmit the user's speech, as a trigger signal for the utterance is generated by the user.

When a button provided on the inside or the outside of the vehicle for the user utterance is selected by the user, or when at least one of a predetermined speech or gesture is performed, a trigger signal may be generated and thus the speech input device 210 may receive the user's speech.

The dialogue system 100 may recognize the user's speech transmitted from the speech input device 210, as a text, verifies an entity of the text, derive user labeling context information, store the user labeling context information in a state in which entity ontology is shared with other user, and generate a dialogue response to perform an action corresponding when the user performs the free utterance or the designated entity utterance.

Particularly, the input processor 110 may recognize the user's speech, which is transmitted when a user is uttered, as a text, and assign a weight to the text according to objective context information at the time when the user's speech is recognized. After verifying an entity of the text, the input processor 110 may derive user labeling context information and when the free utterance or designated entity utterance of the user occurs, the input processor 110 may acquire at least one of an action, which corresponds to the free utterance or designated entity utterance of the user, and a pre-utterance message including an utterance content to be output.

The input processor 110 may call the objective context information including at least one of the time information, the place information, the schedule, the user's location in the inside or outside of the vehicle or the driving information from the storage 140, and assign a weight to the objective context information according to the importance and specificity of the objective context information.

The input processor 110 may verify whether a new route of the vehicle corresponds to the pre-utterance context identical to the object context information, and when it is determined that it corresponds to the pre-utterance context, the input processor 110 may acquire the entity ontology information corresponding to the object context information, from the storage 140, as a pre-utterance message.

The storage 140 may store the user labeling context information derived by the input processor 110 in such a manner to manage the user labeling context information in a form that allows entity ontology to be shared with other user.

When storing the user labeling context information, the storage 140 may store a labeling result and a frequency of referencing ontology entity by searching for the corresponding entity in the pre-stored ontology structure. In this time, the pre-stored ontology structure may utilize an open source.

When the input processor 110 acquires the action corresponding to the free utterance or the designated entity utterance, the dialogue manager 120 may acquire a parameter value of the action parameter that is used to perform the action corresponding to the free utterance or the designated entity utterance, from the storage 140.

When the user performs the free utterance or the designated entity utterance, the dialogue manager 120 may acquire the user labeling context information corresponding to the free utterance or the designated entity utterance, from the storage 140.

When the input processor 110 acquires an action corresponding to the free utterance or the designated entity utterance, the result processor 130 may generate a dialogue response to perform the action corresponding to the free utterance or the designated entity utterance by using the acquired parameter value of the action parameter.

As is apparent from the above description, according to the proposed dialogue system and vehicle having the same, it may be possible to improve the user convenience during driving, since the driver is provided with information that is needed for the driver in the certain context, through information, which is uttered by the driver or other driver and then labeled.

Although a few embodiments of the present disclosure have been shown and described, it would be appreciated by those skilled in the art that changes may be made in these embodiments without departing from the principles and spirit of the disclosure, the scope of which is defined in the claims and their equivalents.

According to the proposed dialogue processing apparatus, vehicle having the same and dialogue processing method, it may be possible to provide the service that is appropriate for the user's intention or that is needed for the user by using the dialogue processing method that is specified for the vehicle.

In addition, it may be possible to provide the service that is needed of the user, by considering a variety of contexts that occur in the vehicle. Particularly, regardless the user's utterance, it may be possible to determine the service that is needed of the user based on the context information or the driver information collected by the dialogue system 100 and proactively provide the service.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

100: dialogue system
110: input processor
120: dialogue processor
130: result processor
200: vehicle
210: speech input device
220: information except for speech input device
230: dialogue output device
280: communication device

What is claimed is:

1. A dialogue system comprising:
an input processor configured to:
  recognize a user's speech as a text;
  assign a weight to the text based on objective context information when the user's speech is recognized;
  derive user labeling context information after verifying an entity of the text; and
  when a free utterance of the user or a designated entity utterance of the user occurs, acquire at least one of an action or a pre-utterance message comprising an utterance content to be output, wherein the action corresponds to the free utterance of the user or the designated entity utterance of the user;
a storage configured to:
  store the user labeling context information; and
  manage the user labeling context information in a form that allows an entity ontology to be shared with other user;
a dialogue manager, when the input processor acquires the action, configured to acquire an action parameter value that is used to perform the action from the storage;
a result processor, when the input processor acquires the action, configured to generate a dialogue response to perform the action by using the action parameter value; and
a pre-utterance determiner configured to:
  determine a pre-utterance condition based on the user labeling context information; and
  generate a pre-utterance trigger signal before the user utters.

2. The dialogue system of claim 1, wherein the input processor is configured to:
perform morphological analysis on the user's speech corresponding to a language; and
convert the user's speech into the text.

3. The dialogue system of claim 1, wherein the input processor is configured to correct the text using a unique named entity recognition when a pre-stored unique named entity including a place, a name, a music, and a movie is stored in the storage.

4. The dialogue system of claim 1, wherein the input processor is configured to:
call objective context information comprising at least one of time information, place information, schedule, user's position in inside or outside of the vehicle, or driving information from the storage; and
assign the weight according to an importance and a specificity of the objective context information.

5. The dialogue system of claim 4, wherein the input processor is configured to:
search for an entity having a higher weight priority;
derive the user labeling context information by using a word that describes a characteristics of the entity as a label; and
transmit the user labeling context information to the storage for constituting ontology.

6. The dialogue system of claim 1, wherein the input processor is configured to:
search for the entity included in a pre-stored ontology in the storage;
derive the user labeling context information by using the word that describes the characteristics of the entity, as the label; and
transmit the user labeling context information to the storage for constituting ontology.

7. The dialogue system of claim 6, wherein the input processor is configured to derive the user labeling context information by referring to pre-stored user information.

8. The dialogue system of claim 7, wherein the pre-stored user information comprises at least one of personal information, family, schedule, telephone number, preference, personality, educational history, occupation, current position, previous position or previous dialogue contents.

9. The dialogue system of claim 1, wherein, when storing the user labeling context information, the storage is configured to store a labeling result and a frequency of referencing the entity ontology by searching for a corresponding entity in a pre-stored ontology structure.

10. The dialogue system of claim 9, wherein the storage is configured to set and store the labeling result and the frequency of referencing the entity ontology as one of sharing or non-sharing based on a user setting.

11. The dialogue system of claim 1, wherein, when the free utterance of the user or the designated entity utterance of the user is performed, the dialogue manager is configured to acquire the user labeling context information corresponding to the free utterance of the user or the designated entity utterance of the user from the storage.

12. The dialogue system of claim 1, wherein
the input processor is configured to:
determine whether a new route of a vehicle corresponds to a pre-utterance context that is identical to the objective context information; and
when it is determined that the new route of the vehicle corresponds to the pre-utterance context, acquire entity ontology information corresponding to the objective context information as the pre-utterance message from the storage.

13. The dialogue system of claim 1, wherein, when the input processor acquires the pre-utterance message, the result processor is configured to generate a dialogue response corresponding to the pre-utterance message.

14. The dialogue system of claim 1, wherein the input processor is configured to:
receive a user's utterance from a speech input device provided inside or outside of the vehicle when a trigger signal is generated or a button for the user's utterance is selected, wherein the trigger signal is generated when at least one of a predetermined speech or a predetermined gesture is performed by the user.

15. A vehicle comprising:
a speech input device configured to:
receive a user's speech and transmit the user's speech when a trigger signal for an utterance is generated by a user; and
a dialogue system configured to:
recognize the user's speech as a text;
derive user labeling context information after verifying an entity of the text;
store the user labeling context information in a form that allows an entity ontology to be shared with other user; and
generate a dialogue response to perform a corresponding action when the user performs a free utterance or a designated entity utterance; and
a pre-utterance determiner configured to:
determine a pre-utterance condition based on the user labeling context information; and
generate a pre-utterance trigger signal before the user utters.

16. The vehicle of claim 15, wherein the speech input device is configured to:
receive the user's speech when the trigger signal is generated or a button for a user's utterance is selected, wherein the trigger signal is generated when at least one of a predetermined speech or a predetermined gesture is performed by the user.

17. The vehicle of claim 15, wherein the dialogue system comprises:
an input processor configured to:
recognize the user's speech as a text;
assign a weight to the text based on objective context information when the user's speech is recognized;
derive user labeling context information after verifying an entity of the text; and
when a free utterance of the user or a designated entity utterance of the user occurs, acquire at least one of an action or a pre-utterance message including an utterance content to be output, wherein the action corresponds to the free utterance of the user or the designated entity utterance of the user;
a storage configured to:
store the user labeling context information; and
manage the user labeling context information in a form that allows an entity ontology to be shared with other user;
a dialogue manager, when the input processor acquires the action, configured to acquire an action parameter value that is used to perform the action from the storage; and
a result processor, when the input processor acquires the action, configured to generate a dialogue response to perform the action by using the action parameter value.

18. The vehicle of claim 17, wherein the input processor is configured to:
call objective context information including at least one of time information, place information, schedule, user's position in inside or outside of the vehicle, or driving information from the storage; and
assign the weight according to an importance and a specificity of the objective context information.

19. The vehicle of claim 15, wherein, when storing the user labeling context information, the storage is configured to store a labeling result and a frequency of referencing the entity ontology by searching for a corresponding entity in a pre-stored ontology structure.

20. The vehicle of claim 15, wherein, when the free utterance of the user or the designated entity utterance of the user is performed, the dialogue manager is configured to acquire the user labeling context information corresponding to the free utterance of the user or the designated entity utterance of the user from the storage.

21. The vehicle of claim 15, wherein
the input processor is configured to:
- determine whether a new route of the vehicle corresponds to a pre-utterance context that is identical to the objective context information; and
- when it is determined that the new route of the vehicle corresponds to the pre-utterance context, acquire entity ontology information corresponding to the objective context information as the pre-utterance message from the storage.

\* \* \* \* \*